(12) United States Patent
Lowry

(10) Patent No.: US 6,757,699 B2
(45) Date of Patent: Jun. 29, 2004

(54) METHOD AND SYSTEM FOR FRAGMENTING AND RECONSTITUTING DATA

(75) Inventor: Douglas B. Lowry, Steubenville, OH (US)

(73) Assignee: Franciscan University of Steubenville, Steubenville, OH (US)

( * ) Notice: Subject to any disclaimer, the term of this patent is extended or adjusted under 35 U.S.C. 154(b) by 401 days.

(21) Appl. No.: 09/849,716

(22) Filed: May 4, 2001

(65) Prior Publication Data

US 2002/0042859 A1 Apr. 11, 2002

Related U.S. Application Data

(60) Provisional application No. 60/238,604, filed on Oct. 6, 2000.

(51) Int. Cl.[7] .............................................. G06F 17/30
(52) U.S. Cl. ......................... 707/205; 713/200; 707/9; 707/206; 711/161
(58) Field of Search ................................ 707/201–204, 707/200, 205, 9, 206; 709/223, 246; 713/182, 200; 380/291, 267–269; 711/161

(56) References Cited

U.S. PATENT DOCUMENTS

| | | | |
|---|---|---|---|
| 3,703,727 A | * | 11/1972 | Knowlton .................... 711/217 |
| 4,751,733 A | * | 6/1988 | Delayaye et al. ............. 380/42 |
| 5,555,404 A | * | 9/1996 | Torbj ørnsen et al. ...... 707/202 |
| 5,629,770 A | | 5/1997 | Brassil et al. ............ 358/261.1 |
| 5,802,175 A | | 9/1998 | Kara ........................... 380/21 |
| 5,832,523 A | * | 11/1998 | Kanai et al. ................. 707/204 |
| 5,857,025 A | | 1/1999 | Anderson et al. ............. 380/28 |
| 5,867,578 A | | 2/1999 | Brickell et al. ............... 380/23 |
| 5,870,468 A | | 2/1999 | Harrison ........................ 380/4 |
| 5,949,882 A | * | 9/1999 | Angelo ........................ 713/185 |
| 5,999,622 A | * | 12/1999 | Yasukawa et al. ............ 705/51 |
| 6,044,469 A | | 3/2000 | Horstmann .................. 713/201 |
| 6,049,609 A | | 4/2000 | Mailszewski ................ 380/28 |
| 6,061,733 A | * | 5/2000 | Bodin et al. ................. 709/233 |
| 6,075,864 A | | 6/2000 | Batten ......................... 380/255 |
| 6,076,077 A | | 6/2000 | Saito ............................. 705/51 |
| 6,421,687 B1 | * | 7/2002 | Klostermann ................ 707/202 |
| 6,587,842 B1 | * | 7/2003 | Watts ............................ 705/57 |
| 2002/0138504 A1 | * | 9/2002 | Yano et al. .................. 707/204 |
| 2003/0018608 A1 | * | 1/2003 | Rice et al. ...................... 707/1 |
| 2003/0070077 A1 | * | 4/2003 | Redlich et al. .............. 713/182 |

OTHER PUBLICATIONS

"OceanStore: An Extremely Wide–Area Storage System". by David Bindle. Yan Chen. Patrick Eaton. Dennis Geels. Ramakrishna Gummadi. Sean Rhea. Hakin Weatherspoon, Westley Weimber, Christopher Wells, Ben Zhao, and John Kubiatowicz. Report No. UCB/CSD–00–1102. Computer Science Division (EECS) University of California. Berkeley. California 94720. May 1999.

"Silverback: A Global–Scale Archival System", by Hakin Weatherspoon. Chris Well,s Patrick R. Eaton, Ben Y. Zhao, and John D. Kubiatowicz. Computer Science Division, University of California. Berkeley. Mar. 2001.

* cited by examiner

*Primary Examiner*—Jean R. Homere
*Assistant Examiner*—Leslie Wong
(74) *Attorney, Agent, or Firm*—Brouse McDowell; Heather M. Barnes

(57) ABSTRACT

A system and method for privatizing computer data involves the steps of opening a plurality of original data files, fragmenting said original data files into fragments, and interspersing said fragments among each other forming composite files (privacy protected files). The method then includes the steps of creating a reconstitution file, which identifies hidden dispersion locations and placement of individual fragments to reconstruct the original data files. Finally, the composite files are dispersed to hidden locations. To enhance security, each fragment may be disguised through a multiplicity of high speed mathematical operations, which are directed by a fragment handling guide drawn from a random table, before interspersing fragments in the composite files.

51 Claims, 40 Drawing Sheets

Microfiche Appendix Included
(1 Microfiche, 76 Pages)

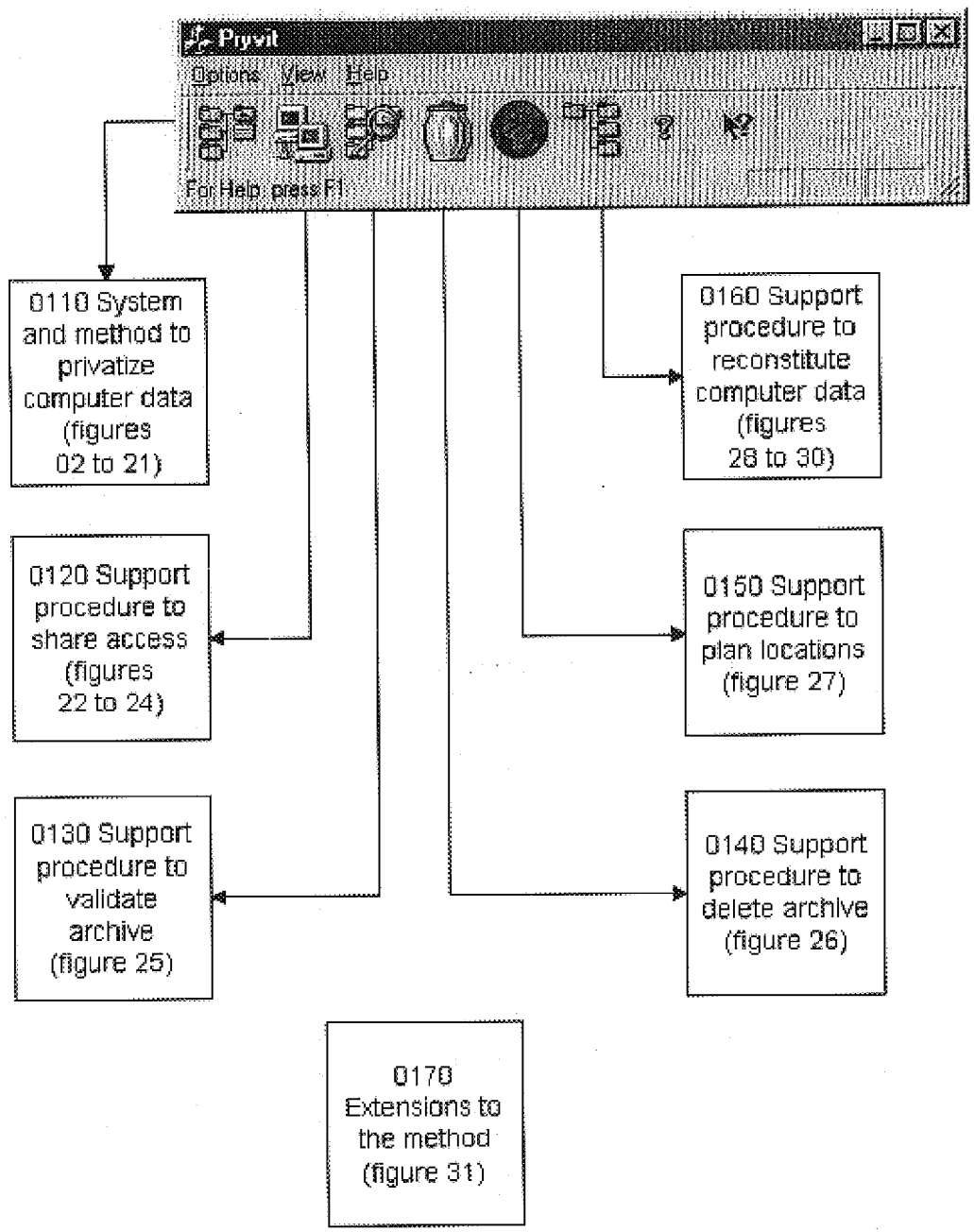

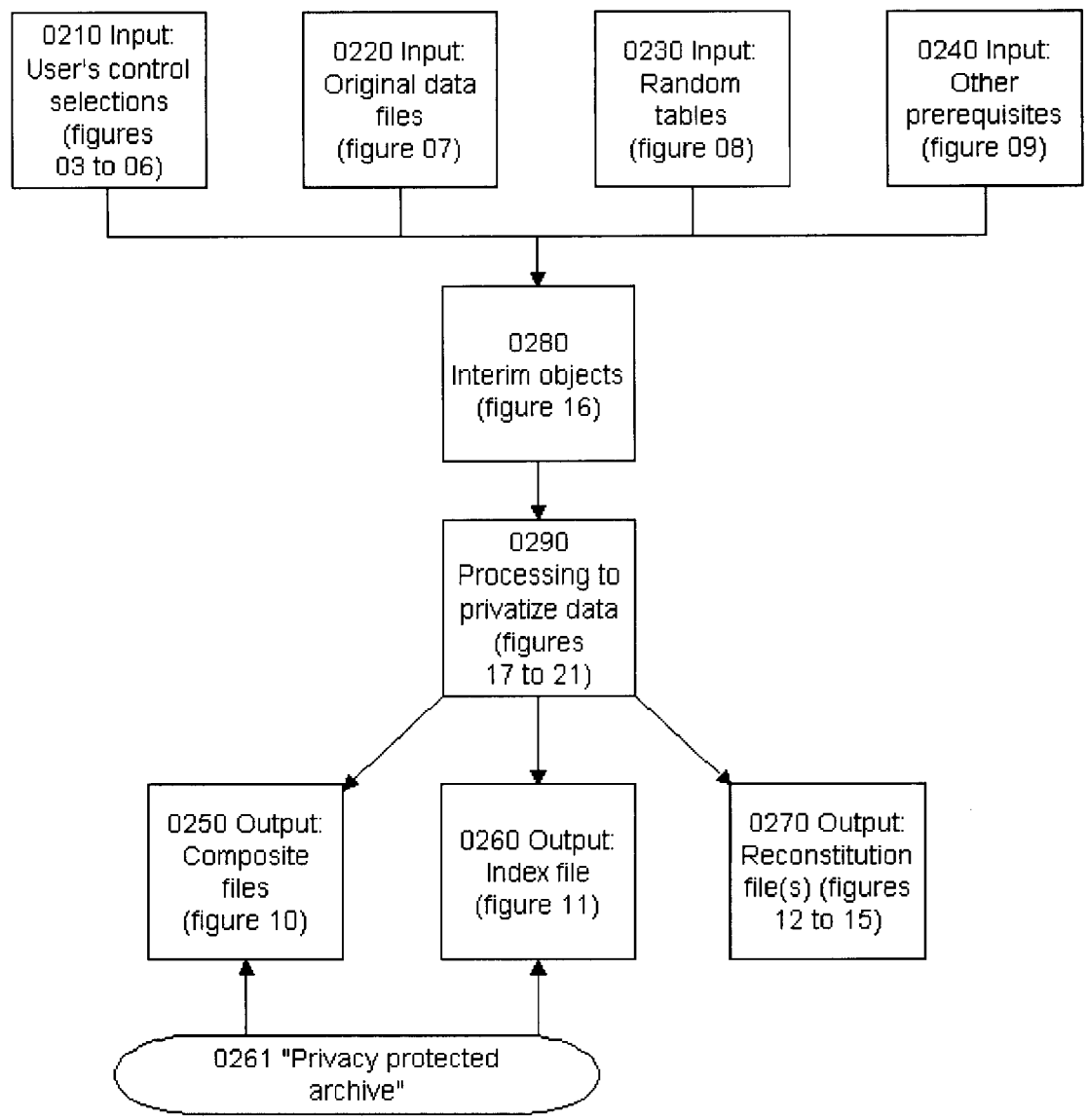
Figure 02: System and method to privatize computer data (0110)

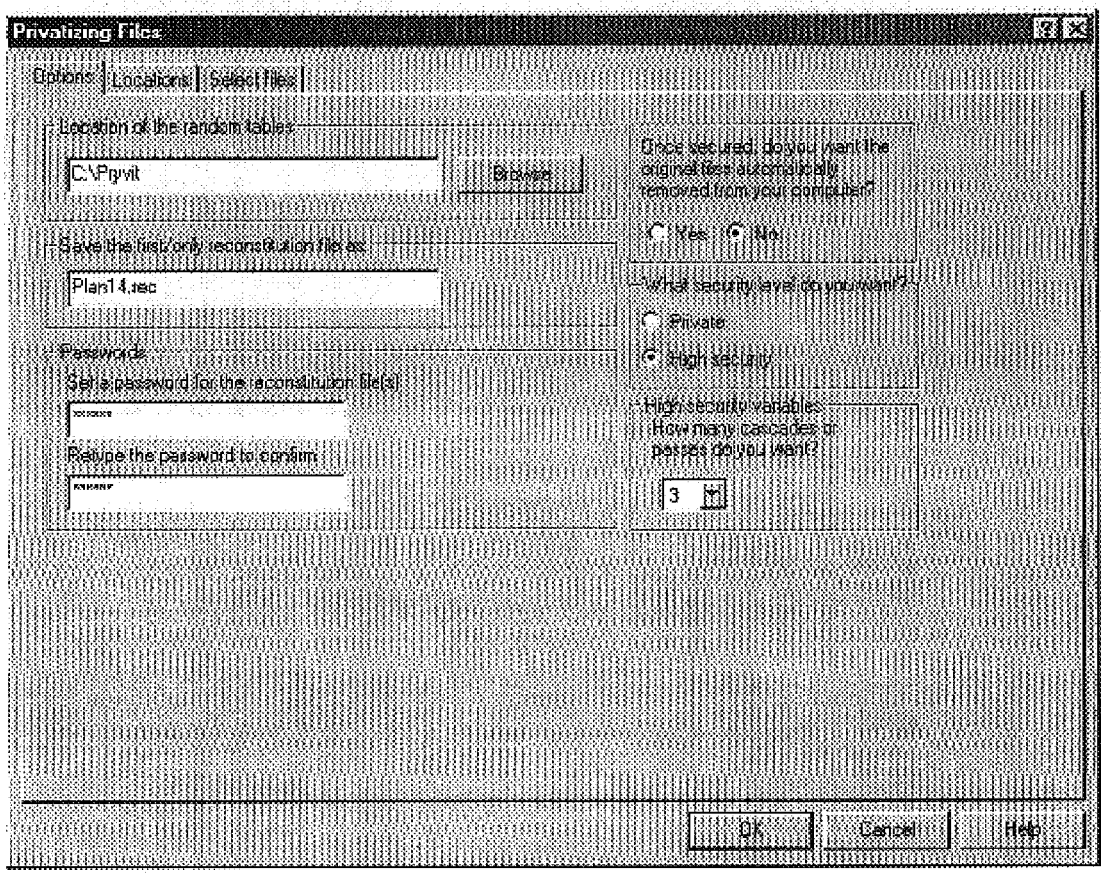
Figure 03: User's control selections (0210)
Privatizing files -- options dialog Figure 04: User's control selections (0210)
Privatizing files -- locations dialog
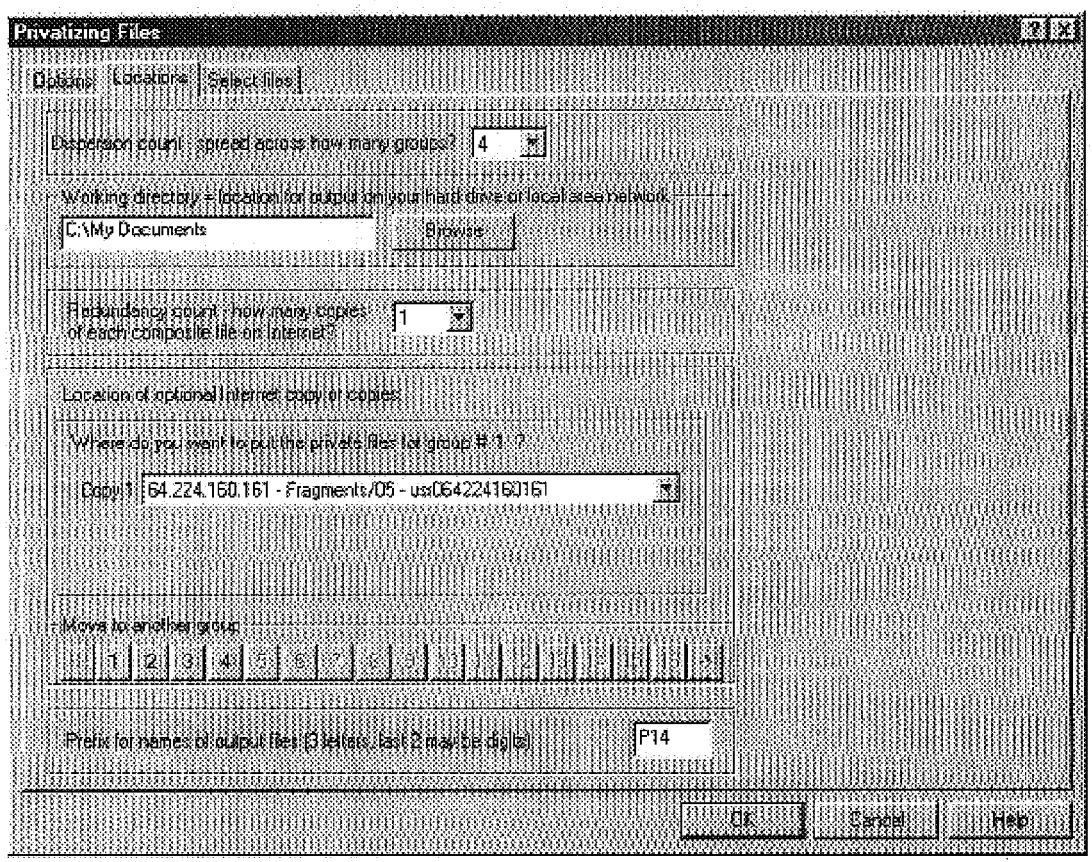
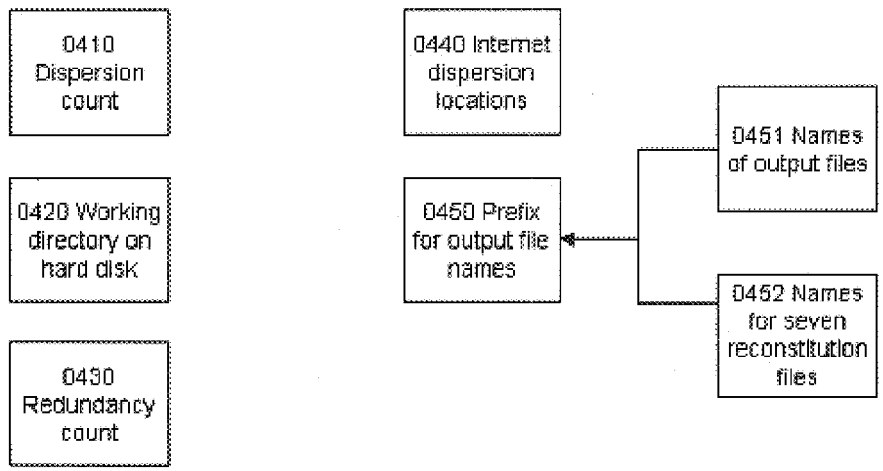

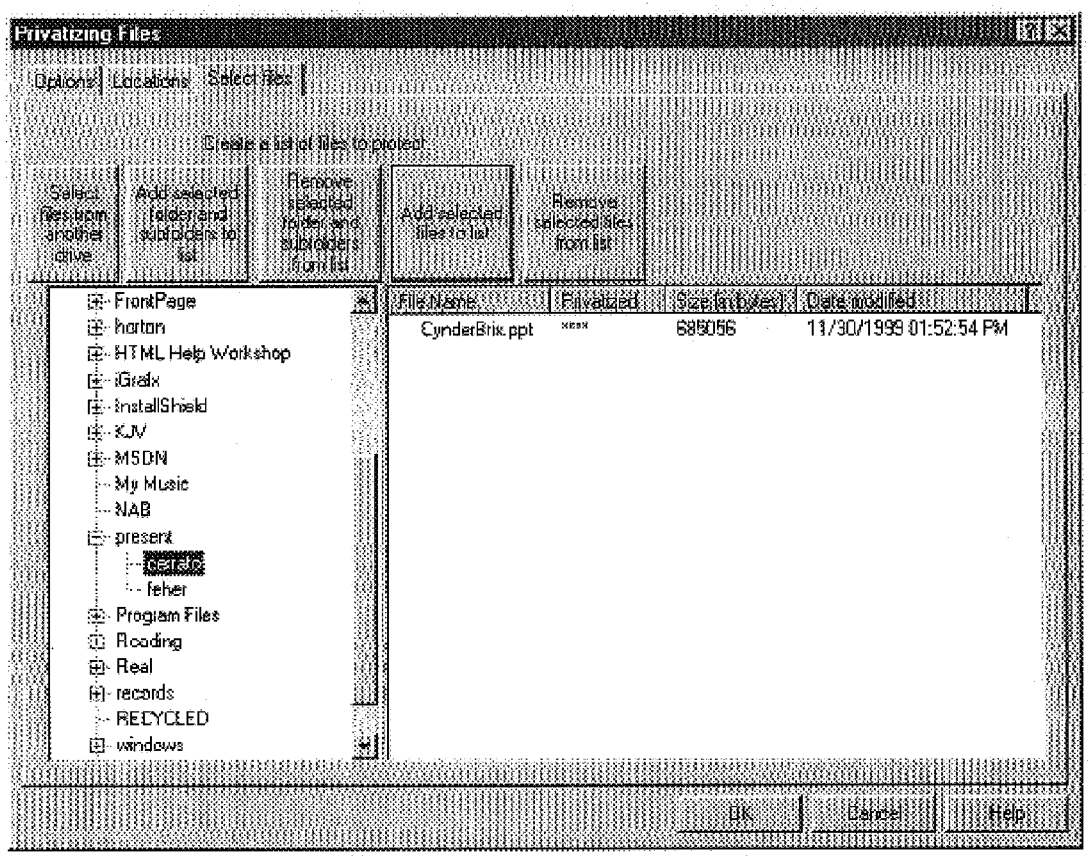
Figure 05: User's control selections (0210)
Privatizing files -- select files dialog

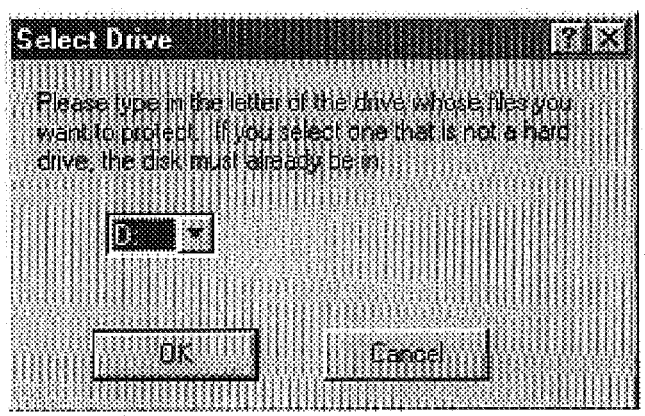
Figure 06: Select alternate drive dialog (0511)
0610 Drive holding original data files
0620 OK button
0630 Cancel button

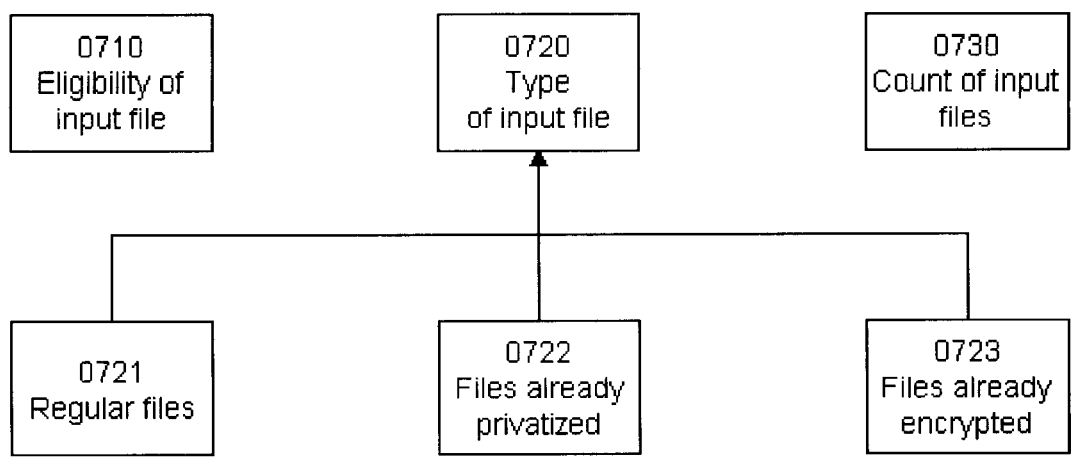
Figure 07: Original data files (0220)

Figure 08: Random tables (0230)

| 0810 Source of random tables | 0820 Size of random tables | 0830 Names and identifiers |

| 0840 Content of random tables | 0850 Count of random tables |

Figure 09: Other prerequisites to privatize data (0240)
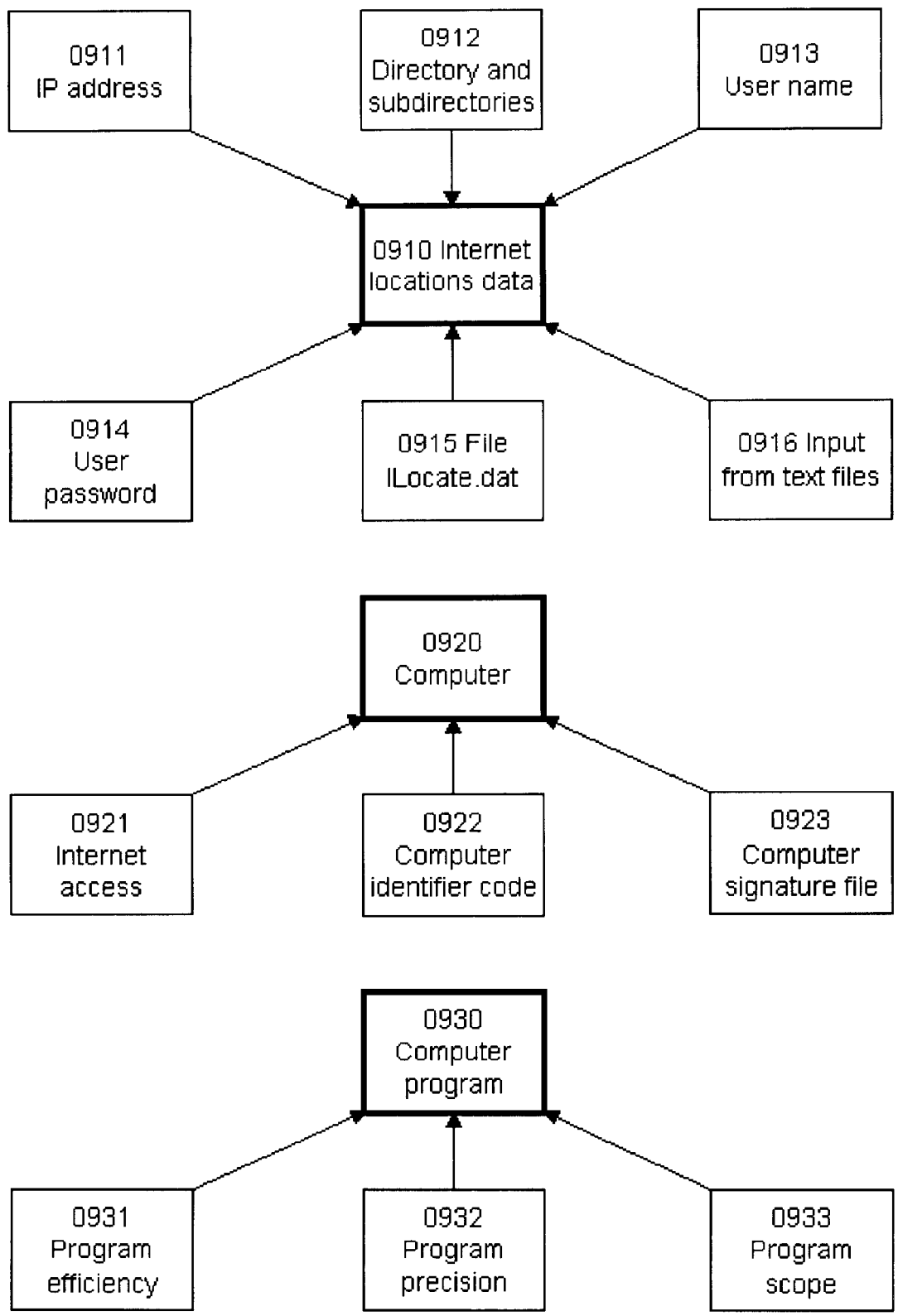

Figure 10: Output -- Composite files (0250)

| 1010 Content of composite files | 1020 Size of composite files | 1030 Count of composite files | 1040 Names of composite files |
|---|---|---|---|

Figure 11: Output -- Index file (0260)
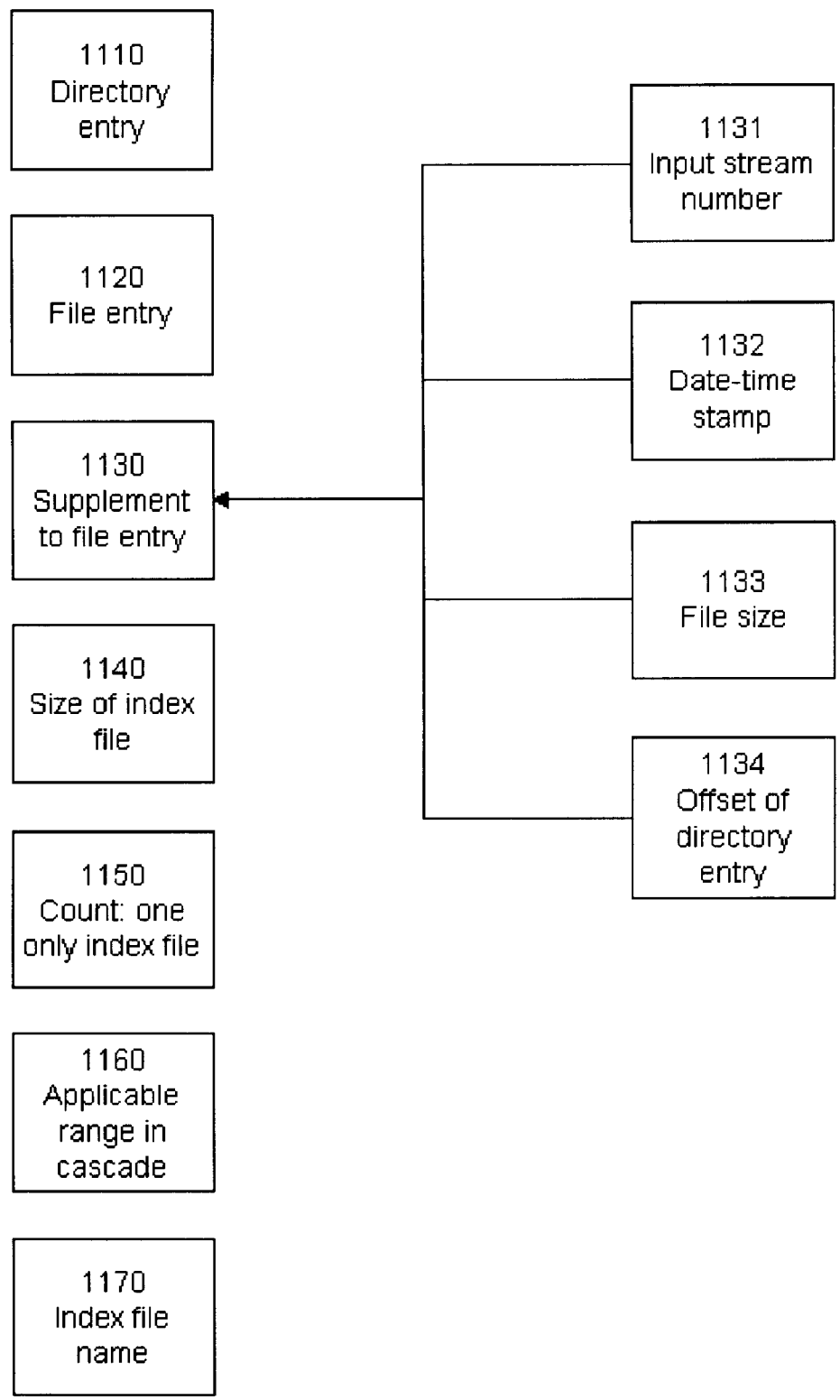

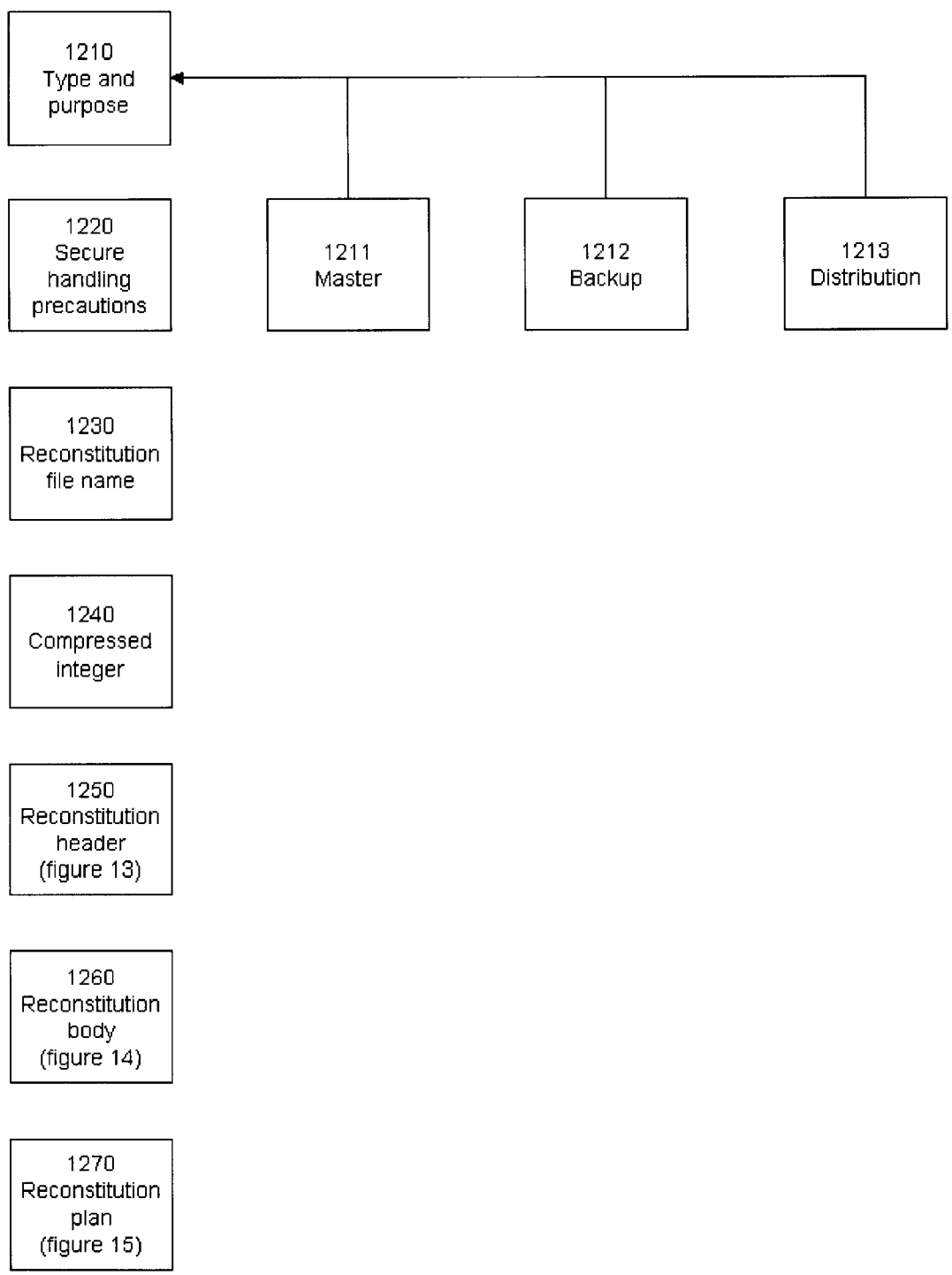
Figure 12: Output -- Reconstitution files (0270)

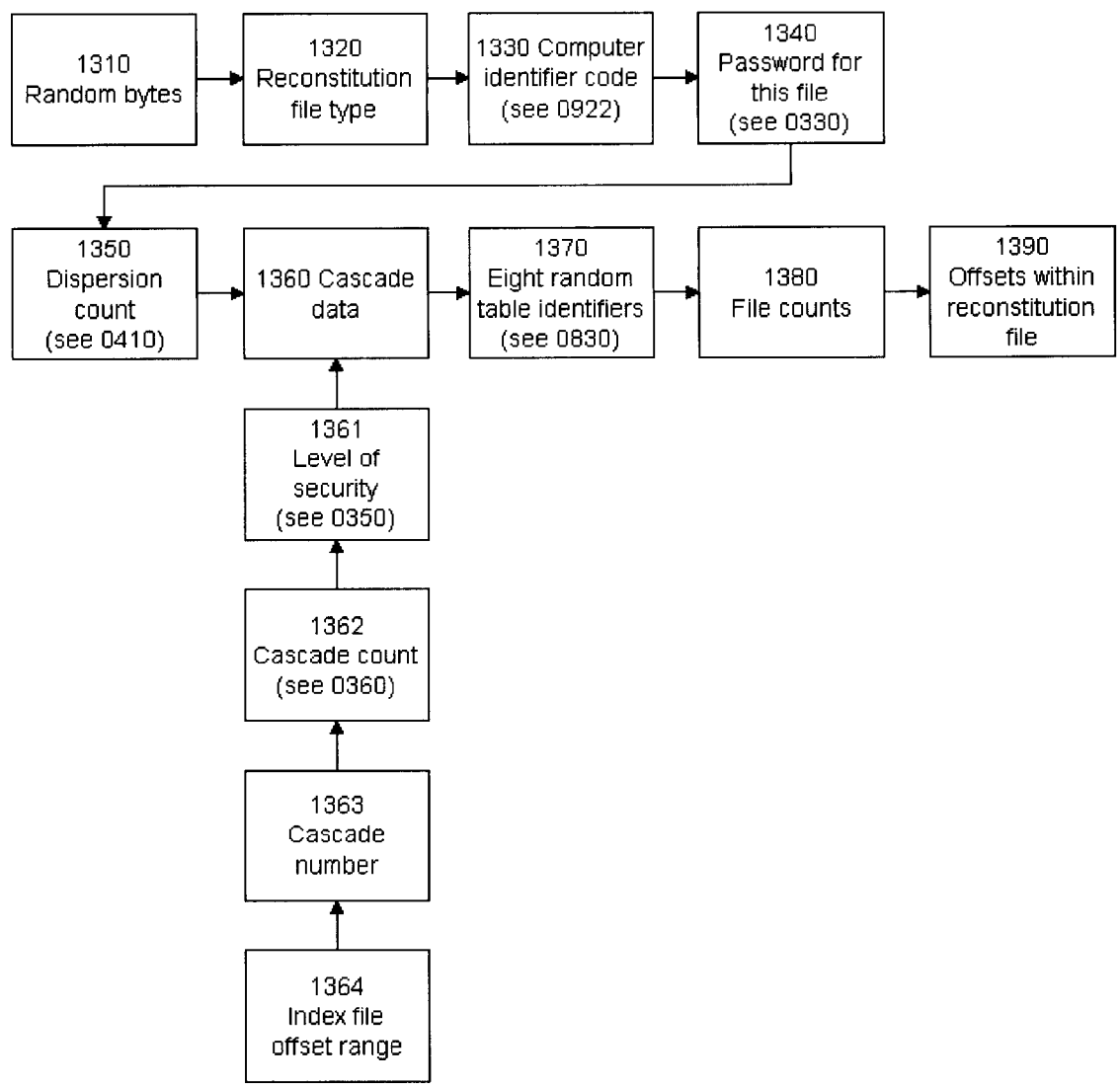
Figure 13: Reconstitution header (1250)

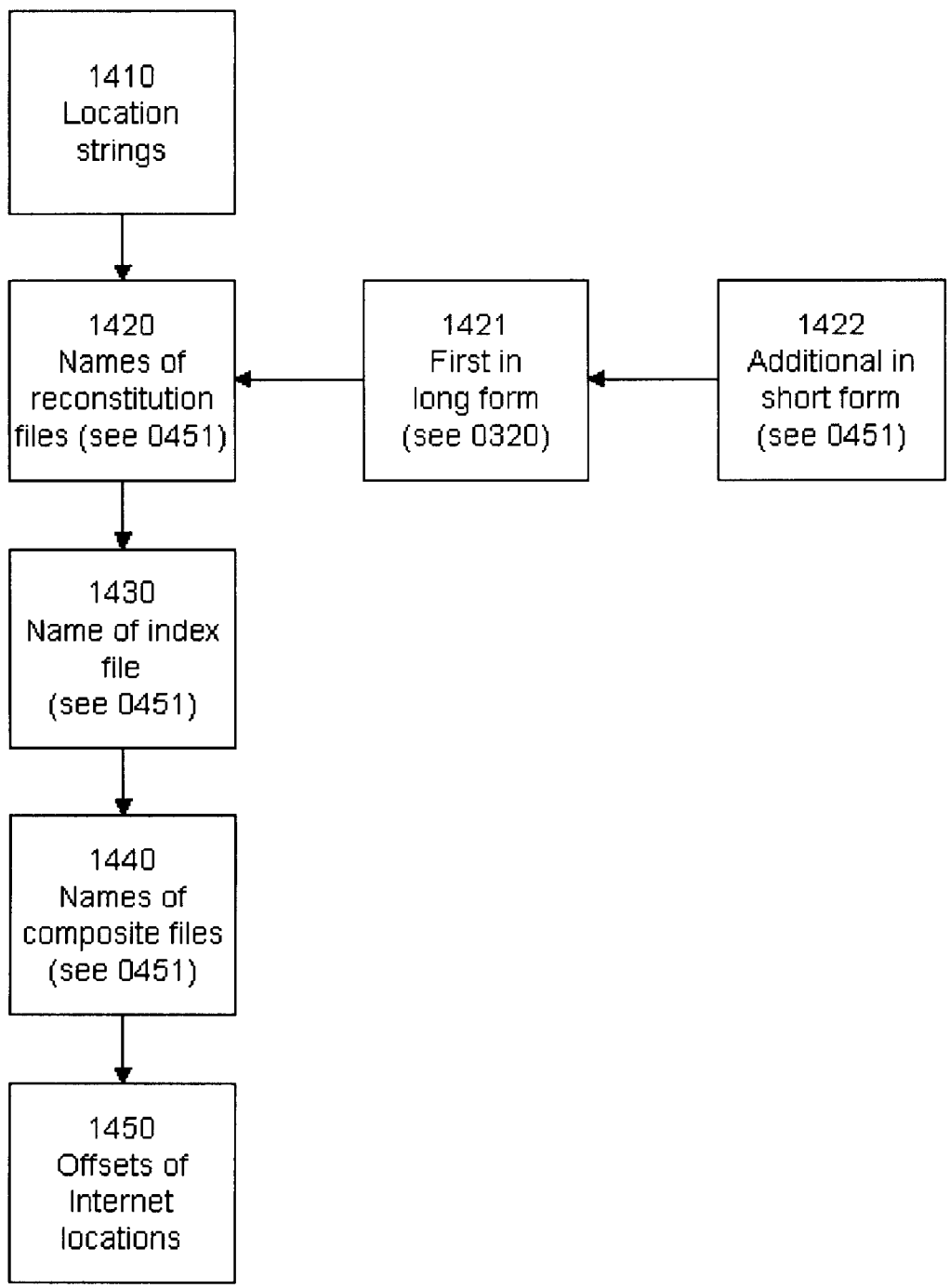
Figure 14: Reconstitution body (1260)

Figure 15: Elements of the reconstitution plan (1270)
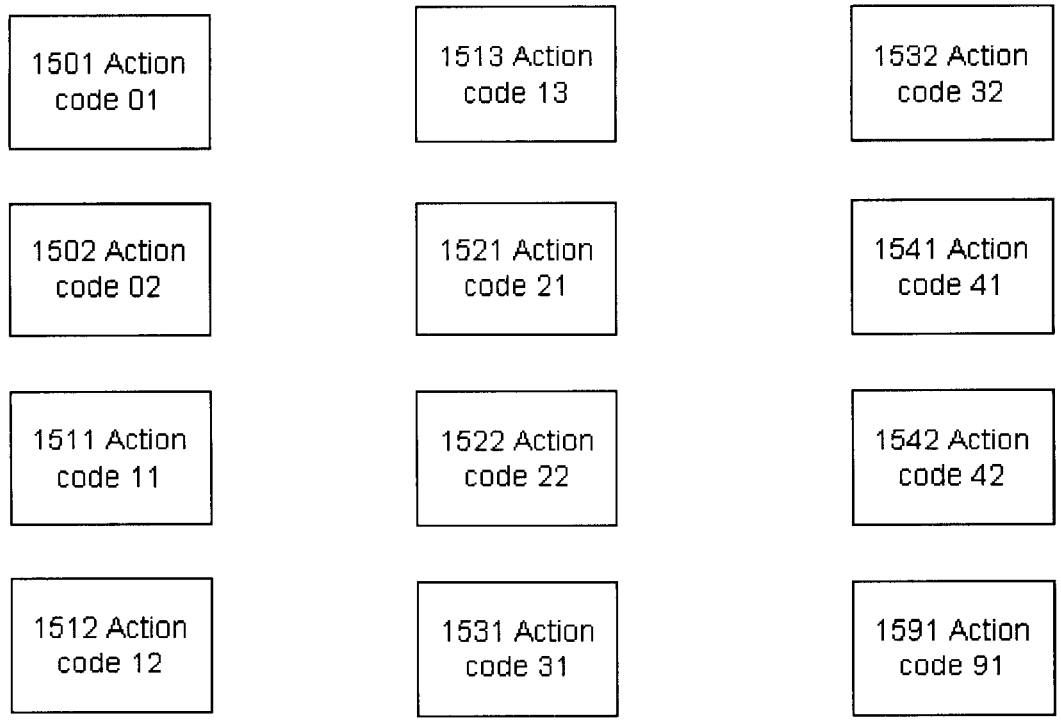

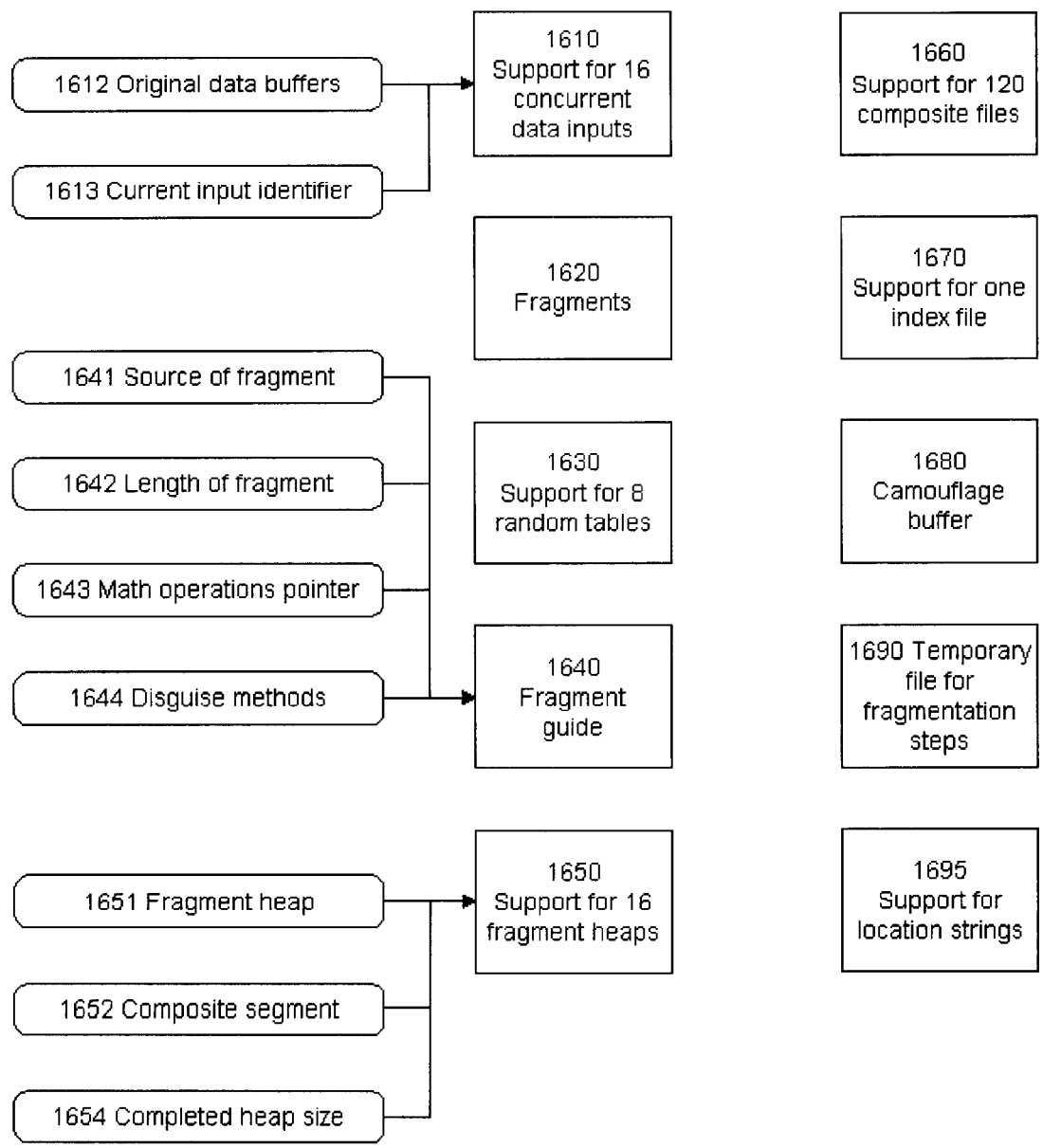
Figure 16: Intermediate objects (0280)

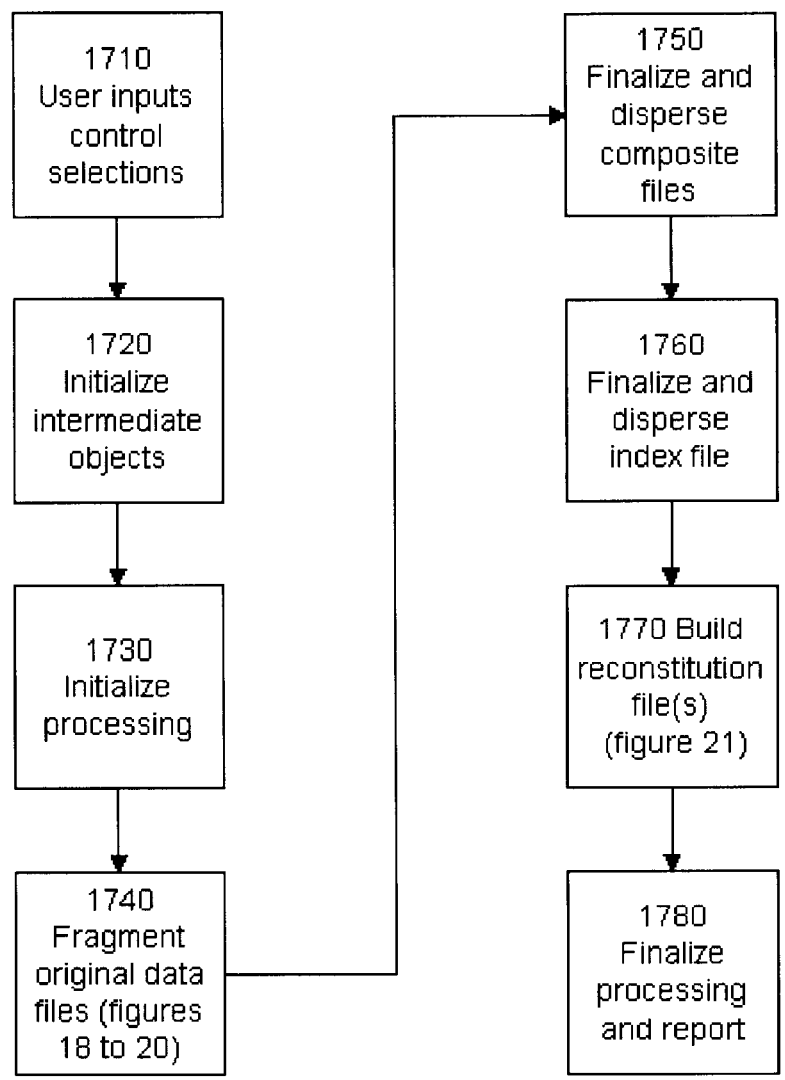
Figure 17: Processing to privatize computer data (0290)

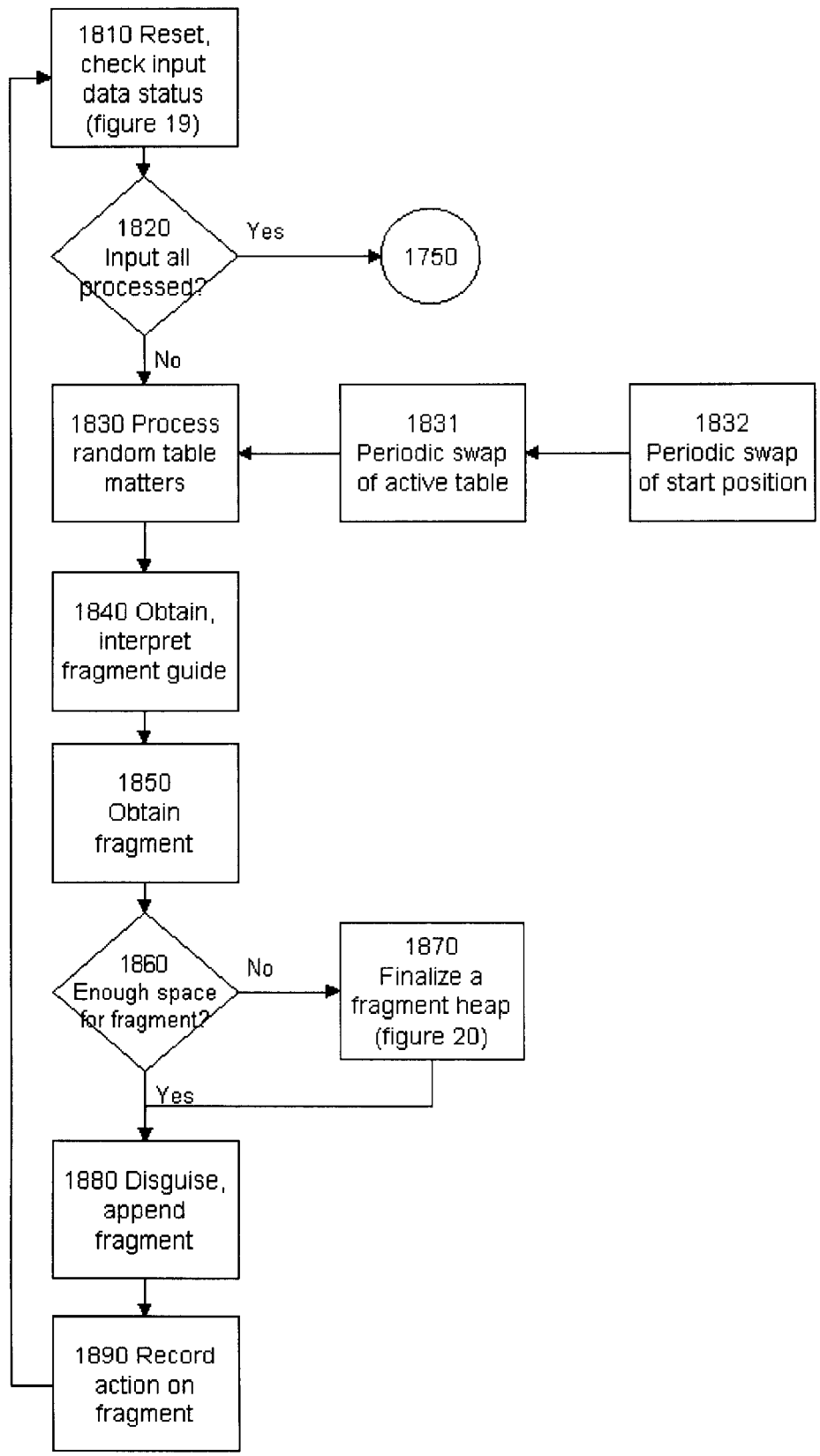
Figure 18: Fragment original data files (1740)

Figure 19: Reset, check input data status (1810)
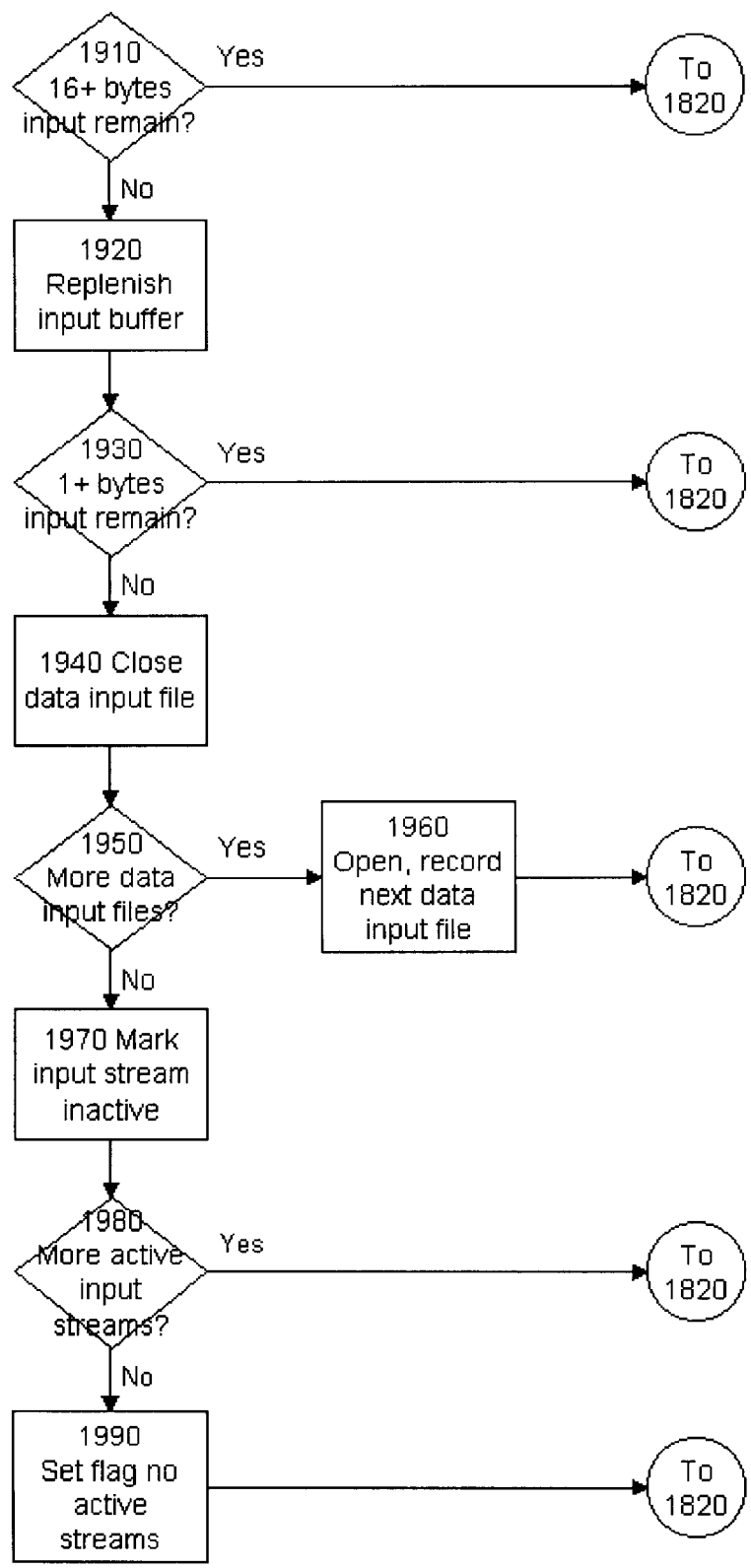

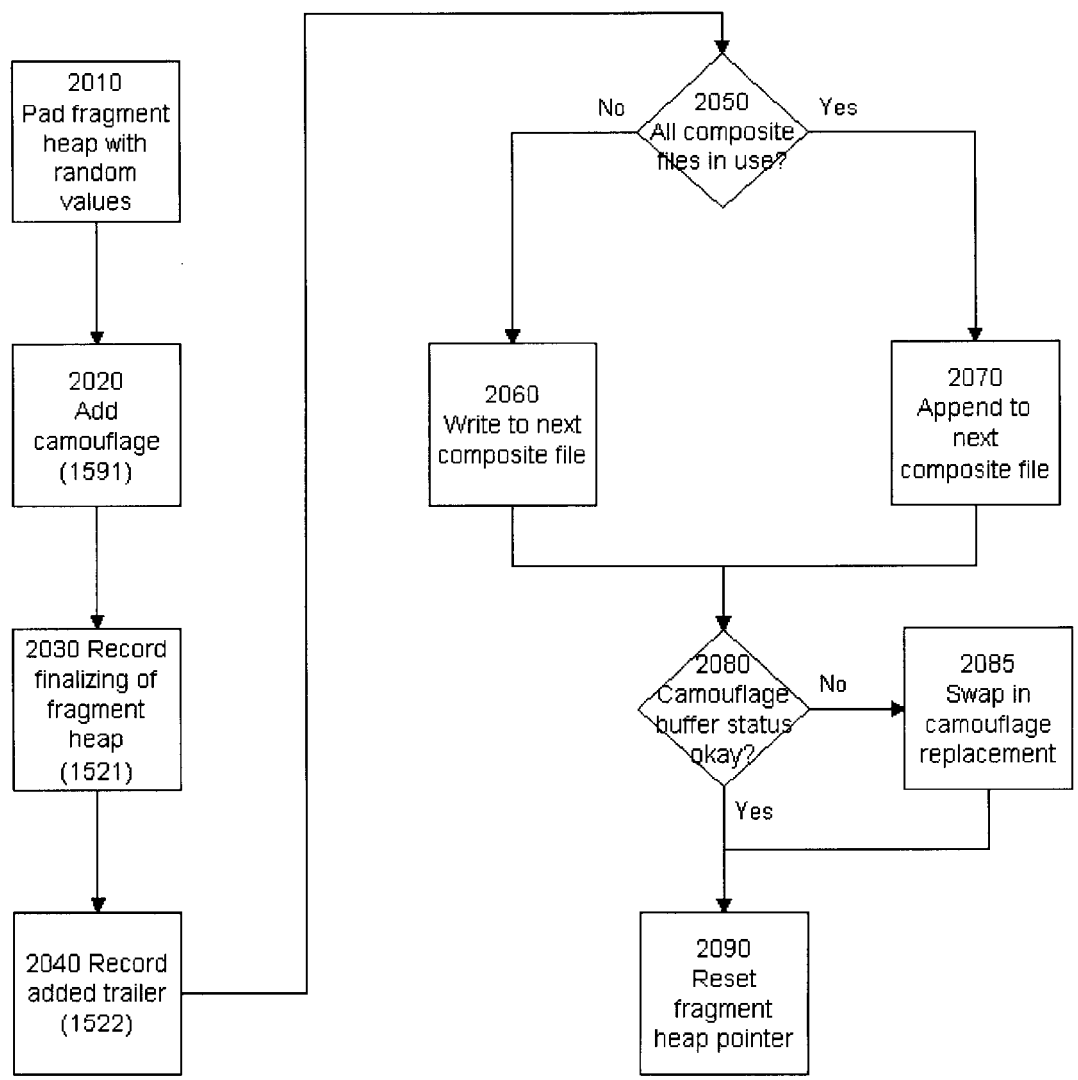
Figure 20: Finalize a fragment heap (1870)

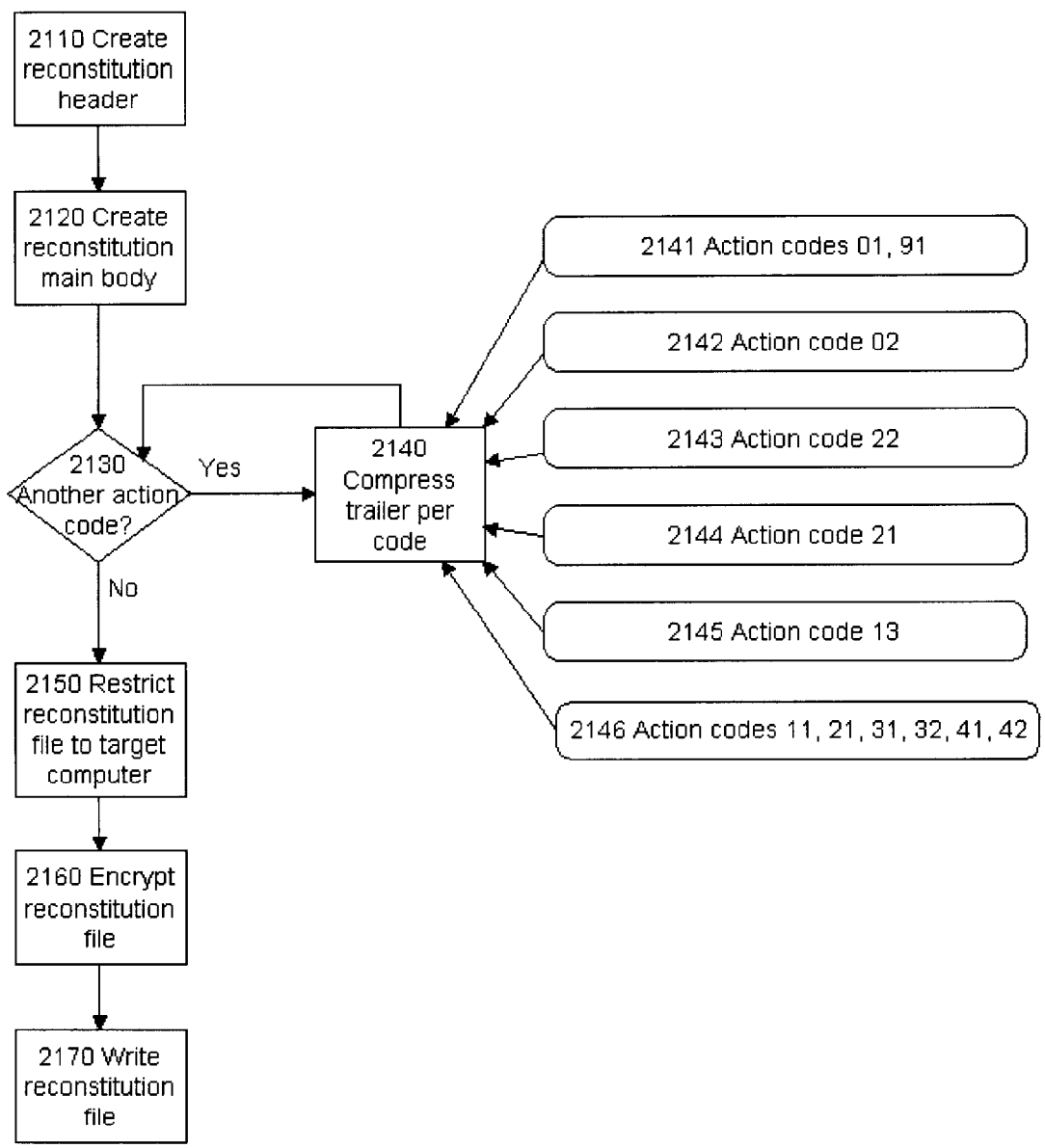
Figure 21: Build a reconstitution file (1770)

Figure 22: Support procedure to share access (0120)
Requester sends signature file (Marpex dialog)
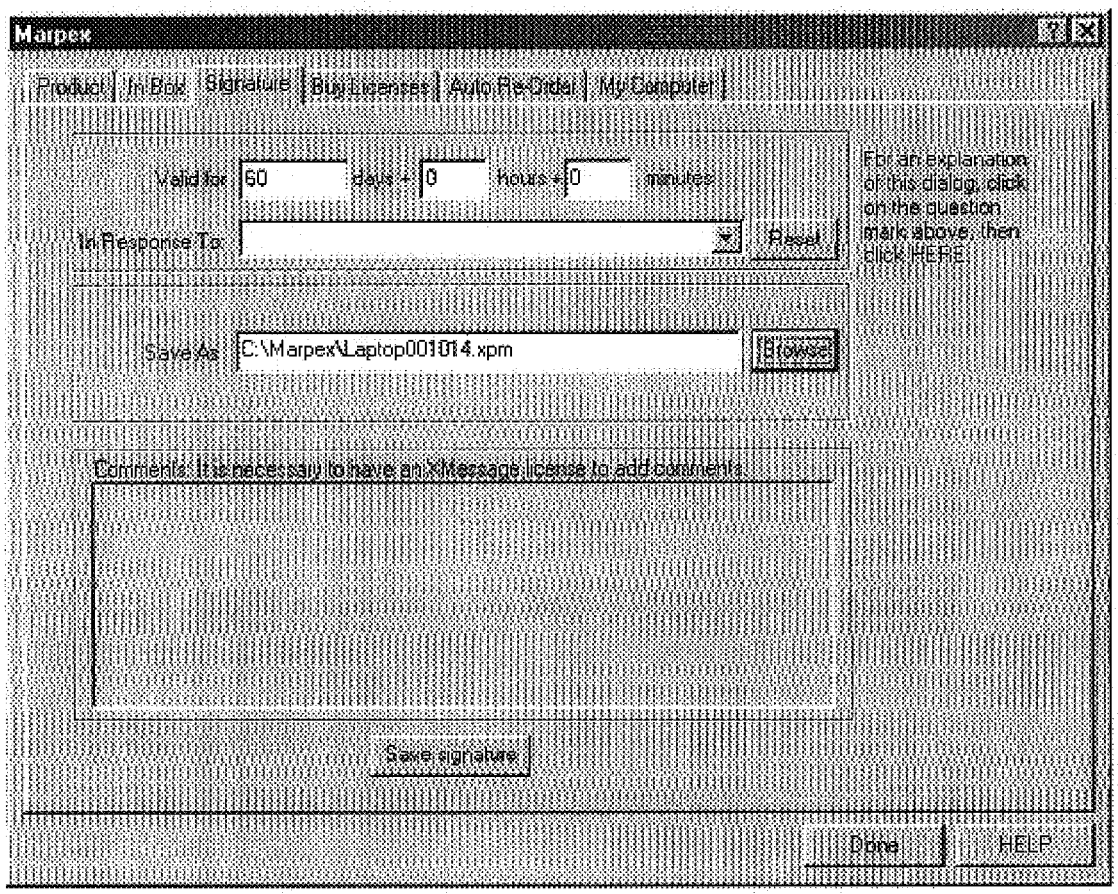
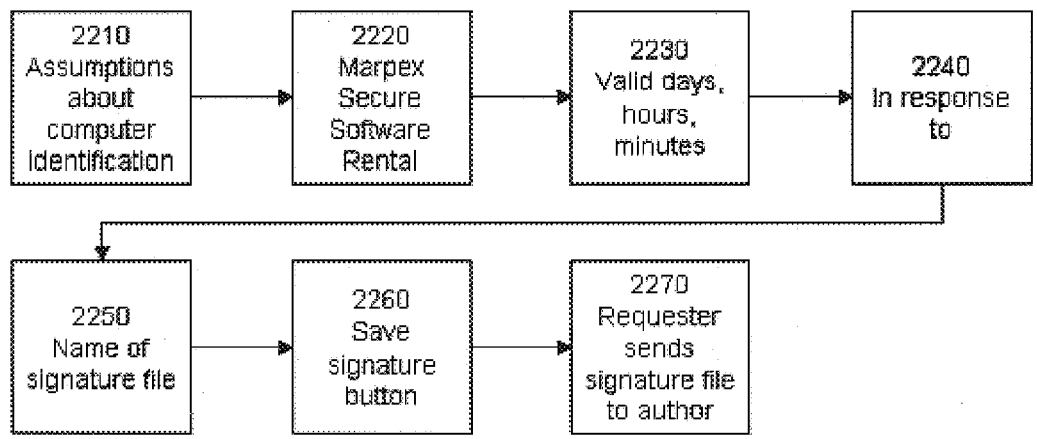

Figure 23: Support procedure to share access (0120)
Author enters sharing control selections
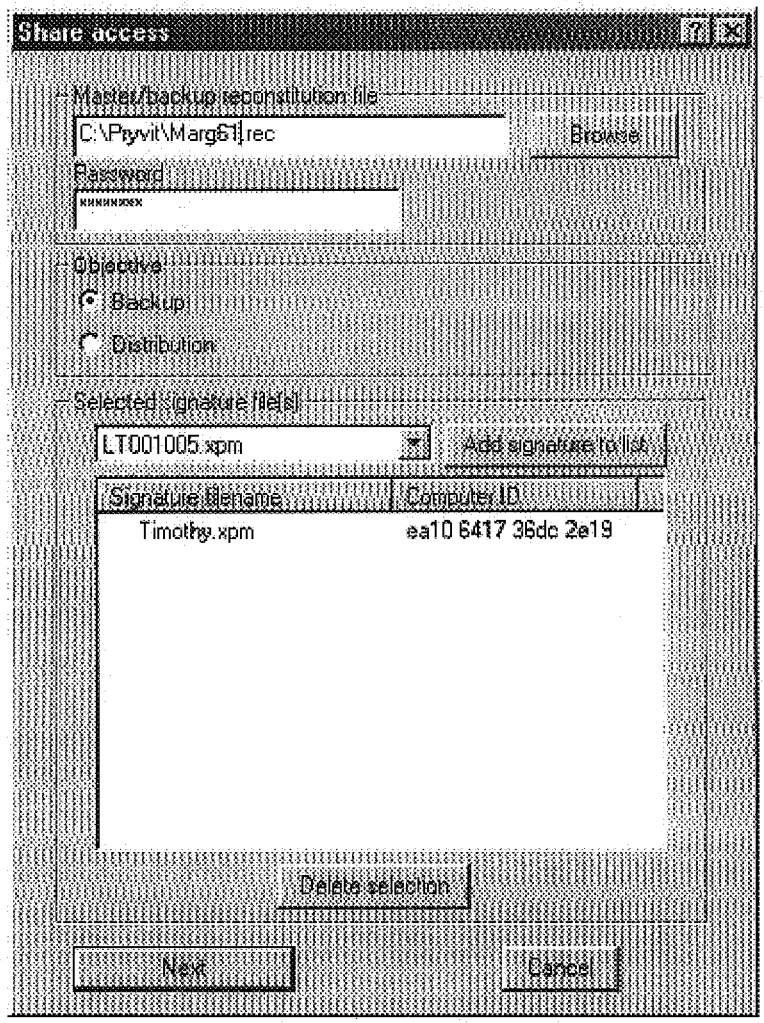
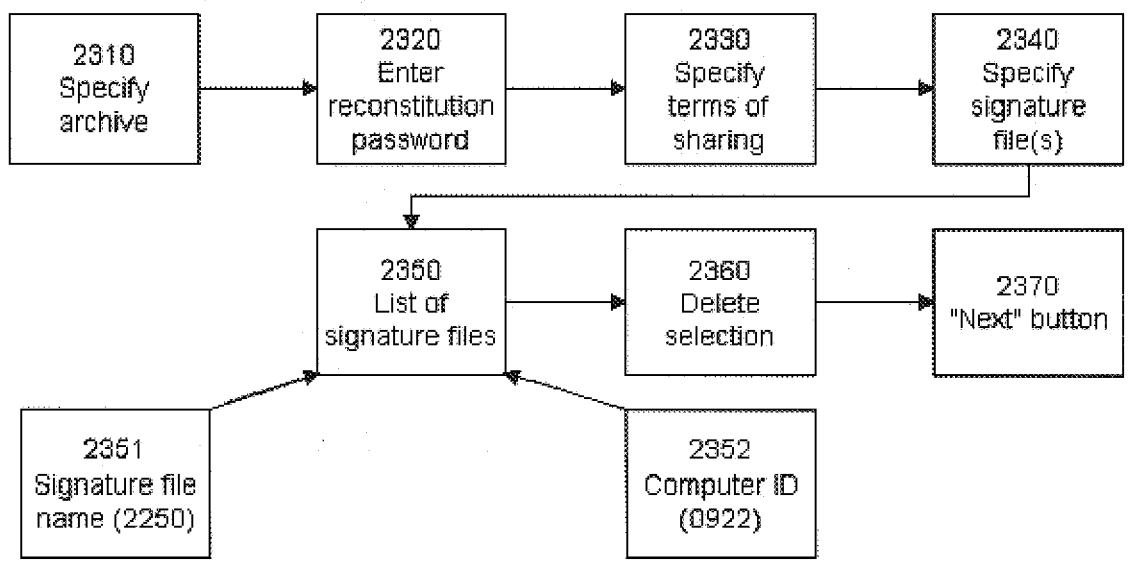

**Figure 24: Support procedure to share access (0120)
Author specifies passwords for reconstitution copies**
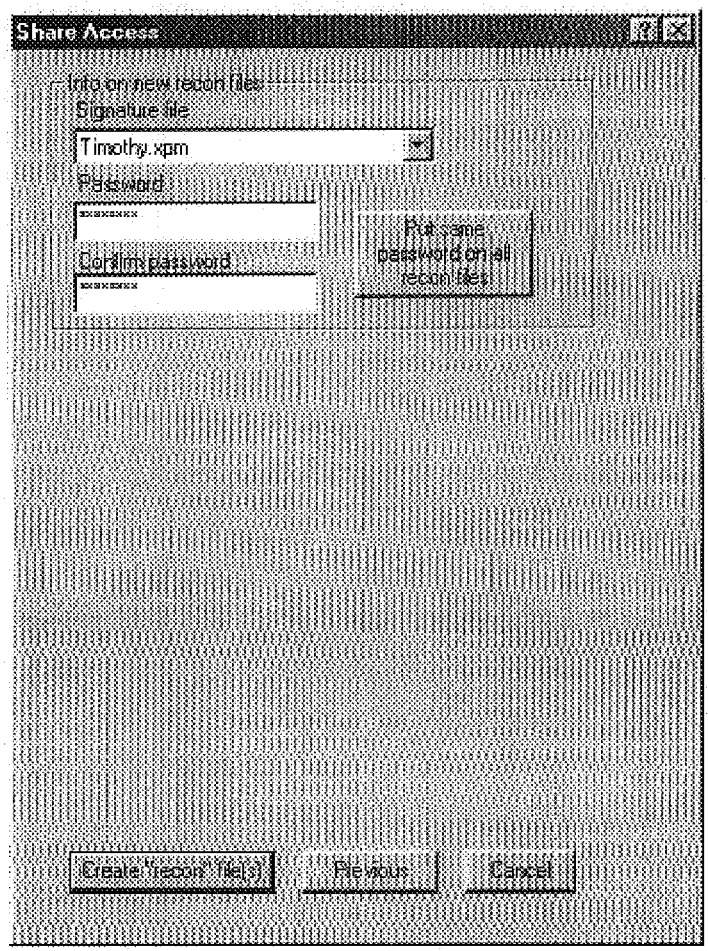
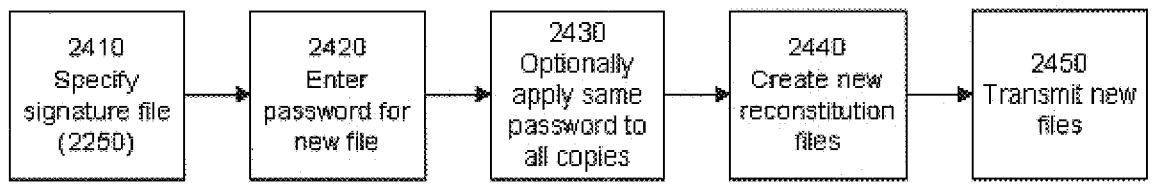

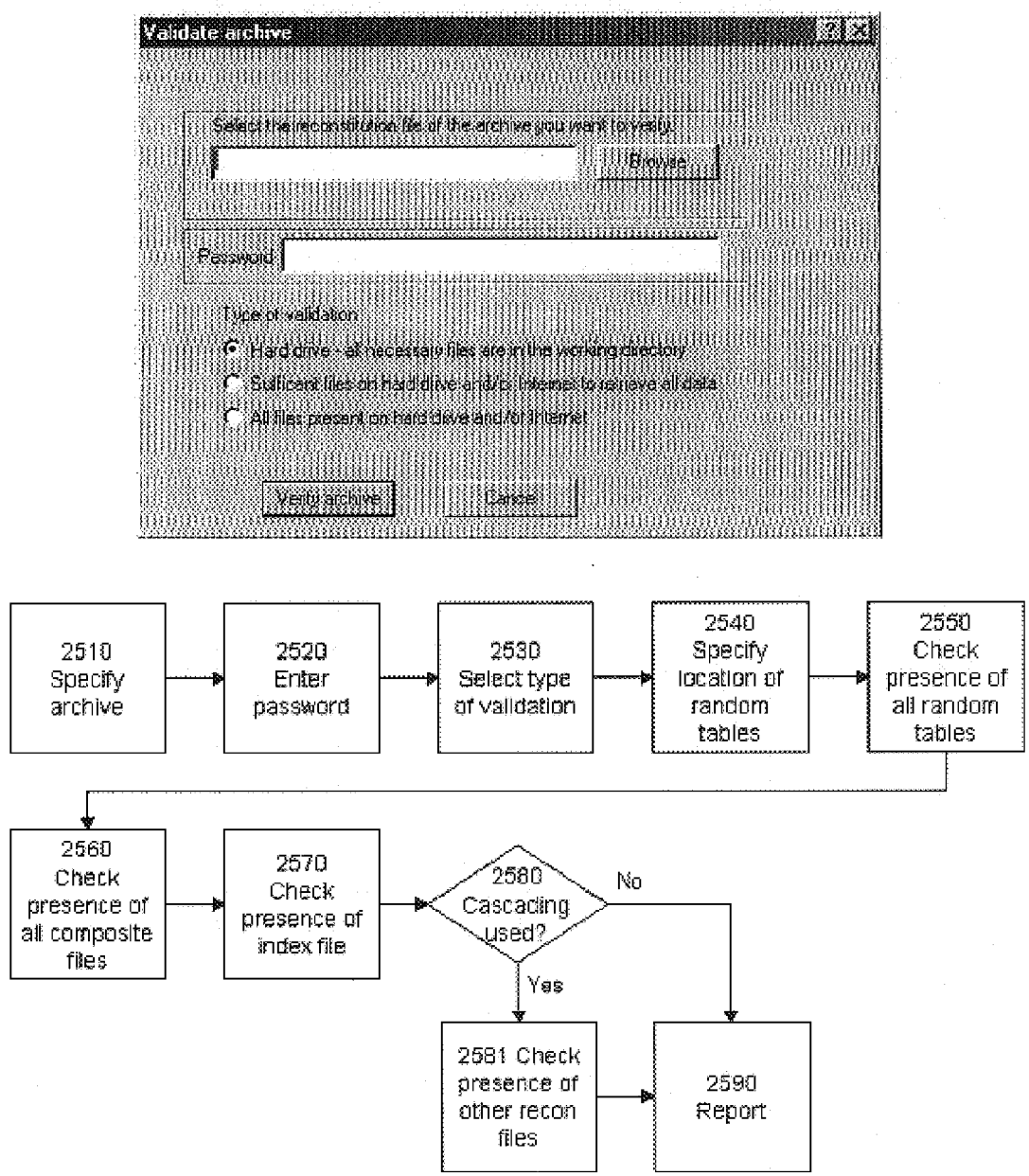
Figure 25: Support procedure to validate archive (0130)

Figure 26: Support procedure to delete archive (0140)
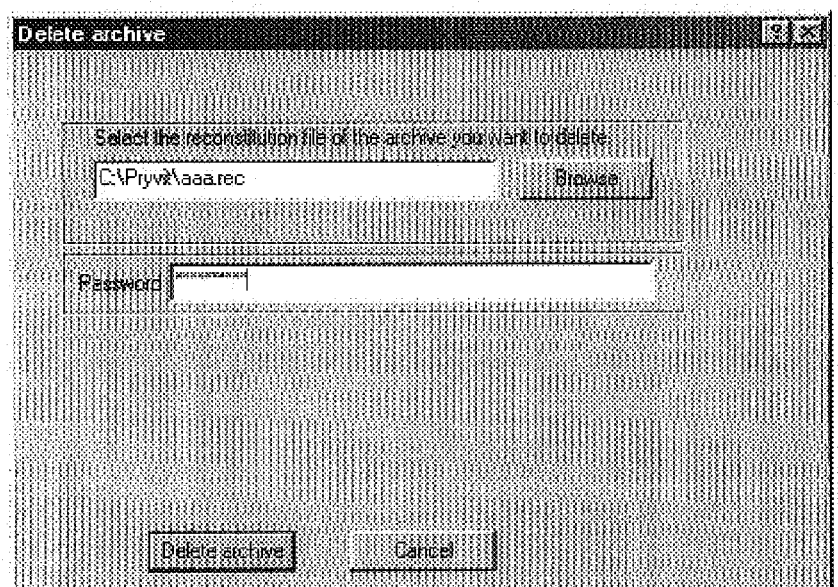
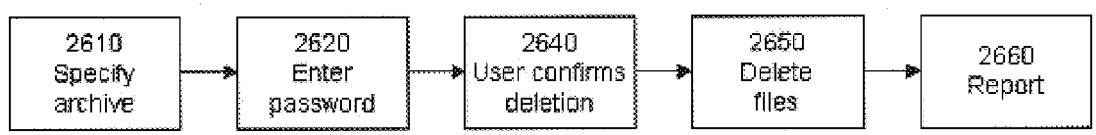

Figure 27: Support procedure to plan locations (0150)
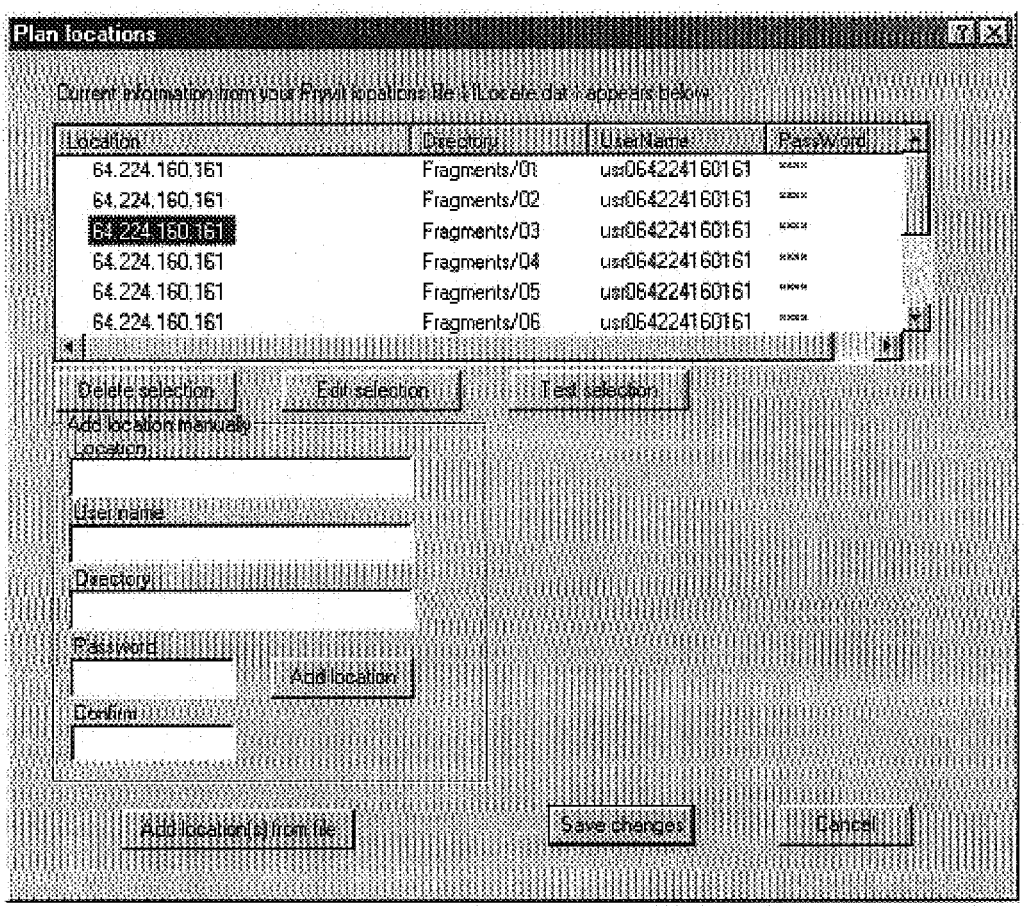
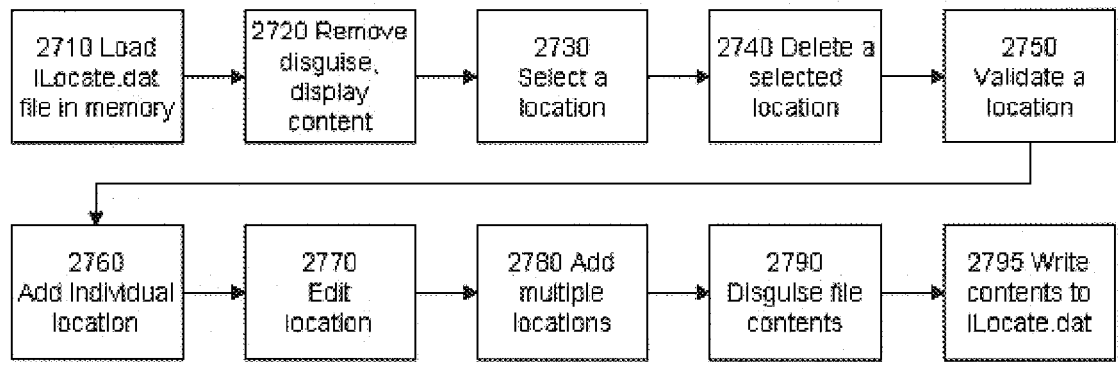

**Figure 28: Support procedure to reconstitute files (0160)
Select archive dialog**
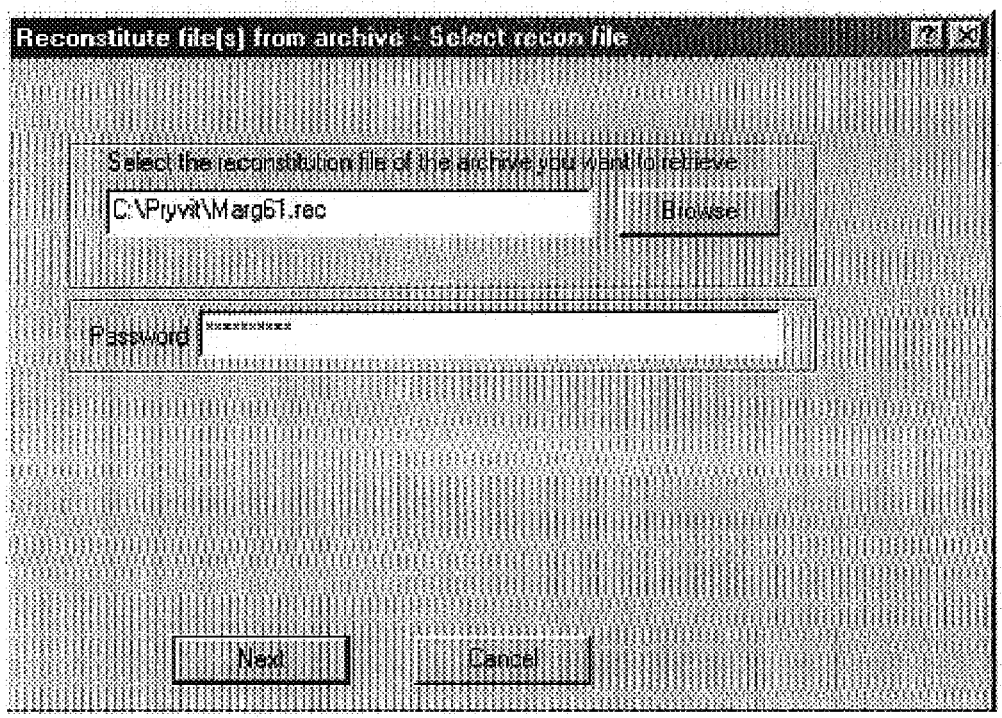

Figure 29: Support procedure to reconstitute files (0160)
Options dialog
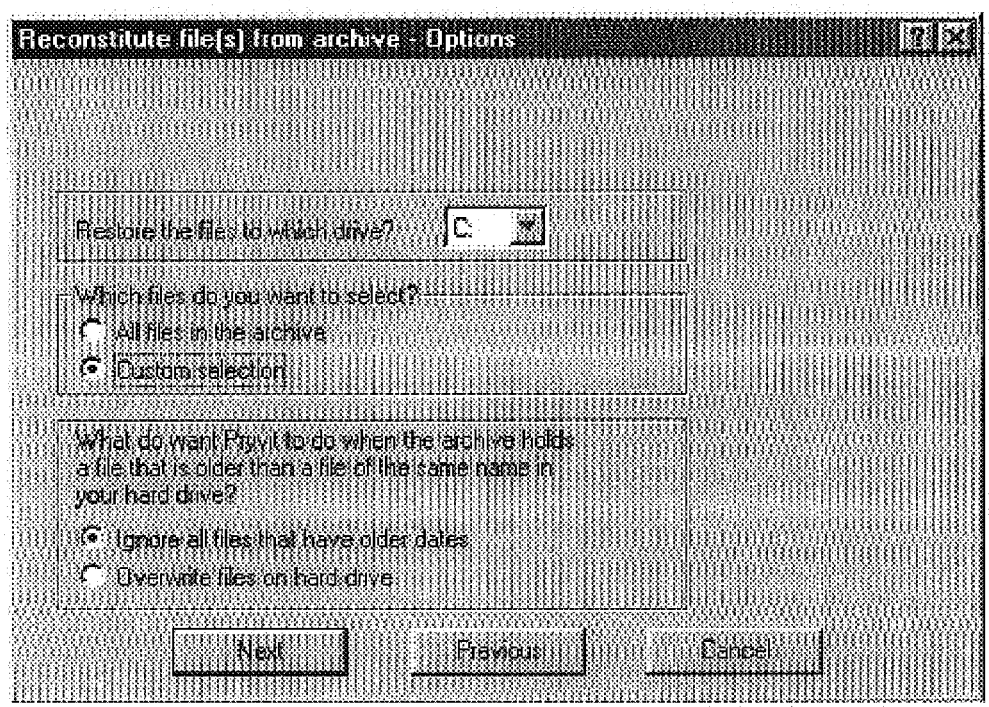

**Figure 30: Support procedure to reconstitute files (0160)
File selection and processing**
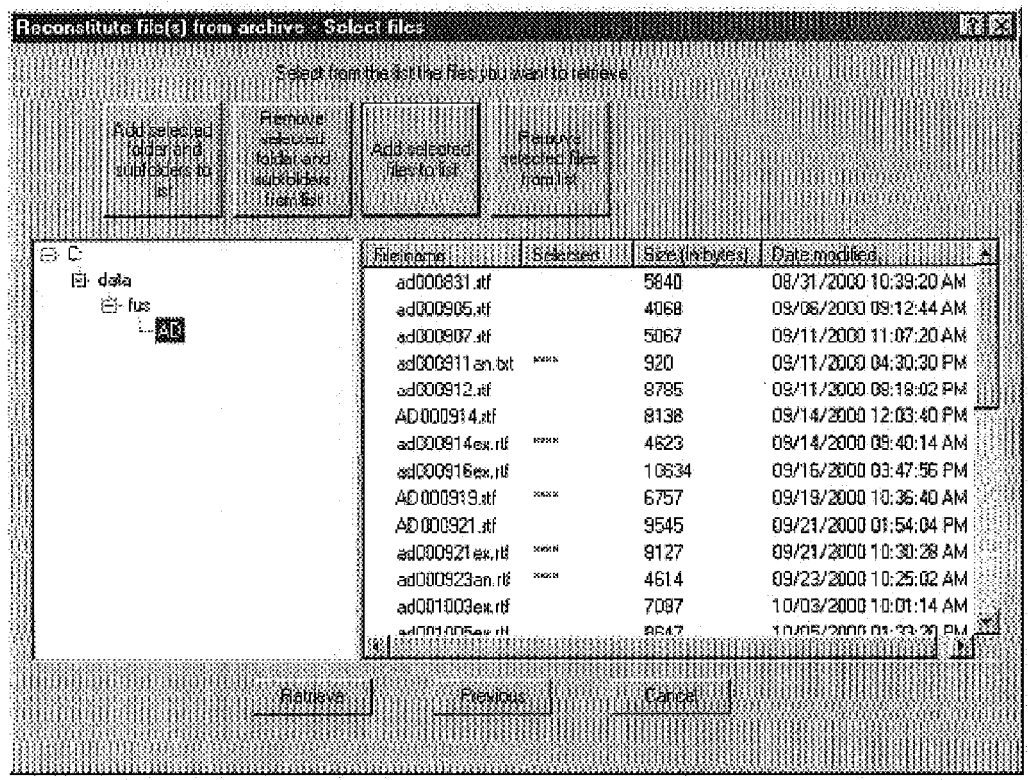
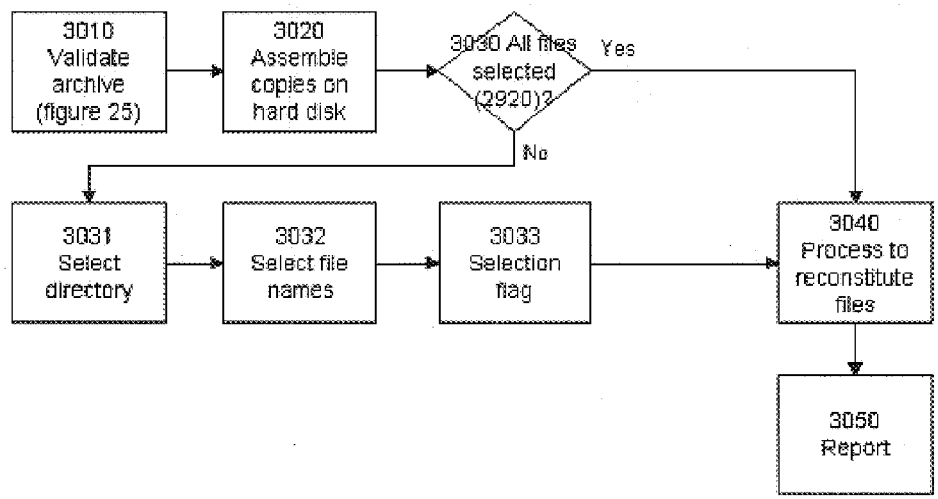

Figure 31: Extensions to the method (0170)
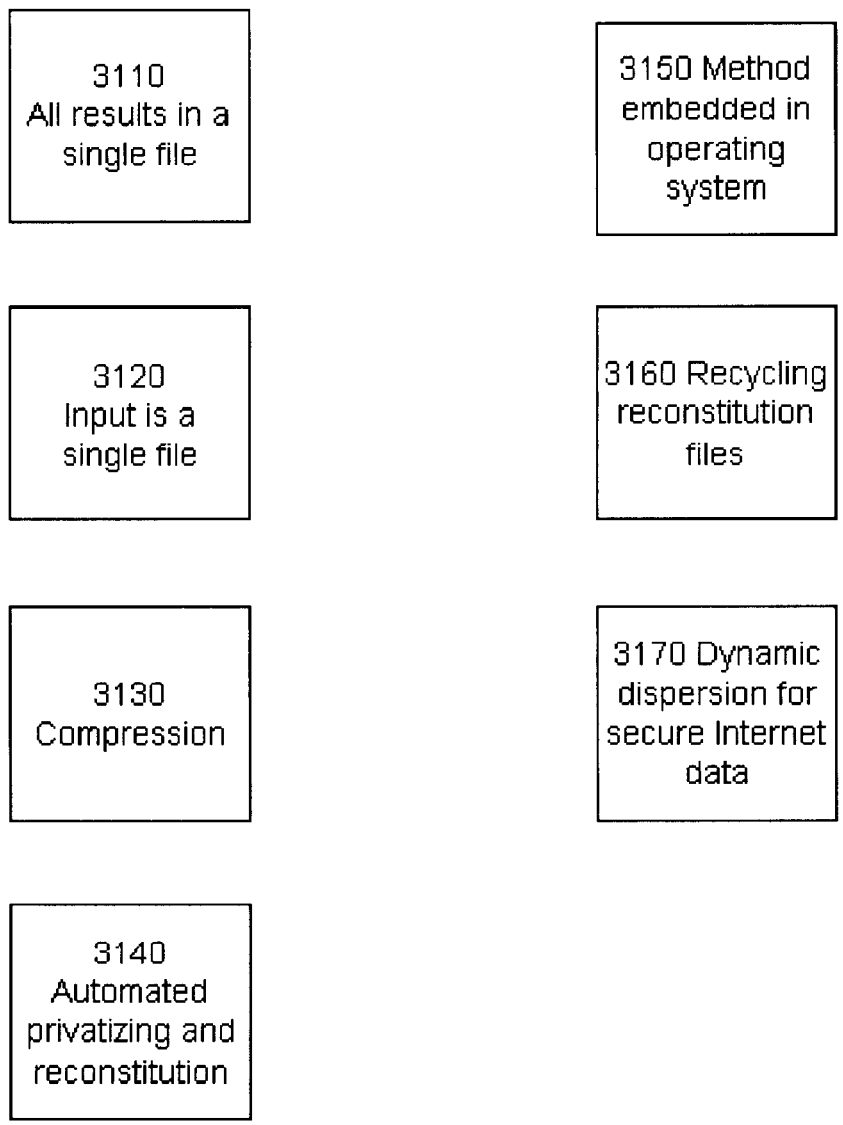

Figure 32: Listing of all figures and patent reference codes

Figure 01: Program to privatize computer data

0110 System and method to privatize computer data (fig 02 to 21)
0120 Support procedure to share access (fig 22 to 24)
0130 Support procedure to validate archive (fig 25)
0140 Support procedure to delete archive (fig 26)
0150 Support procedure to plan locations (fig 27)
0160 Support procedure to reconstitute files (fig 28 to 30)
0170 Extensions to the method (fig 31)

Figure 02: System and method to privatize computer data (0110)

0210 Input: User's control selections (fig 03 to 06)
0220 Input: Original data files (fig 07)
0230 Input: Random tables (fig 08)
0240 Input: Other prerequisites to privatize data (fig 09)
0250 Output: Composite files (fig 10)
0260 Output: Index file (fig 11)
0261 Output: Privacy protected archive
0270 Output: Reconstitution file(s) (fig 12 to 15)
0280 Interim objects (fig 16)
0290 Processing to privatize computer data (fig 17 to 21)

Figure 03: User's control selections (0210)
Privatizing files -- options dialog 0310 Directory containing random tables
0320 Name of first reconstitution file
0330 Password for reconstitution files
0340 Option whether original data files to be automatically removed
0350 Level of security
0360 Count of cascades, 1 to 7
0361 Single pass fragmentation
0362 Multiple pass cascading fragmentation

Figure 04: User's control selections (0210)
Privatizing files -- locations dialog 0410 Dispersion count
0420 Working directory on hard disk
0430 Redundancy count

Figure 32, page 1

0440 Input -- Internet dispersion locations
0450 Prefix for output file names
0451 Names of output files
0452 Names for 7 output reconstitution files Figure 05: User's control selections (0210)
Privatizing files -- select files dialog 0510 Selection buttons
0511 Select files from another drive (fig 06)
0512 Add selected folder and subfolders to list
0513 Remove selected folder and subfolders from list
0514 Add selected files to list
0515 Remove selected files from list
0520 Current selection list of original data files
0530 Directory location
0540 Data input file name
0550 Privatize flag
0560 File size
0570 File date and time Figure 06: Select alternate drive dialog (0511)

0610 Drive holding original data files
0620 OK button
0630 Cancel button

Figure 07: Original data files (0220)

0710 Eligibility
0720 Type
0721 Regular files
0722 Files already privatized
0723 Files already encrypted
0730 Count Figure 08: Random tables (0230)

0810 Source of random tables
0820 Size
0830 Names and identifiers
0840 Content
0850 Count

Figure 32, page 2

Figure 09: Other prerequisites to privatize data (0240)

0910 Internet locations data
0911 IP address
0912 Directory and subdirectories
0913 User name
0914 Password
0915 File ILocate.dat
0916 Input from text files
0920 Computer
0921 Internet access
0922 Computer identifier code
0923 Computer signature file
0930 Computer program
0931 Program efficiency
0932 Program precision
0933 Program scope Figure 10: Composite files (0250)

1010 Content of composite files
1020 Size of composite files
1030 Count of composite files
1040 Names of composite files Figure 11: Index file (0260)

1110 Directory entry
1120 File entry
1130 Supplement to file entry
1131 Input stream number
1132 Date-time stamp
1133 File size
1134 Offset of directory entry
1140 Size of index file
1150 Count: one only index file
1160 Applicable range in cascade
1170 Index file name Figure 12: Reconstitution files (0270)

Figure 32, page 3

1210 Type and purpose
1211 Master
1212 Backup
1213 Distribution
1220 Secure handling precautions
1230 Reconstitution file name
1240 Compressed integer
1250 Reconstitution header (fig 13)
1260 Reconstitution body (fig 14)
1270 Reconstitution plan (fig 15)

Figure 13: Reconstitution header (1250)

1310 Random bytes
1320 Reconstitution file type
1330 Computer identifier code (see 0922)
1340 Password for this file (see 0330)
1350 Dispersion count (see 0410)
1360 Cascade data
1361 Level of security (see 0350)
1362 Cascade count (see 0360)
1363 Cascade number within count of cascades
1364 Offset range within index file for this cascade
1370 Eight random table identifiers (see 0830)
1380 File counts
1390 Offsets within reconstitution file Figure 14: Reconstitution body (1260)

1410 Location strings
1420 Names of reconstitution files (see 0451)
1421 First in long form (see 0320)
1422 Additional in short form (see 0451)
1430 Name of index file (see 0451)
1440 Names of composite files (see 0451)
1450 Offsets of Internet locations Figure 15: Elements of the reconstitution plan (1270)

1501 Action code 01
1502 Action code 02
1511 Action code 11
1512 Action code 12

Figure 32, page 4

1513 Action code 13
1521 Action code 21
1522 Action code 22
1531 Action code 31
1532 Action code 32
1541 Action code 41
1542 Action code 42
1591 Action code 91

Figure 16: Intermediate objects (0280)

1610 Support for 16 concurrent original data inputs
1612 Original data buffers
1613 Current input identifier
1620 Fragments
1630 Support for eight random tables in memory
1640 Fragment guide
1641 Source of fragment = input identifier
1642 Length of fragment
1643 Mathematical operations pointer
1644 Fragment disguise methods with parameters
1650 Support for 16 fragment heaps
1651 Fragment heap
1652 Composite segment
1654 Size of completed fragment heap before padding
1660 Support for 120 composite files
1670 Support for one index file
1680 Camouflage buffer
1690 Temporary file to record fragmentation actions / steps
1695 Support for location strings Figure 17: Processing to privatize computer data (0290)

1710 User inputs control selections
1720 Initialize intermediate objects
1730 Initialize processing
1740 Fragment original data files (fig 18 to 20)
1750 Finalize and disperse composite files
1760 Finalize and disperse index file
1770 Build reconstitution file(s) (fig 21)
1780 Finalize processing and report Figure 18: Fragment original data files (1740)

Figure 32, page 5

1810 Reset and check input data status (fig 19)
1820 If out of input data, go to step 1750
1830 Process random table matters
1831 Periodic swap of active random table
1832 Periodic swap of start position
1840 Obtain and interpret fragment guide
1850 Obtain fragment
1860 Ensure enough space for current fragment
1870 Finalize a fragment heap (fig 20)
1880 Disguise and append fragment to fragment heap
1890 Record the action on a fragment, return to step 1810

Figure 19: Reset and check input data status (1810)

1910 Determine if 16 or more bytes remain in data input buffer
1920 Replenish input file buffer
1930 Determine if one or more bytes in buffer
1940 Close data input file
1950 Determine if more data input files
1960 Open, record next data input file
1970 Mark data input stream inactive
1980 Determine if any more active streams
1990 Set flag if no more active streams Figure 20: Finalize a fragment heap (1870)

2010 Pad fragment heap with random values
2020 Add camouflage (1591)
2030 Record finalizing of fragment heap (1521)
2040 Record added trailer (1522)
2050 Determine if all eligible composite files in use
2060 Write to next composite file
2070 Append to next composite file
2080 Determine if camouflage buffer status okay
2085 Swap in replacement for camouflage buffer
2090 Reset fragment heap pointer Figure 21: Build reconstitution file (1770)

2110 Create reconstitution header
2120 Create reconstitution main body
2130 Determine if another action code (reverse order)

Figure 32, page 6

2140 Compress trailers according to action code
2141 Action codes 01 and 91
2142 Action code 02
2143 Action code 22
2144 Action code 21
2145 Action code 13
2146 Action codes 11, 12, 31, 32, 41, 42
2150 Restrict reconstitution file to target computer
2160 Encrypt with standard method
2170 Write reconstitution file Figure 22: Support procedure to share access (0120)
Requester sends signature file (Marpex dialog)

2210 Assumptions about computer identification
2220 Marpex Secure Software Rental
2230 Valid days, hours, minutes
2240 In response to
2250 Name of signature file
2260 Save signature button
2270 Requester sends signature file to author Figure 23: Support procedure to share access (0120)
Author enters sharing control selections 2310 Specify archive / reconstitution file
2320 Enter password
2330 Specify terms of sharing [backup or distribution]
2340 Specify signature file(s) [of computers to receive access]
2350 Collect list of signature files
2351 Signature file name (see 2250)
2352 Computer ID (see 0922)
2360 Delete selection
2370 "Next" button Figure 24: Support procedure to share access (0120)
Author specifies passwords for reconstitution copies 2410 Specify signature file (see 2250)
2420 Enter password for new file
2430 Optionally make password same for all reconstitution copies
2440 Create new reconstitution file(s)
2450 Author transmits reconstitution file(s) to intended receivers

Figure 32, page 7

Figure 25: Support procedure to validate archive (0130)

2510 Specify archive/reconstitution file
2520 Enter password
2530 Select type of validation
2540 Specify location of random tables
2550 Check presence of all needed random tables
2560 Check presence of all composite files
2570 Check presence of index file
2580 Cascading used?
2581 Check presence of other recon files
2590 Report Figure 26: Delete privacy protected archive (0140)

2610 Specify archive / select reconstitution file
2620 Enter password
2640 User confirms deletion
2650 Delete files
2660 Report Figure 27: Support procedure to plan locations (0150)

2710 Load file ILocate.dat into memory
2720 Remove disguise, display content
2730 Select a location
2740 Delete selected location
2750 Validate a location
2760 Add individual location
2770 Edit location
2780 Add multiple locations from text file
2790 Disguise file contents
2795 Write contents to file ILocate.dat Figure 28: Support procedure to reconstitute files (0160)
Reconstitute -- select archive dialog 2810 Specify archive / select reconstitution file
2820 Enter password
2830 "Next" button

Figure 32, page 8

Figure 29: Support procedure to reconstitute files (0160)
Reconstitute -- Options dialog 2910 Select target drive
2920 Select all files versus custom selection
2930 Select choice re overwriting newer files Figure 30: Support procedure to reconstitute files (0160)
File selection dialog and processing 3010 Validate archive per fig 25
3020 Assemble copies on hard disk
3030 All files selected? (2920)
3031 Select directory [not shown if all files 2920]
3032 Select file names
3033 Selection flag
3040 Process to reconstitute files
3050 Report Figure 31: Extensions to the method (0170)

3110 All results in a single file
3120 Input is a single file
3130 Compression
3140 Automated privatizing and reconstitution
3150 Method standardized within an operating system
3160 Same reconstitution file, varied archives
3170 Dynamic dispersion for secure Internet data

Figure 32, page 9

METHOD AND SYSTEM FOR FRAGMENTING AND RECONSTITUTING DATA

This invention claims priority from a Provisional Application having file No. 60/238,604, which was filed on Oct. 6, 2000. The Provisional application is incorporated herein by reference.

A microfiche appendix is included with this patent application.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

Keeping data private and secret from unauthorized persons is desirable to everyone. People do not want their personal information such as credit card numbers, medical records, or financial documents disseminated without their permission. Businesses often require that only authorized personnel view or have access to various documents and information. Even the government, including the Federal Bureau of Investigation and the Central Intelligence Agency, has high demand for keeping government matters secret and private, especially matters of national security. In today's technologically advanced society, it is becoming easier for a computer hacker to obtain access to secret files of the unwary data owner.

Currently, to prevent unauthorized access to data being stored on a hard drive of a computer or to send data over the Internet, encryption is used to scramble the message. There are numerous ways to encrypt plaintext. Some encryption techniques use one private access key for encryption and decryption. The private access key manipulates plaintext into ciphertext and vice versa. This is often referred to as a "symmetric algorithm." Because the same key is used for encryption and decryption, security and protection of the plaintext is directly related to the private key owner's ability to keep the private key hidden or secret from unauthorized users.

Another method of encryption uses a public key to encrypt plaintext into ciphertext and a private key to decrypt the ciphertext into a readable message. This technique is referred to as an asymmetric algorithm. Because the encryption key can be released into the public domain, no harm is done unless the private key is discovered to decrypt the ciphertext.

Regardless of what technique is used, in traditional encryption one basic premise is retained: one file equals one message. Traditional encryption methods have many problems, including lack of efficiency, reliability and simplicity of use. To completely privatize computer data, a system and method are needed that break out of the conventional encryption wisdom that one file equals one message. Nothing in the art suggests or teaches a method to easily privatize data in such a way that the user(s) is not even aware of the high level of security being provided. Accordingly, what is needed in the art is a system and method for privatizing computer data wherein data files are fragmented, randomly interspersed with other fragments from other files to form composite files and then randomly dispersed to hidden locations over the Internet, a hard drive of a stand-alone personal computer and/or other media, such that only authorized users have access to such data.

SUMMARY OF THE INVENTION

A system and method for privatizing computer data comprises the steps of opening a plurality of original data files, fragmenting said original data files into fragments, and interspersing said fragments among each other forming composite files, which together with an index file comprise a privacy protected archive. The method then comprises the steps of creating a reconstitution file, which identifies hidden dispersion locations and placement of individual fragments to reconstruct the original data files. Finally, the composite files may be dispersed to the hidden locations. To enhance security, each fragment is disguised through an exclusive OR operation and other mathematical operations, with the disguising directed by a fragment handling guide drawn from a random table, before interspersing fragments within the composite files.

Accordingly, it is an objective of the present invention to provide a system and method for privatizing computer data, which provides substantially complete security from unauthorized persons, without resorting to strong encryption techniques.

Further, it is another object of the present invention to provide a system and method for privatizing computer data, which provides freedom from data mining.

Another objective of the present invention is to provide a system and method for privatizing computer data by dispersing files to hidden locations on the Internet and/or other media.

Further, another objective of the present invention is to provide a system and method for privatizing computer data wherein only authorized users on authorized computers can open a reconstitution file to obtain access to the computer data.

Still yet, another objective of the present invention is to provide a system and method for privatizing computer files, which serves as an encryption enhancer in that the method can be used on files that are already encrypted.

Another objective of the present invention is to provide a system and method for privatizing computer files, which uses cascading fragmentation.

Further, another objective of the present invention is to provide a system and method for privatizing computer files which protects from file loss through automated redundancy.

Another objective of the present invention is to provide a system and method for privatizing computer files wherein data restoration is tightly controlled and the fragmentation process is precisely reversed in order to reconstitute data.

Still, another objective of the present invention is to provide a system and method for privatizing computer files wherein computer files can be automatically restored to the original directory locations.

Another objective of the present invention is to provide a method for privatizing computer files wherein an older version does not overwrite a newer copy unless specifically requested.

Still yet, another objective of the present invention is to provide a computer readable medium containing instruction for controlling a computer system to perform a method, where the method comprises the steps of providing a plurality of original data files, providing a plurality of fragment storage structures, providing a plurality of composite files, providing at least two locations for storing the plurality of composite files, fragmenting the original data files into fragments, reading each of the fragments from the plurality of original data files, writing each of the fragments into one of the plurality of fragment storage structures, forming interspersed fragments, filling the fragment storage structures with fragments, and writing the interspersed fragments to the composite files.

Another objective of the present invention is to provide a method for privatizing computer files that is economical in price and light in its demands on computer resources.

BRIEF DESCRIPTION OF DRAWINGS

The Figures listed below have been selected to illustrate a preferred embodiment of the present invention. These Figures along with the accompanying description and the appended source code of core processes are sufficient for those skilled in the art to practice the invention as claimed. Note that all entities and actions within the drawings are designated by four digit numbers. In all cases, the first two digits are the Figure number in which the action or entity is introduced. Hence each entity or action discussed in this document can be related directly to a specific drawing. In turn, all drawings except the first relate back to a previously discussed action or entity. All Figures, and all boxes within each Figure, are discussed in numeric order below.

The invention may take physical form in certain parts and arrangement of parts, a preferred embodiment of which will be described in detail in this specification and illustrated in the accompanying drawings which form a part hereof and herein:

FIG. 01 is a diagram providing an overview of a program that incorporates the system and method, together with five support procedures. Reference is made to extensions to the method not currently implemented within the program;

FIG. 02 is a flow chart showing all inputs, all outputs, and the interim objects involved in conjunction with the processes that together comprise the system and method 0110 to privatize computer data;

FIG. 03 is a diagram of the first group of user control selections 0210 which are required inputs for the system and method 0110;

FIG. 04 is a diagram of a second group of user control selections 0210 which are required inputs for the system and method 0110;

FIG. 05 is a diagram of a third group of user control selections 0210 which are required inputs for the system and method 0110;

FIG. 06 is a diagram of a subsidiary user control selection 0210, whose presence speeds the listing of files in FIG. 05 which the user may select as candidates for privatizing through the system and method 0110;

FIG. 07 is a diagram showing aspects of original data files 0220;

FIG. 08 is a diagram showing aspects of random tables 0230, which serve as a "catalytic" input (they enhance, but are not changed) in the system and method 0110;

FIG. 09 is a diagram showing aspects of the remaining prerequisites 0240 to the system and method 0110;

FIG. 10 is a diagram showing aspects of composite files 0250, the primary output of the system and method 0110;

FIG. 11 is a diagram showing aspects of the index file 0260, a support output of the system and method 0110;

FIG. 12 is a diagram showing aspects of the one or more reconstitution files 0270, relatively small outputs of the system and method 0110 whose absence and/or security features preclude the ability of an unauthorized party to retrieve the original data files 0220;

FIG. 13 is a sequentially ordered diagram of the elements comprising the header 1250 of a reconstitution file 0270 output by the system and method 0110;

FIG. 14 is a sequentially ordered diagram of the elements comprising the body 1260 of a reconstitution file 0270 output by the system and method 0110;

FIG. 15 is a diagram setting out the various building blocks, which are assembled to create the reconstitution plan 1270 within a reconstitution file 0270 output by the system and method 0110;

FIG. 16 is a diagram showing aspects of intermediate objects 0280 which are used in the system and method 0110 to convert the inputs 0210, 0220, 0230, and 0240 into the outputs 0250, 0260, and 0270.

FIG. 17 is a flow chart setting out the processing steps 0290 to privatize data;

FIG. 18 is a flow chart expansion of the privatizing processing step, "fragment original data files" 1740;

FIG. 19 is a flow chart expansion of the fragmenting step, "reset and check input data status" 1810;

FIG. 20 is a flow chart expansion of the fragmenting step, "finalize a fragment heap" 1870;

FIG. 21 is a flow chart expansion of the privatizing processing step, "build a reconstitution file" 1770;

FIG. 22 is a flow chart of the steps required of a person wishing to gain access in the support procedure to share access 0120 to a privacy protected archive 0261;

FIG. 23 is a flow chart of the first of two sets of inputs required of a person wishing to distribute authorization to others in the support procedure to share access 0120 to a privacy protected archive 0261;

FIG. 24 is a flow chart of the second of two sets of inputs required of a person wishing to distribute authorization to others, together with underlying processing, in the support procedure to share access 0120 to a privacy protected archive 0261;

FIG. 25 is a flow chart of the steps required in the support procedure to validate 0130 a privacy protected archive 0261;

FIG. 26 is a flow chart of the steps required in the support procedure to delete 0140 a privacy protected archive 0261;

FIG. 27 is a flow chart of the steps required in the support procedure to plan Internet-based locations 0150 for privacy protected archives 0261;

FIG. 28 is a flow chart of the first of three sets of inputs required in the support procedure to reconstitute data 0160 that has been previously privatized 0110;

FIG. 29 is a flow chart of the second of three sets of inputs required in the support procedure to reconstitute data 0160 that has been previously privatized 0110;

FIG. 30 is a flow chart of the last of three sets of inputs and steps required in the support procedure to reconstitute data 0160 that has been previously privatized 0110;

FIG. 31 is a diagram showing a series of extensions 0170 to the system and method to privatize data 0110; and FIG. 32 is a table in numeric order of all entities and actions referenced in FIGS. 01 through 31 and in this document.

PREFERRED EMBODIMENT

In order to facilitate the efforts of a person of ordinary skill in the art to implement this system and method, a functional set of C++ language source code functions is included in a microfiche appendix to this patent application. Two files in the appendix are especially to the point. A set of implementation notes and the main( ) function appear in a file "PryvitDL.cpp". At the end of the appendix, the header file "PryvitDL.h" contains comments on a wide range of variables that are accessible through an "access class" and a "#include PryvitDL.h" statement in each of the other functions. Variable names shown in this patent application are quoted from "PryvitDL.h". Memory management is simplified in the C++ version through declaring maximum quantity and size of most variables; the cost is a globally accessed "access class" of under three megabytes, which presents no challenge to modern personal computers.

The instant invention fulfills the strong need in the art for providing the highest levels of security and privacy to computer data, as will be shown in the foregoing description as well as FIG. 01 through FIG. 32. Computer data files are fragmented and then fragments are individually manipulated to make each fragment unrecognizable. The fragments from multiple files are randomly mixed together and further disguised to form composite files. Disguising techniques are performed without any detectable pattern. The composite files are then sent to a plurality of hidden locations, such as the Internet, local area networks, a hard drive of a standalone computer, a tape, a disk, a smart card or other storage media. All the composite files together with one index file (listing of file names, directories, sizes, dates), wherever they are located, comprise a privacy protected archive. A compact reconstitution file is prepared for the archive; it contains among other things a highly compressed step-by-step plan to retrieve the original data files from the privacy protected archive.

The Internet appears very public, yet it is an excellent hiding place for composite files located under obscure directory and subdirectory names. For persons to access the secured data, they would need to find the location of every composite file, identify and separate out the many fragments, undo the fragment disguises, and then place the fragments in the correct order. Because the number of possible hidden locations is nearly infinite, it would be almost impossible for an unauthorized user to gain access to the privatized data without the reconstitution file. Only those with authorization can access the private computer data. Further, the private data can be accessed from anywhere in the world by authorized persons who have the proper reconstitution file.

FIG. 01 is a diagram providing an overview of a program that incorporates the system and method to privatize computer data 0110, together with five support procedures. The system and method 0110 is detailed in FIGS. 02 through 21. However, it cannot stand alone; privatized data that can never be recovered amounts to the proverbial "write-only memory"—an interesting abstraction, but of no practical value. Therefore, FIG. 01 introduces supporting procedures 0120 to 0160 (see FIGS. 22 to 30), which are essential to make an implementation viable. Lastly, FIG. 01 touches on extensions 0170 to the system and method; these extensions are listed in FIG. 31. The essence of the techniques of randomly fragmenting data to ensure privacy can find broad application and contribute to enhanced handling of privacy-related issues on the Internet, in operating systems, etc. as well as in individual and corporate use of computers.

FIG. 02 is a diagram providing an overview of the system and method 0110, broken into components to facilitate learning by a person of ordinary skill in the art. It is a standard practice in information technology to determine what are the desired outputs from a system and the required inputs, then to establish the processing structures, and the intervening procedures/steps/algorithms required to create those outputs.

Hence FIG. 02 refers first to four inputs. User control selections 0210 are required as input to the system and method 0110 each time that the user wishes to privatize a set of original data files 0220; these user control selections 0210 are detailed in FIGS. 03 through 06. The second input is a set (one or a multiplicity) of original data files 0220 which are deemed vulnerable to data mining and other abuses; aspects of original data files 0220 are detailed in FIG. 07. The third input to the system and method 0110 is a set of random tables 0230; see FIG. 08. Other prerequisite inputs 0240 are set forth in FIG. 09.

FIG. 02 next introduces three outputs from the system and method to privatize data 0110. Composite files 0250 are introduced in FIG. 10. The one index file 0260 is analyzed in FIG. 11. The reconstitution file or files 0270 are examined in increasing detail in FIGS. 12 through 15. Note in passing that two outputs together (from 2 to 120 composite files 0250, together with one index file 0260) comprise a privacy protected archive 0261. One privacy protected archive 0261 is created each time the system and method to privatize computer data is run.

FIG. 02 turns then to how the inputs are transformed into the outputs. Interim objects 0280 are detailed in FIG. 16. The steps in processing 0290 to privatize computer data are expanded in FIGS. 17 to 21.

FIGS. 03 through 06 treat a broad category of inputs, user's control selections 0210. A person wishing to privatize a selection of original data files 0220, whether consciously or not, must set a range of specifications related to items 0310 through 0630 below. While the list is lengthy, the demands on the user can be reduced by presenting default values, which the user may either accept or amend. A graphical user interface (GUI) is ideal for this purpose.

FIG. 03 shows a working user interface in the form of an "options dialog" through which the user specifies six items.

The location of the directory 0310 containing random tables 0230 must be available to the computer program 0930. A minimum of one and preferably eight or more random tables 0230 should be present on the hard disk. They need be present in one copy each, together in one known directory or subdirectory location 0310.

If the user enters no name for the first reconstitution file 0320, a meaningless name 0451 will be used for the first (and usually only) reconstitution file 0270. Often, the user will prefer to specify a name that reminds him/her specifically of the privacy protected archive 0261 with which the reconstitution file 0270 is associated. The suggested suffix for the name of reconstitution files is ".REC", but this is not required.

A password 0330 is embedded in each reconstitution file 0270 in order to prevent an unauthorized person (for example, a thief who has purloined a laptop computer) from running the procedure 0160 to reconstitute privatized data. Where multiple pass cascading fragmentation 0362 has been used, each reconstitution file in the set (one per cascade) carries the same password 0330 in order to automate, expedite, and simplify the reconstitution process 0160.

Blank passwords are permitted, and may be appropriate provided the implementation of the system and method incorporates a computer-specific identifier system and the risk of mischief from malevolent hackers is moderate or low.

The user is provided an automatic deletion option 0340 for original data files 0220. Privatizing these files and then leaving them in their original form on the hard disk leaves them open to prying eyes, surreptitious data mining, etc. However, the user may wish to back up original data files 0220 prior to deletion. This yes/no toggle option 0340 gives the user control.

Level of security 0350 is a choice between two levels of privacy protection, one the routine "private" level and the other level for cases in which there is heightened concern over possible intent by other persons and/or the specially high value of the original data files 0220 to be protected.

If the "high security" option is selected as the level of security 0350, an additional drop down box appears in the dialog. Count of cascades 0360 (explained in the following two paragraphs) may range from 2 to 7 under high security; the count of cascades 0360 is one if the merely "private" security option 0350 is selected.

Single pass fragmentation 0361 is applied automatically if the user selects the routine level of security 0350. In this case, the original data files 0220 selected as input by the user are subjected to the process to privatize data 0290 (detail in FIGS. 17 to 21) once only, and the outputs 0250, 0260, and 0270 on this single pass constitute the final result. Single pass fragmentation 0361 is equivalent to a single cascade in contrast to multiple pass cascading fragmentation 0362 in the next paragraph.

Multiple pass cascading fragmentation 0362 is applied if the user selects the heightened security option. In this case, the user is asked to specify a number of cascades 0360, ranging from two to seven. Cascading fragmentation 0362 provides ultra high privacy because the content from the original data files 0220 is rearranged and fragmented repeatedly. After each fragmentation run, step 1740, the resulting composite files 0250 are gathered and used as input for another run of fragmenting 1740. A useful metaphor is to liken this repetitive process to blowing up a building, sweeping up the rubble, blowing that up, gathering the now-much-finer rubble, exploding that, and so forth for up to seven iterations. The difference from the building explosion metaphor is that the original data files 0220 can be reconstituted quickly, provided only that the last set in its entirety of composite files 0250, an extended final index file 0260, and one reconstitution file 0270 for each iteration (or cascade) are available to the authorized computer and user. Security is eminently higher, because a person who is denied access to even one element of the outputs listed above is utterly incapable (with intensive reverse engineering or even complete source code for the system and method) to retrieve the original data files 0220. For example, if even one of the reconstitution files 0270 is unobtainable, unauthorized users have no hope of making sense of outputs 0250 that may come into their hands.

Returning to FIG. 03, the user who wishes even greater security is always free to perform multiple single pass iterations 0361, manually setting output from one session as input for the next, with different passwords 0330 for each, for as many iterations/cascades 0360 as desired—well beyond the automated maximum of seven.

FIG. 04 is a diagram of a second group of user control selections 0210 which are required inputs for the system and method 0110. The illustrated locations dialog in FIG. 04 invites either input or confirmation from the user on six elements of data.

The dispersion count 0410 is selected by the user. The higher the dispersion count 0410, the more widely the fragments 1620 are dispersed and the more difficult it would be for a malevolent person to access all the parts of a privacy protected archive 0261 and to decipher their content. Values for the dispersion count 0410 may range from 2 to 16; a default of 3 is often appropriate. The dispersion count 0410 is used in two ways. Fragments 1620 are dispersed across a minimum of two and a maximum of 16 fragment heaps 1651; hence the expression "dispersion count". These fragment heaps 1651 are padded as necessary to create composite segments 1652, camouflaged, and written to composite files 0250, which in turn may be optionally dispersed in unique sets to "dispersion count" Internet locations. It will be shown later that the number of unique composite files 0250 produced is always an exact multiple of the dispersion count 0410.

The user must specify a working directory 0420, a location on the hard drive or on a local area network to which all copies of output files 0250, 0260, and 0270 may be written. While the system and method 0110 provides for optional dispersion of composite files 0250 and the index file 0260 to the Internet, it is always the case that the outputs 0250, 0260, and 0270 are placed together in one directory on the user's computer 0920. The rationale of a single working directory 0420 is that it permits backup prior to optional erasure of the hard disk copy. In addition, it provides essential working storage for interim composite files 0250 that may be used as inputs in lieu of original data files 0220 in successive cascades, should the user desire the benefits of multiple pass cascading fragmentation 0362.

Redundancy count 0430 is an option in which the user may specify that zero, one, two, or three copies of each composite file are to be automatically dispersed to Internet locations 0440. Redundancy 0430 is measured in addition to the single copy of each output placed in the working directory 0420 of the user's hard disk. Only one copy of each composite file 0250 needs to be present for the process of reconstituting privatized data 0160, even if several copies were originally created and distributed under the redundancy 0430 option. Occasionally, Internet servers are temporarily out of service. If a composite file 0250 or index file 0260 is hidden on an out-of-service server, it is not retrievable from that location 0440. Using redundancy 0430, each file comprising the privacy protected archive 0261 is sent to multiple hidden dispersion locations 0440 to minimize the risk of encountering a down server. During the reconstituting process 0160, the search is terminated for any one copy of a composite file 0250 or the index file 0260 when the first copy of it is found.

Target Internet dispersion locations 0440 are required whenever the redundancy is greater than zero. To be precise, dispersion count 0410 (value 2 to 16) multiplied by redundancy count 0430 (value 0 to 3) target Internet locations 0440 are needed. The count of Internet dispersion locations 0440 may range from zero (0 times any value 2 to 16) to 48 (3 copies for each of 16 sets). However, counts above 12 would be unusual. Among the supporting procedures is planning the dispersion of privatized data 0150 (see detail in FIG. 27), in which the user may set up and manage an extended list 0915 from which Internet locations data 0440 are drawn. In each session of creating a privacy protected archive 0261, the user may select 2 to 16 (i.e., the dispersion count 0410) times 0, 1, 2, or 3 (i.e., the redundancy count 0430) specific Internet dispersion locations 0440 to which copies of composite files 0250 and the index file 0260 will be sent. In the preferred embodiment, the user sets both the dispersion count 0410 and the intended redundancy 0430, and the program automatically selects random Internet dispersion locations 0440 from the "ILocate.dat" file 0915. The user may override these random selections if desired. Usually he or she will not override them, since the actual targets in any one instance do not really matter, provided they are locations to which the user has access. It is usually sufficient to know that the material has been dispersed as broadly as desired (dispersion count 0410) with adequate redundancy 0430.

A prefix for output file names 0450 may be specified. This tactic permits the user to override the first one, two, or three characters of all output file names associated with the privacy protected archive 0261, making them consistent across that archive. In this way the user may distinguish among files from different archives. The advantage of such an override is that the probability of two files from different archives 0261 having exactly the same name (and one overwriting the other) is reduced from one chance in 341,172 to zero chance. The first character in a prefix 0450 must be a letter. The second and third may be a letter or a numeric digit in the range 2 to 7.

A major characteristic of output file names 0451 is meaninglessness. The actual names are normally immaterial to an authorized person who wishes to reconstitute original data files 0220; management of file names is totally taken care of through the reconstitution file 0270. During the fragmentation process 1740, the program creates a scramble of letters and digits (for example D8GU9WBB) for each output file—the one index file 0260, up to 120 composite files 0250, and up to seven reconstitution files 0270. This is done specifically to minimize clues and patterns that might benefit a malevolent person trying to break the privacy. These names consist of eight characters (the first a letter, the second through eighth a letter or a digit 2 ... 7), with a suffix .PVT for the index file 0260 and composite files 0250, and suffix .REC for the reconstitution files 0270. The 128 names are each unique in the five characters combinations making up the fourth through eighth character.

Names for seven output reconstitution files 0452 are as per the discussion of names for output files 0451, with the one exception that the user has the opportunity to stipulate a meaningful name for the first reconstitution file 0320.

FIG. 05 introduces the "select files" dialog. The primary control selection 0210 in the mind of the user is likely to be creation of the selection list 0520 of original data files 0220. The ability to select multiple files at a time for input is a common feature of graphical user interfaces.

The "select files" dialog offers five selection buttons 0510.

Button 0511, "select files from another drive", is an artifice that substantially speeds up display of directory locations 0530 and original data file names 0540. The Windows version of the computer program 0930 starts with one hard disk drive only in the directory locations area 0530. This saves time the program would otherwise use having to cycle through all available drives; such cycling carries a penalty of several seconds for each removable media drive that is currently empty. The "select files from another drive" button 0511 provides flexibility, should the user wish to access other drives.

Button 0512 "add selected folders and subfolders to list" and button 0513 "remove selected folders and subfolders from list" both require that a folder be highlighted by the user in the directory location area 0530, found in the lower left panel in the screen image in FIG. 05. Button 0512 adds all files in the highlighted folder and its subfolders to the current selection list of data files 0520. Button 0513 removes them from the list.

Button 0514 "add selected files to list" and button 0515 "remove selected files from list" both require that one or more files be highlighted by the user in the original data file name area 0540, found in the lower right panel in the screen image in FIG. 05. Button 0514 adds the files to the current selection list of data files 0520. Button 0515 removes them from the list.

The current selection list of data files 0520 starts empty. Files are moved into and out of the list using a combination of the five selection buttons 0510 and highlighting of folders and files in the two lists. The objective is to specify all the original data files 0220 that are to be made private by the system and method 0110 in one privacy protected archive 0261. The current selection list 0520 must contain at least one file for the system and method to work; the list may contain literally thousands of files.

Directory locations 0530 are displayed in the lower left panel. Any section may be expanded by clicking on a plus sign to the left; it may be contracted by clicking on a minus sign to the left. The directory locations 0530 of selected files 0520 will be preserved in the index file 0260, so that files may be restored to the same place on the same drive, or within an identical framework on another drive in the procedure to reconstitute data 0160.

Original data file names 0540 are displayed in the lower right panel whenever a directory in the directory locations 0530 panel is double clicked. The names 0540 of selected files 0520 will be preserved in the index file 0260, so that files may be restored with the identical names in the procedure to reconstitute data 0160.

A privatize flag 0550 (in the form of four asterisks in the screen image) to the right of a name in the file name list 0540 indicates that the file is currently in the selection list 0520.

Sizes 0560 of all files are listed in bytes in the lower right panel. This information aids the selection process since time to privatize files 0110 and time to reconstitute them 0160 are both functions of the total sizes of files placed within the current selection list 0520. At the same time, there is no technical upper bound to the size of an original data file 0220, beyond that imposed by the operating system. For example, in a 32 bit implementation, a file of 2 to the 32nd power bytes (over 4 billion bytes) can be handled. At the other extreme, the programmer may wish to impose a lower bound on cumulative file size (say 16 bytes) to guard against attempts at reverse engineering.

Date and time 0570 of all files are shown as an aid to the user in ensuring that selected files are appropriate versions. Date and time of selected files are incorporated during processing into the index file 0260 and used in the reconstitution process 0160 so that retrieved data may be identical in every respect to the original form.

FIG. 06 shows a "select alternative drive dialog", a selection device necessary if the user clicks on the "select files from another drive" button 0511. A drop down box lists the drives available on the computer; the user is expected to click on one as a drive 0610 holding original data files 0220. The OK button 0620 returns the user to the "select files" dialog in FIG. 05. The Cancel button 0630 is handy if the user selects a removable media drive within which there is currently no medium (floppy disk, mass storage disk, etc.)

FIG. 07 is a diagram showing aspects of original data files 0220.

The first aspect is eligibility 0710 of an original data file 0220 for privatizing. In their normal (non-privatized form), original data files 0220 are vulnerable to misappropriation, data mining, and other undesired and unintended uses. But this does not apply to all files. For example, there is little to be gained in privatizing files which are publicly or broadly available. Neither does it seem appropriate to privatize executable programs, most operating system files, etc. Typically a small subset of what is on the hard disk of a computer consists of data, which has value to the user or to the organization that the user represents. In general, only data files that contain valued personal or organizational property should be made private.

Type 0720 is the second aspect. The system and method of privatizing computer data treats all files as byte streams; hence any file type whatsoever (word processing output, spreadsheet, database, graphic, etc.) may be specified as an original data file 0220, within any operating system in which the system has been implemented. In the light of the preceding paragraph, consider all eligible data files as "regular files" 0721. This is in contrast to two other types, which present themselves as interesting possibilities where security is a major concern. Files already privatized 0722 can be used as input for another round of privatizing; this forms the basis of cascaded fragmentation 0362. Files already encrypted 0722 can also be used as input to the system and method 0110. In this sense, the underlying technique of random fragment dispersion elevates the system and method of privatizing computer data 0110, which is documented here, into an encryption enhancer.

Count 0730 is also relevant. The number of files being made private in one archive may be any integral quantity without limit.

FIG. 08 shows another major input to the method. Random tables 0230 play several roles in disguising fragments 1620 while making possible a very compact rendering of the reconstitution plan 1270 for a privacy protected archive 0261. Five aspects of random tables 0230 are considered in 0810 through 0850.

The source 0810 of random tables 0230 is normally the Internet. Master copies of random tables 0230 are provided for users by the firm responsible for commercializing the system and method 0110 of privatizing data. In the preferred embodiment, over a hundred random tables 0230, each unique, are freely posted for download on the Internet. Although the system functions with only one random table 0230 present on the hard disk, the user is encouraged to keep a minimum of eight and preferably more on hand.

The size 0820 of each and every random table 0230 is precisely 65,536 bytes. Sixteen bits (two eight bit bytes) can be used to express any integer value between 0 and 65,535 (one less than two to the power 16). Every possible 16 bit address points to a valid offset within the random table 0230, and no parts of the random table 0230 are missed by 16 bit addressing.

The name and identifier 0830 of each random table 0230 is derived from a five digit number ranging from 00000 to 65535. In the preferred embodiment, the five digit identifier number is built into the name of the random tables 0230 which have names of the form PVT#####.TBL, for example PVT29876.TBL and PVT09137.TBL. The numeric identifier corresponds to the binary value in the first two bytes of the 65,536 byte random table 0230.

The content 0840 of a random table 0230 is a highly randomized stream of bits. The only exception is the first two bytes (16 bits), which form a binary integer in the range zero to 65,535; these two bytes match the name and identifier 0830 of that particular random table 0230. In their creation, care is taken that no two random tables 0230 share lengthy subsets, and that each passes the latest anti-virus check so as not to create problems for users.

The count 0850 of random tables 0230 must be at least one and ideally is greater than eight.

FIG. 09 is a diagram showing aspects of three remaining prerequisites 0240 to the system and method 0110.

The first is Internet locations data 0910 comprising the targets 0440 to which composite files 0250 and the index file 0260 may be optionally dispersed. Each entry consists of four elements. An IP (Internet Protocol) address 0911 may be expressed either as four numbers, each in the range 0 to 255, separated by periods (example: 64.224.160.161) or as a verbal form such as ftp.MyHidingPlace.com. Within this address, files may be hidden in innocuously named directories and/or a hierarchical sequence of subdirectories 0912. Next comes the name of a user 0913 authorized to post files by file transfer protocol (FTP) to that location. The fourth element is the password 0914 required to place files in that location. In the preferred embodiment, entries with each of these four elements comprise a file named "ILocate.dat" 0915. This file is maintained in the same directory as the random tables 0230; "ILocate.dat" 0915 is disguised sufficiently to protect against data mining or casual observation of Internet target locations 0910. Lists of Internet locations entries may also appear in temporary text files 0916, provided by Internet Service Providers (ISPs), or Internet Storage Service Providers (ISSPs). Organizations with Intranets may also create lists to aid their employees in building suitable "ILocate.dat" files 0915. Ideally, all files containing Internet location data should be given a computer-specific disguise, to impede theft of files and misuse of Internet sites listed therein.

Note that where the user is content to keep the privacy protected archive 0261 on hard disk, Internet locations data (0910 and 0440) is not an essential input.

FIG. 09 states the obvious that a computer 0920 is required in order to implement the system and method to privatize computer data 0110. The method makes no distinction or restriction as to type of computer (mainframe, mini, personal, etc.). The first implementation was built for personal computers using a 32 bit operating system, namely, MICROSOFT WINDOWS® (a registered trademark of the Microsoft Corporation). The system and method, however, imposes no inherent restriction on the selection of the computer operating system. While technically possible to use the system and method without Internet access and to privatize computer files locally, it is desirable that a computer 0920 using the system and method to privatize computer files should have Internet access 0921. Another useful feature on the computer 0920 would be a software application (outside the purview of this patent application) that generates an eight byte computer identifier 0922 and appropriate signature files 0923 which authenticate the identity of the user's computer. This identification feature has a role in sharing access to privacy protected archives 0261 that have been posted to the Internet. In the first commercial rendition of the method, a product called Secure Software Rental by Marpex Inc. has been used for this purpose.

FIG. 09 introduces another prerequisite, a computer program 0930 which implements the system and method. Three characteristics of this program are important. These are set out in 0931 through 0933.

The efficiency 0931 of the computer program is crucial to a good implementation. The process of fragmenting original data files 1740 is highly iterative. With fragments 1620 ranging from 1 to 16 bytes in size, the average fragment size is about 8.5 bytes. Hence a megabyte (1,048,576 bytes) of input from original data files 0220 is broken into over 123,000 fragments 1620. Efficient processing of this iterative process is required to ensure that response time is acceptable to the user.

Precision 0932 of the computer program is essential. Reconstitution 0160 from a privacy protected archive 0261 is possible only if the steps in the fragmenting process 1740 are precisely reversed. Tests with the prototype implementation showed that this is possible even for exceptionally large quantities of content in the original data files 0220. In one test, for example, 43 megabytes comprising 79 files were reconstituted with byte for byte equivalence to the originals in 49 seconds on a laptop computer running at 360 megahertz.

The scope 0933 of the computer program 0930 should include the series of procedures 0120 through 0160 that make an implementation useful. These support procedures are listed in FIG. 01 and detailed in FIGS. 22 through 30.

FIG. 10 is a diagram showing four aspects of composite files 0250, the primary output of the system and method 0110.

The content 1010 of composite files 0250 is fragments 1620, drawn from original data files 0220, disguised, and interspersed in random and unpredictable ways, and padded as necessary to create composite segments 1652. Each composite segment 1652 is further camouflaged before it is written out or appended to a composite file 0250.

The size 1020 of composite files 0250 is always a multiple of 1,024 bytes. Composite files 0250 are written out in segments of 65,536 bytes, or some lesser multiple of 1,024 bytes when there are no further original data files 0220. To be precise, all composite files 0250 are a multiple of 65,536 bytes in size, with the exception of the last "dispersion count" 0410 composite files; these last are smaller, but still a multiple of 1,024 bytes in size. Padding with random bytes is added as necessary to fill out the fragment heap 1651 into a composite segment 1652 with the appropriate multiple of 1,024 bytes.

The count 1030 of composite files 0250 is always equal to or some multiple of the dispersion count 0410 (2 to 16) in any one privacy protected archive 0261. The upper bound is the highest multiple of the dispersion count 0410 where that multiple is less than 121. When about 7.5 megabytes (120 times 65,536 bytes) have been written out, all up to 120 possible composite files 0250 are in use, and further composite segments 1652 are appended starting over again at the first composite file 0250 and adding to the end of each successive composite file in order, repeating as necessary until all incoming original data files 0220 have been processed.

Names 1040 of composite files are as set out in names for output files 0451. In other words, composite files 0250 all have meaningless names of one alphabetic character followed by a combination of seven alphabetic characters and/or numeric digits, with the suffix ".PVT" added to the name. The first one, two, or three characters may be overridden and made uniform if the user has selected a prefix 0450 for output file names.

FIG. 11 is a diagram showing aspects of the index file 0260, a support output of the system and method 0110. This index file 0260 is a disguised listing of directory locations and names of original data files 0220, together with subsidiary information on each file. All of the index file 0260 except the subsidiary information is text. The entire content is disguised prior to the index file 0260 becoming part of a privacy protected archive 0261.

Each directory tree entry 1110 (for example, ">c:\data\personal\MyFinances") starts with a "greater than" symbol and finishes with a terminating null.

After each directory location entry 1110 there may be one or a plurality of names 1120 of original data files 0220 drawn from that directory.

After the terminating null of each file name 1120 appear four binary data elements which are supplementary file information 1130. The first supplement 1130 is a one byte value (0 . . . 15) indicating the input stream 1131 during fragmentation 1740. Next is a four byte date-time stamp 1132 corresponding to the displayed time and data 0570 for that file in FIG. 05. The third supplement 1130 is the size 1133 of the file in bytes 0560 in the form of a compressed integer 1240. The fourth supplement 1130 is the offset 1134 of the first byte of the directory location 1110 applicable to this file earlier within this index file 0260. Offset 1134 is also recorded in the form of a compressed integer 1240. These subsidiary data elements enable later restoration of the directory location 0530, original data file name 0540, and time stamp 0570 of the original data file 0220 and optionally verifying the size 0560 when the original data file 0220 is reproduced by the procedure to reconstitute privatized data 0160.

The size 1140 of the index file 0260 is the smallest multiple of 2,048 that will include all directory entries 1110 with their respective file entries 1120 and subordinate file data 1130.

The count 1150 is always exactly one index file 0260 for each privacy protected archive 0261.

Where multiple pass cascading fragmentation 0362 is used, the index file 0260 is comprised of multiple segments, a successive segment for each cascade 0360. The applicable range 1160 for a cascade 0360 is noted in that cascade's reconstitution file 0270. Only the segment for the first cascade contains original file names and data. The second through to the next to last segment of the index file 0260 each hold names of temporary composite files 0250 which are destroyed once they have served the purpose of input for the following cascade.

The index file name 1170 follows the convention for names of output files 0451; the name in this case masquerades as a composite file 0250 with the same eight character content followed by a suffix ".PVT". The index file 0260 is distinguished by two features. When dispersed, it is sent to the target location(s) for the first group of composite files 0250. Secondly, the index file 0260 tends to be smaller than composite files 0250.

FIG. 12 introduces aspects of the reconstitution file 0270. Where normal security is desired, there is one reconstitution file 0270 to match the one cascade 0360 associated with single pass fragmentation 0361. If multiple pass cascaded fragmentation 0362 is selected, there is one reconstitution file 0270 for each cascade.

The type and purpose 1210 of a reconstitution file 0270 can be subdivided among three possibilities. These are master 1211, backup 1212, and distribution 1213. A master ("M") 1211 reconstitution file 0270 is created each time the user employs the system and method 0110 to privatize computer data; two to seven such master 1211 reconstitution files 0270 are created if multiple pass cascading fragmentation 0362 is involved. Backup ("B") 1212 and distribution ("D") 1213 reconstitution files 0270 are created by the support procedure to share access 0120 to privacy protected archives 0261. Master 1211 and backup 1212 reconstitution files 0270 may be used to view hidden dispersion locations 0440, to run the support procedure to share access 0120 and create additional reconstitution files 0270 for either backup or distribution, and/or delete privacy protected archives 0261 that are posted to Internet locations 0440. A reconstitution file 0270 marked "D" for distribution 1213 may be used only to reconstitute privatized data 0160, and to delete privacy protected archives 0261 on local hard disk.

Secure handling precautions 1220 are in order for reconstitution files 0270. These files are designed to be quite small in comparison to the components of the counterpart privacy protected archive 0261. Without access to the reconstitution file or files 0270, it is virtually impossible for anyone to precisely reverse the process required to recoup the original data files 0220. By moving the reconstitution files 0270 off line to other media, the user makes the related privacy protected archive especially free from attack. At a minimum, it should be moved to an anonymous alternative location. Of course, effective security must be supported by prudent backup procedures. If the reconstitution file were lost and if the original data files were not backed up, the content is lost forever.

The reconstitution file name 1230 follows the earlier discussion under 0320, 0451, and 0452.

Selected elements in reconstitution files 0270 are stored in the form of a compressed integer 1240. Compressed integers are non-negative integers expressed in one or more sequential bytes. Bytes are arranged in descending order from high to low value. In the first byte, the location of the first bit which is turned on determines the number of bytes. If the high order bit (the very first bit) is set, the compressed integer is shown in the remaining seven bits of that one byte (range 0 to 127). Bit pattern 01 at the beginning of the first byte means the value is in fourteen bits (remaining six bits of byte 1, the eight bits of byte 2) with range 128 to 16,383. Bit pattern 001 in lead-in to the first byte means a three byte integer in twenty-one bits (5+8+8 bits) with range 16,384 to 2,097,151. Bit pattern 0001 in lead-in to the first byte means a four byte integer in twenty-eight bits (4+8+8+8 bits) with range 2,097,152 to 268,435,455. There is no theoretical upper bound to compressed integers. The preferred embodiment limits its use to values less than 268,435,456.

There are three limitations to the use of compressed integers: 1) they must be non-negative integers, 2) the programmer must know where in a byte stream a compressed integer starts, and 3) byte streams containing compressed integers can only be read in the forward direction. Trying to detect a compressed integer by reading backward in a stream is open to misinterpretation. A function to convert from an integer to a compressed integer, and a counterpart function to convert from a compressed integer to a normal integer each amount to little more than bit shifting. These functions therefore are very quick. Examples in the microfiche appendix are named "fr_c_int.cpp" (from compressed integer) and "to_c_int.cpp" (to compressed integer). Compressed integers are useful for avoiding patches of null bytes that show up frequently in fixed length data. Disguised or encrypted compressed integers are less vulnerable to pattern detection. In the reconstitution file 0270, compressed integers contribute significantly to reducing file size.

Each reconstitution file 0270 is comprised of a header 1250, a body 1260, and a reconstitution plan 1270. These are detailed in FIGS. 13, 14, and 15 respectively.

FIG. 13 sets out in sequence the constituent elements of a reconstitution header 1250 within a reconstitution file 0270. The header contains many items, but their cumulative length in the preferred embodiment is under 128 bytes. There are nine elements or groupings in the reconstitution header 1250.

The first grouping is a set of 15 random bytes 1310 for use in encryption. The reconstitution file 0270 is subjected to a standard form of encryption 2160 using for its key less than the maximum number of bits (currently 40) allowed under the United States Bureau of Export Administration for what is termed "light" encryption. The actual key can be hidden in, derived, and calculated from a set of 15 random bytes 1310 at the beginning of the reconstitution header 1250.

The reconstitution file type 1320 is indicated by a one byte ASCII flag containing one of three letters: M=Master 1211, B=Backup 1212, D=Distribution 1213.

The computer identifier code 1330 within the reconstitution header 1250 holds eight binary bytes 0922 generated by the one and only computer that is authorized to handle this specific reconstitution file 0270. Other (even many) computers 0920 may access the same privacy protected archive, but each computer must have its own specially tailored copy of the reconstitution file 0270.

Thirty bytes (up to 29 characters and a terminal null character) are set aside for the password 1340 required to restrict access to this file to authorized users. In the preferred embodiment, alphabetic letters and digits are retained from the password 0330 specified by the user; all punctuation and other characters are collapsed out. The same logic is used behind the scenes both for initial capture of the password, and for situations where the password must be given. Hence there is no impact on the user. Note that blank passwords are permitted, on the basis that "my computer is my password" where reconstitution files are disguised in computer-specific ways.

The reconstitution header includes a record 1350 of the dispersion count 0410, a one byte binary value in the range 2 to 16.

Cascade data 1360 in the reconstitution header is comprised of four elements 1361 through 1364.

Level of security 1361 is recorded in a one byte binary integer. The value 1 denotes regular security. Value 2 signals heightened security, representing the security level 0350 selected by the user.

The count of cascades 1362 is stored as a one byte binary value from 1 to 7. This matches the number of cascades 0360 selected by the user.

The cascade number 1363 within the count of cascades 0360 and 1362 is stored as a one byte binary value ranging from 1 to the maximum number of cascades. It is specifically this cascade number 1363 that distinguishes internally the several reconstitution files 0270 generated in multiple pass cascading fragmentation 0362.

The offset range 1364 within the index file 0260 consists of two binary integers, specifically the beginning offset and the terminating offset 1160 within the index file 0260 that apply to the current cascade.

Up to eight random table identifiers 1370 are stored in the next sixteen bytes. These take the form of eight 16 bit binary integers, recording the identifiers 0830 of the one to eight random tables 0230 used in creating the current privacy protected archive 0261 and reconstitution file(s) 0270. If the count of random tables is less than eight, the unused identifier spaces 1370 are filled with random bits.

A series of five file counts 1380 is stored as compressed integers. Some of these counts are not finalized until the end of a session of privatizing computer files. The individual counts follow.

(1) Count of random tables 0230 is determined by the program 0930. While initializing, the program 0930 searches the directory 0310 containing random tables 0230. At least one random table 0230 must be present for the process to continue. If from two to eight are present, all are used. If more than eight are present, the program randomly selects eight of them. The random table count 1380 (value 1 to 8) determines how many of the random table identifiers 1370 is valid; the remaining identifiers 1370 if any are disregarded as random numbers.

(2) Count 0730 of original data files 0220 made private in the corresponding privacy protected archive 0261.

(3) Count of composite files 0250 ranges from 2 to 120 and is an exact multiple of the dispersion count 0410. For dispersion counts of 2, 3, 4, 5, 6, 8, 10, 12, and 15 the maximum count is 120 since 120 is a multiple of each of these numbers. The other maxima are set to the nearest multiple under 120 . . . 119 for 7, 117 for 9, 110 for 11, 117 for 13, 112 for 14, and 112 for 16.

(4) Count of the number of composite segments 1652 is equal to or greater than the count of composite files 0250. A composite segment 1652 is created, camouflaged, and written out whenever a fragment heap 1651 becomes full or is terminated. It is full when it reaches 65,521 or more bytes, i.e., it no longer has capacity for a 16 byte fragment 1620. It is terminated when there is no more input data from original data files. If full, the fragment heap 1651 is padded with random bytes as necessary to 65,536 bytes; if terminated, it is padded to the nearest multiple of 1,024 bytes. In general, if there is more than about 7.5 megabytes of input from original data files 0220 (120 times 65,536), the maximum number of composite files 0250 is in use, and later segments are appended round robin at the end of the composite files 0250 already created.

(5) Count of Internet redundancy stores the redundancy setting 0430, value 0 to 3 copies, specified by the user.

A series of offsets 1390 pointing further on within the reconstitution file 0270 complete the header 1250. All but two of these compressed integer offsets are measured in bytes from the beginning of the reconstitution file 0270. Eight offsets follow:

(1) The first offset points to the beginning of location strings 1410.

(2) The second is a relative offset, added to the first offset to find the location string which indicates the directory 0310 containing random tables 0230.

(3) The third offset is also relative, added to the first offset to find the location string, which indicates the working directory 0420.

All remaining offsets are counts of bytes from the beginning of the reconstitution file 0270.

(4) The fourth points to the name 1420 of the first (and perhaps only) reconstitution file 0270.

(5) The fifth offset points to the name 1430 assigned to the index file 0260.

(6) The sixth offset points to the name 1440 assigned to first of the composite files 0250.

(7) The seventh offset points to the beginning of an array of from zero to 48 compressed integers, the active elements of variable PvtLocOffsets[16][3], where each element is a relative offset within location strings 1410. These strings are the target Internet locations 0440, if any, of composite files 0250. From 0 to 3 Internet locations are used for each of "dispersion count 0410" (2 to 16) groupings of composite files 0250. Technical caution: the seventh offset is absolute, the array to which it points contains relative offsets. In the case that the redundancy count 0430 is zero and Internet locations 0440 are not assigned, this seventh offset contains a value that may be disregarded.

(8) The eighth and last offset in group 1390 points to the beginning of the reconstitution plan 1270.

FIG. 14 delineates in order the elements comprising the reconstitution body 1260 within the reconstitution file 0270. These elements are either variable length or unpredictable in number until all variables (see FIG. 13) in the reconstitution header 1250 are known.

Location strings 1410 are null terminated ASCII strings. They take one of two forms. Those on hard drive or on local-area network ("LAN") drives each contain a drive letter, a colon, and a directory or subdirectories sequence (example: "c:\data\RandomTables"). Internet locations typically start with "ftp." or "www." followed by a text string, a type identifier, and possible directory and subdirectory elements separated by slashes. The first location string 1410 is normally that of the directory 0310 containing the random tables 0230. The second is normally that of the working directory 0420. Location strings 1410 are written one after the other, with only a terminating null to separate them. Location strings 1410 are referenced by their relative offsets within this concatenated list. For example, the first location is zero, the second location counts forward the length of the first location plus one for its null.

Names 1420 of reconstitution files 0270 are as discussed under 0451 names of output files, 0320 name of first reconstitution file, and 0450 prefix for output file names. The next two entries 1421 and 1422 provide detail.

The name of the first reconstitution file 1421 appears in long form. The user was given the option to impose a name 0320 for the first reconstitution file 0270. Long form names in many operating systems may be up to 256 bytes in length. If no name was imposed, a scrambled name is used. The name, whatever its derivation, is stored at this point in the reconstitution body 1260.

Names of additional reconstitution files 1422, if any, are stored in the short form. If multiple pass cascading fragmentation 0362 is used, there are up to six additional reconstitution files 0270 created, one for each cascade after the first. The names are as discussed under names of output files 0451 (see also 0450, 0452, and 1230). When stripped of its .REC suffix, each name is comprised of exactly 8 bytes of letters and digits; the last five or more are randomly selected. These additional names (if any) are recorded immediately after the name of the first reconstitution file 1421, each with a terminating null byte.

The name 1430 (see also 1170) of the one index file 0260 is disguised under what appears to be the name of a composite file 0250. The eight first bytes of that name with a terminating null byte are recorded at this point in the reconstitution body.

The names 1440 of the 2 to 120 composite files are stripped of their .PVT suffix. The eight byte names as discussed above (0451 and 0450) are listed one after another at this point in the reconstitution body 1260. Each eight byte name is followed by a terminal null.

Offsets of Internet locations 1450 take the form of from zero to 48 compressed integer relative offsets within location strings 1410. The actual number is determined by calculating the redundancy setting 0430 (range 0 to 3) times the dispersion count 0410 (range 2 to 16). Each Internet location string appears as a null terminated ASCII sequence within strings 1410; among offsets 1450 each is referenced by its relative offset within the set of location strings 1410 within the reconstitution body 1260.

FIG. 15 sets out the elements that are the building blocks of the reconstitution plan 1270. The reconstitution plan 1270 is a compressed list of the steps required to reconstitute original data files 0220 from the dispersed composite files 0250 and the index file 0260. The process of reconstituting data 0160 is a precise and exact step-by-step reversal of the actions taken during the fragmentation run 1740. For example, some action codes are associated with the opening or closing of files. Where a code represents opening a file for processing in fragmentation 1740, that code represents closing the same file and finishing processing of that file in reconstitution 0160. The same reversing effect applies to all actions. One consequence is that files must be fully identified both when they are opened and when they are closed.

The reconstitution plan 1270 comprises one byte action codes followed immediately by a trailer appropriate to that action code. In the plan 1270, action codes and trailers are interspersed as one continuous byte stream. There are 12 action codes; their numbering is historical accident deriving from creation of the first prototype. The one essential feature is that the numbers must be under 256 so that each code may be expressed in one byte. The discussion at this point views the reconstitution plan as a completed entity; FIGS. 18, 19, and 20 deal with how this entity is created.

Each record 1501 within the reconstitution plan denotes an action code 01. The most basic process in the system and method to privatize computer data 0110 is to identify a fragment 1620 from within a original data file 0220, apply disguising techniques to the fragment, and assign it a location in one of a plurality of fragment heaps 1651. This process is directed by a fragment handling guide 1640, which is drawn from a random table 0230. A lengthy series of such actions 1501 can be recorded very compactly in only five bytes—the 01 code in one binary byte, the two byte address of a starting location for the first in a series of fragment handling guides 1640, and the two byte address of the last location in that series. In the process of reconstituting privatized data 3040 this five byte sequence provides all that is needed to apply in reverse order a series of fragment handling guides 1640 in order to remove disguises from fragments 1620 drawn now in reverse round-robin order from composite files 0250 and to reconstitute the original data files 0220 in their vulnerable form.

Each record 1502 denotes an action code 02. This is a single instance of applying one only fragment handling guide 1640 to one particular fragment 1620. Action code 02 is used in the special case where the fragment 1620 constitutes the remaining byte(s) at the beginning of an original data file 0220, and that fragment is shorter than is indicated by the selected fragment handling guide 1640. The trailer for an action code 02 consists of the two byte address of the specific fragment handling guide 1640 and one byte indicating the actual length of the residual fragment 1620. Entity 1502 (action code 02) is relatively infrequent—not more than the number 0730 of original data files 0220 that comprise input for one privacy protected archive 0261.

Each record 1511 denotes an action code 11. This one byte code plus a compressed integer trailer indicates the closing of a original data file 0220 which is output during reconstitution 0160. (During fragmentation 1740, the same 1511 action indicates opening the next available original data file 0220 as input.) The trailer is the offset within the index file 0260 where information is stored regarding that original data file's name 0540, directory location 0530, size 0560, date and time 0570. Where there is only one cascade (single pass fragmentation 0361), the trailer is an absolute offset within the index file 0260. Where there has been multiple pass cascading fragmentation 0362, the trailer for an action code 11 is relative within the offset range 1364 indicated within the reconstitution file 0270.

Each record 1512 denotes an action code 12. This one byte code plus a compressed integer trailer is the counterpart of an action code 11 (entity 1511). Action code 12 signals opening the next available original data file 0220 during reconstitution and closing it during fragmentation. The trailer is an offset in the index file 0260, the same as in action code 11.

Each record 1513 denotes an action code 13. There are up to 16 file pointer streams available for input during fragmentation 1740, or output during reconstitution 3040, of data elements read from or written to original data files 0220. Each such file is opened once and closed once; during the time that it is open, the original data file 0220 is associated with one and only one stream. The streams are numbered 0 through 15. Thus, while it is open, an original data file 0220 is fully identified by a four bit (half a byte) stream number. This very compact identifier is used within fragment handling guides 1640; since these are drawn from random tables, the effect is unpredictability with respect to where fragments are drawn from or written to. Streams are opened only once, and closed only once during either privatizing 1740 or reconstitution 3040. Zero, one, or a plurality of original data files 0220 may be handled through one stream, but only one file at a time. When there are over 16 original data files 0220, then all streams will be open for at least part of the processing. When a file associated with that stream is closed, the next file to be opened will be associated with that same stream. It is of fundamental importance to know which streams are open and which are closed. Action code 13 plus one binary byte containing the stream number 0 to 15 signals opening a stream for the first time during reconstitution and permanently closing the stream during fragmentation once the point is reached that there are no further original data files 0220 to process. Action code 13 is used once for each stream number. When a stream is closed, the stream number in any fragment handling guide 1640 defaults automatically to the next higher stream number that is still open (cycling through . . . , 14, 15, 0, 1, 2, . . . and up as needed).

Each record 1521 denotes an action code 21. This one byte code has a trailer of four integers. During reconstitution 3040, action code 21 prompts a sequence of identifying a composite file 0250, opening that file, identifying and positioning to a composite segment 1652 within that file, reading that segment into a fragment heap 1651, closing the composite file 0250, and positioning a pointer to the first byte past the end of the real data in the segment (to any random padding that filled the segment out to 65,536 bytes or to some lower multiple of 1,024 bytes). The four integers in the trailer are: (a) a two byte size 1654 of the composite segment 1652 in bytes prior to random padding—typically a value just less than 65,536, with the value zero interpreted as exactly 65,536; (b) a one byte value 0 . . . 119 which specifies a particular one of the up to 120 composite files 0250; (c) a one byte value 0 . . . 15 which specifies one of the fragment heaps 1651; and (d) a compressed integer containing the offset in multiples of 1,024 at which the composite segment 1652 begins within the composite file 0250. Example: Suppose an action code 21 appears in the reconstitution plan followed by the four values 65531, 97, 2, and 192. That means that the segment is 65,531 bytes long, the composite file 0250 name and related data are found at subscript 97. The segment of interest will be placed in fragment heap subscript 2 during reconstitution, and will be read from the target file starting at 192 k (byte # 196608).

Each record 1522 denotes a dummy action code 22. This is used during a fragmentation run 1740 to carry temporarily some of the trailer data for action code 21. Action code 22 does not appear in the reconstitution plan 1270 and is not used in the reconstitution process 3040.

Each record 1531 denotes an action code 31. This one byte code with a one byte trailer signals a cessation of use, at least for the time being, of a random table 0230 during the reconstitution process 0160. The trailer holds the subscript 0 ... 7 of the random table. This subscript in turn points to the 65,551 byte buffer 1630 set aside for the random table and to one of the eight random table identifiers 1370 in the reconstitution header 1250. In every instance but the last, an action code 31 and its trailer are followed by an action code 32.

Each record 1532 denotes an action code 32. This one byte code plus its one byte trailer are the counterpart to action code 31. Action code 32 refers to the commencement of use of a random table 0230 during the reconstitution process 0160. The trailer is exactly as for action code 31.

Each record 1541 denotes an action code 41. Content of the camouflage buffer 1680 is swapped at random intervals during processing in both directions. Action code 41 signals closing out the use of one set of contents during reconstitution. The one byte trailer contains an entry number 0 ... 119, which specifies a particular one of the up to 120 composite files 0250.

Each record 1542 denotes an action code 42, the counterpart of action code 41, with the same one byte trailer. Action code 42 signals loading the camouflage buffer with the first 65,536 byte sector of the indicated composite file 0250.

Each record 1591 denotes an action code 91. This last action code takes a four byte trailer, identical in makeup to the action code 01 trailer, that is, a beginning 16 bit offset and a terminating 16 bit offset within the currently active random table 0230. Action code 91 indicates a series of exclusive OR operations being applied from the camouflage buffer 1680 to a composite segment 1652 in both directions of processing. During fragmentation 1740, a random number of exclusive OR operations are applied from the camouflage buffer 1680 to the composite segment 1652 just before it is written out to a composite file 0250. During reconstitution 3040, the same exclusive ORs are applied (in the reverse order) to a composite segment 1652 just after it has been read into the buffer for the fragment heap 1651 from the composite file 0250. Each exclusive OR operation is guided by 6 bytes in the active random table 0230. Action code 91 appears in the reconstitution plan as the very first entry after a composite segment 1652 has been read in. The trailer indicates a range of bytes in the currently active random table 0230—from 2 byte address to 2 byte address. Each two byte address in the range points to a six byte portion, again within the currently active random table 0230. This six byte portion is treated as three two byte integers: (a) starting byte in the camouflage buffer, (b) starting byte in the fragment segment buffer, and (c) length of the exclusive OR operation. Exclusive ORs are truncated if they pass the end of either the camouflage buffer 1680 or the composite segment 1652 held in the buffer for the fragment heap 1651.

The purpose of action code 91 is to destroy, all if any, vestige of pattern in composite files 0250. The content of the camouflage buffer 1680 is randomly changed. All exclusive OR operations are random and unpredictable. The result is that the person wishing to recover data is utterly dependent on access to the reconstitution plan 1270 within the reconstitution file 0270. There is a staggeringly high number of possible exclusive OR options across a privacy-protected archive 0261. For a reverse engineer, there is no objective evidence to show whether any particular attempt has been an improvement or deterioration in progress toward the solution. Without the reconstitution file 0270 to provide the reconstitution plan 1270, a reverse engineer or even a person equipped with full source code is unable to retrieve the original data files 0220 in their vulnerable form.

Note that action code 91 is applied during the last cascade only if the user has selected multiple pass cascading fragmentation. Very little is achieved by obscuring patterns in the temporary files since the interim outputs are deleted and only the last set of composite files 0250 is kept.

All discussion to this point has been of inputs and outputs pertaining to the system and method to privatize data 0110. FIG. 16 introduces intermediate objects 0280 which support the processing required to convert inputs to outputs. There are ten such objects or groupings of objects. Variable names are shown for some of the elements in the support groups; these names are drawn from the microfiche appendix accompanying this patent application; see in particular the header file "PryvitDL.h".

(1) Intermediate object group 1610 comprises support for 16 concurrently active original data files 0220. The user's original data files 0220 are unpredictable in size and number. There is no assurance that it is safe to read an entire file into random access memory. Hence each such file is brought one segment at a time into a specific one of 16 original data buffers. The primary members of intermediate object group 1610 are 16 original data buffers 1612, and a current input identifier 1613. The latter is a value from 0 to 15 which designates which of the up to 16 members of the group is being currently referenced.

Most operating systems allow more than 16 file streams to be open at one time, but not necessarily 32 or more. The limit of 16 open file streams is selected both because it is supported by all relevant operating systems, and further because it allows a file that is open to be completely identified by a four bit value 0 through 15. The result is that references to one of the user's original data files 0220 can be compressed to four bits within the reconstitution plan 1270.

The original data buffers 1612 take the form of an array of one byte integers named "OrigBuff[16][2048]. (The value 2048 is arbitrary; any value may be selected that is appropriate for memory management under the implementation's selected operating system and computer language.) The current input identifier 1613, that is, the currently referenced member in the support group 1610, is identified by an integer "CurrOrigNo" (value 0 to 15) drawn from a fragment guide 1640. Other relevant variables in intermediate object group 1610 are: (a) integer "sizeOrigFile[16]"=the size of each original data file 0220 currently open, (b) integer "TimeStamp[16]"=the date and time of each such original data file, (c) integer "OrigDirLocn[16]"=the offset within the location strings 1410 of each such file's directory location, (d) file stream pointers "fpOrig[16]"=operating system access to up to 16 currently open original data files

0220, (e) integer "ptOrigBuff[16]"=pointers within each buffer, and (f) single byte integer "OrigStreamActive[16]"=a flag to indicate for each stream whether it is currently active/open, with 0 indicating inactive and 1 indicating normal operations.

(2) A fragment 1620 is an essential subset of an original data file 0220. In processing to privatize data 0290, original data files 0220 are exploded into fragments 1620 with each fragment ranging from 1 to 16 bytes in length. The small and unpredictable size of fragments 1620 and the further unpredictable ways in which fragments 1620 from multiple original data files 0220 are disguised and placed together in composite files 0250 enhances the method's intended indecipherable pattern-free privacy.

(3) The random table buffer 1630 supports eight random tables 0230 in memory. Logic in later processing is simplified if each of eight sections within the buffer is 65,551 bytes rather than only 65,536 bytes in length. The program 0930 has identified the directory 0310 containing random tables 0230. It searches that directory for names of the form PVT#####.TBL; there must be a minimum of one for the program to continue. If over eight random tables are present, the program randomly selects any eight. If eight or fewer are present, all are selected. Each of the selected random tables is read into one of eight sections in the buffer (single byte integer "RTable[8][65551]"); then the first 15 bytes are copied over into the extra space at the end of the section. This means that the longest fragment 1620 (16 bytes) can be matched by any two byte address zero to 65,535 within the random table 0230. A pointer within the active table is declared (integer "ptRTable") for a variety of uses. A further need is to know which random table 0230 is currently active; this subscript is stored in an integer "ActiveRTable".

(4) A fragment handling guide 1640 comprises six successive bytes from the random table 0230. In step 1840 the fragment handling guide will be broken into components. The first component is current input identifier 1613 which designates which of the up to 16 input streams will act as the source of the fragment. This value 0 to 15 is taken from the high order four bits of the first byte of the fragment guide 1640. The length 1642 of the fragment (integer "FragmentLength") is calculated by adding one to the value in the last four bits of the same byte; the length ranges between 1 and 16. In the special case 1502 where the length remaining in the original data file 0220 is shorter than that calculated from the guide 1640, the length 1642 is set to the actual remaining length. The second and third bytes of the guide 1640 are treated as a pointer 1643 (integer "BgnFragXOR") within the currently active random table 0230 to a stream of random bits equal in length to the fragment 1620. These random bits will be overlaid on the fragment in an exclusive OR operation as a method of primary disguise of the fragment. The fourth through sixth bytes of the guide 1640 are each split into two 4 bit integers, "DisguiseMethod[3]" and "DisguiseParam[3]", the high and low four bits of each byte respectively. These fragment disguise controls 1644 guide up to three additional mathematical techniques that may be applied to a fragment 1620 to disguise its content.

(5) Intermediate object group 1650 is support for 16 fragment heaps 1651 (single byte integer "FragHeap[16][65536]"). Each 65,536 byte heap is a repository (or storage structure, such as, but not limited to a buffer) for fragments 1620 that have been drawn from the original data files 0220 and disguised per the parameters in a fragment guide 1640. Only "dispersion count 0410", that is, 2 or more of the fragment heaps 1651 will be in use; any extras in the range "dispersion count plus one" up to 16 are idle. Pointers (integer "ptFragHeap[16]") indicate accumulated bytes in each heap. When a fragment heap is so full that it cannot contain the next fragment, or when there are no original data buffers 1612 remaining active within intermediate object group 1610, the size 1654 of the fragment heap 1651 is noted, and then the fragment heap 1651 is padded as necessary with random bytes out to the next multiple of 1,024 bytes. At this point (being full or terminated, and then padded), the content of the fragment heap 1651 becomes a composite segment 1652. This composite segment 1652 is subjected to a camouflage process (1680 and 2085), then written or appended to a composite file 0250.

(6) Group 1660 is support for 120 composite files 0250, many of which may be inactive throughout one session of privatizing original data files 0220. (a) An integer value, "MaxCtPvtFiles", is calculated based on the dispersion count 0410 to set the actual maximum number of composite files 0250. Per the discussion under the third of the five file counts 1380, for dispersion counts of 2, 3, 4, 5, 6, 8, 10, 12, and 15 the maximum count is 120 since 120 is a multiple of each of these numbers. The other maxima are set to the nearest multiple under 120 . . . 119 for 7, 117 for 9, 110 for 11, 117 for 13, 112 for 14, and 112 for 16. This count is included as the third among the five file counts 1380 included in the reconstitution header 1250. (b) Another integer, "ctPvtFiles", tracks the count of composite files actually created, up to the above maximum value. (c) An integer "ctPvtSegments" counts the segments written so far; this is the same as the count of files until the maximum count is reached. (d) The names of 120 composite files 0250 (as well as the index file and seven reconstitution files) are created, per the discussion under the heading names of output files 0451. The 128 names are checked for uniqueness in characters 4 through 8, and more names are created as necessary to ensure this uniqueness. If the user has specified a common prefix 0450 to the output file names, this is applied to all the names. Note that composite files 0250 are only opened momentarily, and only one at a time, in order to write or to append a composite segment 1652. There are therefore no ongoing file pointers or open streams for output composite files 0250 (in contrast to the handling of input).

(7) Group 1670 is support for one index file 0260 as described in FIG. 11.

(8) The camouflage buffer 1680 supports camouflage of composite segments 1652. The camouflage buffer is exactly 65,536 bytes in size, matching the size of a random table 0230 and a full fragment heap 1651. The camouflage buffer 1680 can be declared as single byte integer "Camouflage [65536]", together with a pointer (integer "ptCamouflage") within the buffer, and another integer (integer "idCamouflage") to specify current contents of the buffer. When initialized, the buffer is loaded with a copy of the first 65536 bytes of the first section of the random table buffer 1630, and the identifier is set to some "magic number" outside the normal range to identify the temporary special content. It is sufficient at this point to initialize the camouflage variables; usage of the camouflage buffer will be discussed in 2020 and 2085.

(9) Group 1690 relates to a temporary file to accumulate fragmentation steps. This fragmenting record is unpredictable with respect to number of steps and cumulative size. Since the information is not used until it is time to build the reconstitution plan (steps 2130 and 2140), another entity is initialized at this point. A temporary file 1690 is established to record fragmentation actions/steps. The file consists of one byte action codes alternating with four byte fixed length trailers. A count of fragmentation action records is helpful data. Records 1501 merit special handling, since one action code and one trailer summarize many sequential action code 01 steps. Therefore provision is made to count unbroken sequences of action code 01 steps and to record the offset of the first fragment guide 1640 within the currently active random table 0230.

(10) Group 1695 relates to support for locations strings. There is one directory 0310 on hard disk for all the random tables 0230, one location on hard disk for the working directory 0420, and up to 16 times 3 (or 48) Internet locations 0440 (see also 1450). Data must be put in its final form in order to have access to the offset of each location within the buffer. Assuming the worst case of 256 bytes for each of the 1+1+48 locations means that it is sufficient to set aside a buffer of 12,800 bytes. Support includes the necessary pointers to these up to 50 strings.

FIGS. 17 through 21 deal with processing steps acting upon or creating the input, output, and intermediate entities above.

FIG. 17 provides a first level of detail of the steps involved in processing 0290 to privatize data. Before getting into detail, consider the key aspects of FIG. 17. After initialization, fragments 1620 of up to 16 original data files 0220 at a time are drawn in apparently random order progressively forward from the end of each input file, disguised, and added round robin at the end of fragment heaps 1651. Completed fragment heaps 1651 are padded into composite segments 1652, then camouflaged and written out to composite files 0250. The balance of the method comprises the steps of creating a reconstitution file 0270, finalizing and dispersing the various outputs, and reporting results to the user.

Now for greater detail regarding FIG. 17. The user is presumed to have clicked on the first tool bar icon in FIG. 01, the system and method to privatize computer files 0110.

In step 1710, the user inputs the control selections. Behind the scenes, the program devises the preferred default values and displays them within the "options" (FIG. 03), "locations" (FIG. 04), "select files" (FIG. 05), and "select drive" (FIG. 06) dialogs. The user's choices within these dialogs are presented in detail earlier in this document (FIGS. 03 through 06).

Step 1720 is to initialize the intermediate objects 0280 as detailed in FIG. 16. This initialization in part precedes, in part is simultaneous with, and in part follows up on step 1710. Most of the detail can be inferred from FIG. 16. Certain portions warrant further comment. For example, with the current file selection list 0520 in hand, it is possible to open up to sixteen original data files 0220 (see intermediate object group 1610). Here refer to function "OpenOne-Orig.cpp" in the microfiche appendix, whose precise logic for opening each input original data file 0220 is summarized. The first time data is read from an original data file 0220 into one of the 16 original data buffers 1612 within intermediate object group 1610, the system positions to 2,048 bytes before the end of the original data file 0220 and reads the last 2,048 bytes into the appropriate one of the 16 original data buffers 1612 in sequential order. In the actual processing (FIGS. 18 and 19), under direction from the random table 0230 and the fragment handling guide 1640, fragments are drawn successively from the end and progressively forward from the original data buffer 1612, and are added at the end of the next fragment heap 1651 in sequence. Key point: Original data files 0220 are fragmented from the end, moving progressively forward. The cost in complexity is minor compared to the efficiency and simplicity that are achieved in writing out reconstituted original data files 0220 when they are later retrieved 0160 from their privatized state.

Each time a portion of an original data file 0220 is loaded for the first time, a file pointer to an input stream is opened. If there are less than 16 original data files 0220 in total within the selection list of data files 0520, then a flag should be set to indicate there are less than sixteen input files (see intermediate object group 1610).

Initialization 1720 must provide for cascading 0362 if this has been selected. This is accomplished in part by putting step 1740 within a loop with "count of cascades 0360" (1 to 7) iterations.

The central task within FIG. 17 is to fragment (1740) original data files 0220. Detail of this processing is found in FIGS. 18, 19, and 20.

Step 1750 is reached from step 1820 when all input data has been processed. Step 1750 consists of finalizing and dispersing composite files 0250. Each fragment heap 1651 is randomly padded 2010 to the nearest 1,024 byte multiple, transforming it into a composite segment 1652. The remaining steps in FIG. 20 are repeated for each of the fragment heaps 1651. If the user has elected to disperse composite files 0250 to Internet locations 0440, all files are copied, normally by file transfer protocol (FTP), to their respective Internet destinations.

Step 1760 is to finalize the index file 0260. It has been written to disk progressively during fragmentation. If a suitable disguising technique has not been applied during processing, the content may be retrieved, its contents disguised, and written out with the assigned name 1170. If outputs are being dispersed to the Internet, the index file 0260 should be sent to the first of the "dispersion count 0410" sites (with copies to mirror sites if redundancy count 0430 is greater than one).

Step 1770, building a reconstitution file, is described in FIG. 21.

Step 1780 consists of housekeeping matters such as closing files that are open, and deleting original data files 0220 if the user selected the option 0340 for automatic deletion. Deletion may be more secure if the content of the file is overwritten with random data and saved prior to its deletion. Step 1780 normally includes reporting to the user successful completion. The version in the microfiche appendix also reports timing. When an exceptional situation occurs, the interface must list specific error situations encountered in the process of privatizing computer data.

FIG. 18 sets out detail underlying step 1740, fragmenting original data files 0220. This processing is set up within a loop that may be traversed hundreds of thousands of times for one set of original data files 0220. There is considerable detail within each step shown in FIG. 18. A good implementation depends on checking very quickly whether each particular step applies on a particular iteration. For example, steps 1810 (check input status), 1830 (process random table matters), and 1860 (ensure space for fragment) normally amount to nothing more than a very high speed check of a condition before proceeding to the next step. The core steps of fetching a fragment guide and interpreting it 1840, applying the guide to disguise and append a fragment to a fragment heap 1880, and recording an action 1890 are each very quick. The net result is that the user perceives a rapid completion of the task of privatizing an entire set of original data files 0220. The version in the microfiche appendix demonstrates the speeds that can be attained in a good implementation.

FIG. 18 consists of the following repetitive steps.

Step 1810 is to reset and check input data status. There is no need each time to check every one of the up to 16 inputs, but only the one input from which a fragment was drawn in the preceding iteration. If 16 or more bytes remain (enough for the largest possible fragment), then nothing more remains to be done in step 1810. In the exceptional situation in which the number of bytes remaining in the most recently active original data buffer 1612 has dropped below 16, only then is it necessary to proceed through the detail of step 1810 found in FIG. 19.

Step 1820 is to determine whether every input stream has reached the point of having no further input data. This amounts to checking a flag that is set within the detail in FIG. 19. If more input data exists, processing passes to step 1830. Once and once only, when the point is reached in which all data has been used up, processing passes instead to step 1750, finalizing and dispersing the composite files 0250.

Step 1830 serves the purpose of reducing predictability and suppressing the emergence of patterns that might otherwise inform a reverse engineer who is trying to interpret files within a privacy protected archive 0261. Processing random table matters 1830 may be subdivided into periodic swap of the active random table 1831 and periodic swap of the start position step 1832 within the active random table 0230.

In step 1831, it must first be determined whether it is time to swap the selection of which section of the random table buffer 1630 is currently active. If only one section of the random table buffer 1630 is in use, the answer remains "no" throughout. If two or more random tables 0230 have been found and loaded during initialization (1720 and 1630), then swaps are possible. If there are three or more, the choice of which to designate the active section is made randomly. In function "HandleRTable.cpp" in the appendix, the swaps are set to occur on the average once in every 256 fragments 1620 that are processed. This must be at random rather than calculated intervals, since a central objective of the present invention is unpredictability. Therefore, a random number is selected each time this point is passed. If the random number is a multiple of 256, the choice of section within the random table buffer 1630 is swapped (one chance in 256). If there is a swap, it is recorded with an action code 32 (close during fragmenting 1532) followed by an action code 31 (open during fragmenting 1531). The swap amounts only to a change of subscript (integer "ActiveRTable") from one value to another within the range zero to seven.

In step 1832, it is determined whether it is time to change position within the current section of the random table buffer 1630. The answer is yes under any of following conditions: (a) the pointer is within six bytes of the end of the underlying random table 0230, (b) a random table swap has just taken place, or (c) a random number is a multiple of 512 (one chance in 512). Note that repositioning within a random table buffer 1630 breaks a series of action code 01 processes. The next action code 01 (record 1501) must start with a new beginning position.

Step 1840 involves obtaining and interpreting a fragment guide 1640. An example of the logic appears in the function "GetInterpretFragGuide.cpp" in the appendix. The guide is copied from the currently active random table buffer 1630, starting either immediately after where the preceding six byte guide was taken, or (if step 1832 led to a change) at the designated new starting point. Once copied, the guide is broken into its components . . . the source file stream number 1641, the fragment length 1642, the pointer for the beginning of the exclusive OR operation 1643, and the three fragment disguise controls 1644. The first half of the first byte yields the new current input identifier (1641 and 1613) which indicates which of the sixteen original data files 0220 is to act as source of the fragment 1620. If this stream has been marked inactive (because it is out of data), the number of the next higher active stream is used (cycle to zero after fifteen). Next, adding one to the second half of the first byte yields sixteen possible fragment lengths 1642 ranging from one to sixteen bytes. Bytes two and three of the fragment guide 1640 are used as a seemingly random offset within the currently active section of the random table buffer 1630 to be used as the starting point for a byte-for-byte exclusive OR operation applied to the fragment 1620 with a string of the same length within the same section of the random table buffer 1630. Recall that in anticipating an overflow, the first fifteen bytes are repeated at the end of the section of the random table buffer 1630. Bytes four, five, and six each control a further method of disguising the current fragment 1620 with the first four bits designating the method, and the last four bits a parameter for that disguise. For example, bit shifting might be one of the sixteen methods, and the last three bits of the lower four bits can designate the starting point for the bit shifting. In the version in the appendix, bit shifting is implemented for the first control 1644; the second and third controls are left unused.

Step 1850 involves simply copying the last fragment-length 1642 bytes from the original data buffer 1612 designated by the current input identifier 1613. There are sufficient bytes in that original data buffer 1612 except in the case where in step 1810 it is found that the original data file 0220 in its entirety has been read, and that all but one or a few bytes of the last original data buffer 1612 read from that original data file 0220 is as yet unprocessed. If there are insufficient bytes left, this is noted, so that an action code 02 (1502) will be recorded rather than an action code 01 (1501).

The fragment is now on hand, not yet disguised. The next step, 1860, ensures that there is enough space to receive this fragment in the next eligible fragment heap 1651. In most cases, there is enough space. In the exceptional case, space must be provided. There are two to sixteen open fragment heaps 1651. Eligibility is determined on a round robin basis. More specifically, the first fragment 1620 is sent to fragment heap 1651 subscript zero, the second fragment to fragment heap 1651 subscript one, etc. . . . the next fragment to the nth fragment heap 1651 (dispersion count 0410 less one), and the following fragment 1620 to fragment heap 1651 subscript zero. If the fragment heap 1651 does not have enough space, the target fragment heap 1651 is finalized in step 1870.

Step 1870, finalizing a fragment heap, is expanded in FIG. 20 below.

Step 1880 involves disguising and appending the current fragment 1620 to the next fragment heap 1651 in round robin order. At least two disguises should be applied to each fragment 1620. Each disguise should be computationally quick, and should use random data drawn from the fragment guide 1640 as parameters. These techniques, combined with the fact that fragment 1620 borders are undefined, make the emergence of patterns virtually impossible. In example function "DisguiseFragment.cpp" in the microfiche appendix, the first disguise is an exclusive OR onto the fragment 1620 with length 1642 starting at the point in the currently active section of the random table buffer 1630 designated by pointer 1643. From zero to three additional disguises may be applied using the disguise controls 1644.

In the example function "BitScramble.cpp", the second disguise is a lateral shift of bits across the bytes of the fragment 1620. Note that these "short key" techniques are computationally much more efficient that conventional encryption. They also remain well within any known legal limit on key length.

In step 1890, the action taken on the fragment 1620 is recorded. In most cases, the record is simply an action code 01 (1501); in this case, nothing is written for the time being to the temporary file 1690 to accumulate actions. If this is the first action code 01 in a row (some other action code has intervened since the last action code 01), then the beginning and ending addresses for the trailer are set the same. If it is a subsequent action, the ending address is changed in the trailer. However, if the fragment 1620 was smaller than the size designated by the fragment handling guide 1640, this latest iteration through loop 1810 to 1890 is recorded as an action code 02. (If an action code 02—or any code other than 01—is written, then any accumulation of action 01 records 1501 must be written first.) To complete step 1890, the current heap pointer is reset to zero, and the fragment heap 1651 assignment is set to the next sequential higher number (or back to the first heap if the dispersion level 0410 has been reached).

At this point, processing returns to step 1810. Steps 1810 through 1890 comprise a loop, which is reiterated until no original data files 0220 remain.

FIG. 19 is an expansion of step 1810 which focuses on management of an original data file 0220 while fragmenting. FIG. 19 comprises steps 1910 through 1990.

Step 1910 determines whether sixteen or more bytes exist in the "latest use" original data buffer 1612. Latest use is determined by the identifier 1641 in the latest fragment guide 1640. If there are sixteen or more bytes in that original data buffer 1612, then input status 1810 is okay for this iteration through the loop comprising FIG. 18; control is passed to step 1820 in FIG. 18.

If in step 1910 it is determined that there are fewer than sixteen bytes in the original data buffer 1612, every possible fragment 1620 size cannot be accommodated therein. The first option in this case is to replenish the original data buffer 1612. Step 1920, replenishing the original data buffer 1612, can be carried out only if bytes remain in the original data file 0220 that have not yet been read into the original data buffer 1612. If that file is already depleted, skip to step 1930.

If unread bytes remain, step 1920 starts by positioning backward in the original data file 0220 roughly 2,048 bytes earlier than the point at which data was brought in from this file on the previous reading. To be precise, the position is 2,048 bytes back, then the number of unprocessed bytes still in the original data buffer 1612 forward. For example, if there are still 13 unprocessed bytes in the original data buffer 1612, the correct positioning point is 2,035 (2,048 minus 13) bytes prior to the point in the original data file 0220 from which content was read the last time from this file. Then 2,048 bytes are read. The 13 residual bytes in the example now appear as the last 13 of the new group of bytes in the original data buffer 1612. On the last reading from the beginning of the original data file 0220, there is typically not 2,048 bytes not yet processed. Positioning in this special case is to the beginning of the original data file 0220. The number of bytes is adjusted to ensure that exactly enough bytes were taken in to handle all the as-yet-unprocessed bytes of the original data file 0220. Also in the special case of reading from the beginning of the file, a flag is set to indicate that content of this original data file 0220 has been depleted.

If replenishing the original data buffer 1612 is successful in step 1920, processing returns to step 1820.

Reading and positioning errors in step 1920 are fatal. If a fatal error occurs due to reading and positioning errors, the entire process is aborted and a final report 1780 is shown to the user.

Step 1930 is reached only if the original data file 0220 was already depleted when step 1910 was reached. Step 1930 determines whether there is still one or more bytes in original data buffer 1612. If there are still 1 to 15 bytes (there will not be more), processing returns to step 1820.

Step 1940 is undertaken if no bytes remain in the original data buffer 1612 after replenishment, step 1920. In this case, that particular original data file 0220 is closed and an action code 12 is recorded (1512).

Step 1950 determines whether any more original data files 0220 remain unprocessed in the user's selection list 0520.

Step 1960 is undertaken if more original data files 0220 remain to be processed. In this case, the next original data file 0220 in the selection list 0520 is opened. It is assigned the same input file stream number as the file that was just closed. An action code 11 is recorded; its trailer contains the offset in the index file 0260 that will apply to the newly opened original data file 0220. The last 2,048 bytes of the original data file 0220 (or all bytes if the original data file 0220 is under 2,048 bytes in length) are read into the same original data buffer 1612. Since all the information is on hand for this new file, a record is made in the index file 0260 . . . the directory entry 1110 if that has changed, the file name 1120, the input stream number 1131, the time and date stamp 1132, the file size in bytes 1133, and the offset of the applicable directory location 1134 within this index file 0260. Control then passes back to step 1820.

Step 1970 is reached when there are no bytes left in the current original data buffer 1612 and there are no further original data files 0220 in the user's selection list 0520. Step 1970 sets a flag that the input stream is no longer inactive. This portion of logic is reached a maximum of sixteen times in one fragmentation processing run. This happens only in the latter stages of the run.

Step 1980 checks whether any file input streams at all remain open. If there are, processing returns to step 1820.

Step 1990 is reached if there are no remaining active input streams. In step 1990, a flag is set to indicate that no further input data remains. Control passes to step 1820 and in this one special case, will pass next to step 1750, finalizing composite files.

FIG. 20 is an expansion of finalizing a fragment heap, step 1870.

Normally, step 2010 is to pad the unused zero to 15 bytes at the end of the designated fragment heap 1651 with random bytes out to 65,536 bytes. In the event that all data has been used and there will be no further fragments, 0 to 1,023 random bytes are added, exactly enough to convert the fragment heap 1651 into a composite segment 1652 whose active size is a multiple of 1,024 bytes.

Step 2020 is to apply camouflage to the composite segment 1652. The purpose is to remove any possibility of patterns appearing within a composite segment 1652 of a composite file 0250. An action code 91 (1591) series of exclusive OR operations is executed for some random number of steps starting at a random point in the currently active section of the random table buffer 1630. See 1591 action step 91 for detail and also see "HandleFragFiles.cpp" in the appendix for an implementation. The camouflage buffer 1680 is used as a source of bytes for exclusive OR operations in random patterns across the composite segment 1652. An action code 91 is recorded with its beginning and terminating offsets within the currently active section of the random table buffer 1630.

Step 2030 involves writing an action code 21 (1521) to indicate closure of the composite segment 1652. The first three trailer items—two byte size of the composite segment 1652 in bytes prior to random padding, one byte value 0 . . . . 119 which specifies the composite file 0250 to which the composite segment 1652 is written, and a one byte value 0 . . . 15 which specifies the fragment heap 1651 from which the composite segment 1652 was created.

Step 2040 is to write a dummy action code 22 with the fourth trailer for action code 21 (1521), the offset in multiples of 1,024 at which the composite segment 1652 begins within the composite file 0250. Action code 22 is needed during fragmentation 1740 because at this stage the trailer width is fixed at four bytes. This restriction is lifted later when the reconstitution plan 1270 is created in steps 2130 and 2140.

Step 2050 is a test to determine if all eligible composite files 0250 have been written to disk. This test takes into consideration the setting of the maximum count "MaxCtPvtFiles" within intermediate objects group 1660, in the range 110 to 120. If not all file names have been used, the current segment is written in step 2060 to a new file assigned the next composite file name in sequence. Otherwise, step 2070 is performed, in which the composite segment 1652 is appended to the next available composite file 0250 in round robin order.

Step 2080 is to check the status of the camouflage buffer 1680. When the first of all the composite segments 1652 is written out to the first composite file 0250, the camouflage buffer 1680 contains only a copy of the first random table 0230. This is swapped out in a step 2085 in the first instance that a composite segment 1652 contains a full complement of 65,536 bytes. At this point, the camouflage buffer 1680 is filled with the content of the first composite segment 1652 that has just been written out in step 2060; this is recorded as an action code 41 (1541). Thereafter, on a random basis (one chance say in four), in step 2085 swap the camouflage buffer content 1680 by overwriting it with the initial 65,536 bytes of the composite file 0250 associated with the latest sector just written out in step 2060 or 2070. In each swap 2085, two records are added to the temporary file 1690 . . . an action code 42 (1542) to "close" the old camouflage buffer content 1680 and an action code 41 (1541) to record the new.

In step 2090 the fragment heap 1651 is reinitiated by resetting the pointers so that the fragment heap 1651 can receive new entries starting at its beginning.

Recall that steps 2010 through 2090 are detail that are entered into only when step 1860 revealed that there was not enough space remaining in the fragment heap 1651 to receive the latest fragment 1620.

FIG. 21 expands upon step 1770, building a reconstitution file 0270. This is reached only after all processing within FIGS. 18, 19, and 20 has been exhausted. The objective at this point is to create a reconstitution file 0270 containing all information needed to retrieve the original data files 0220 in the future. This reconstitution file 0270 will be disguised and encrypted so that it can be used only by the computer that created it.

Step 2110 is to create the reconstitution header 1250. The structure in FIG. 13 is sufficient to guide construction of the header. The first portion of "BuildReconFile.cpp" in the appendix illustrates a straight forward implementation of this step.

Step 2120 is to create the reconstitution main body 1260. All components for the body are described in FIG. 14. Their content is in RAM in final form, so they are simply appended as the next part of the reconstitution file 0270. Again, "BuildReconFile.cpp" provides a useful illustration.

Step 2130 lays the groundwork to cycle through all action codes in reverse order. During fragmentation 1740, all actions were recorded in a temporary file 1690 in fixed width format—one byte action code followed by the trailer in four byte form. These five byte segments must be read in reverse order. Since the full size is known, a buffer can be allocated dynamically. The entire temporary file is read into this buffer. A pointer is set to the end of this buffer.

Step 2140 involves reading the action codes with their trailers in reverse order, copying the code, and compressing integers or otherwise processing the trailer in a way that depends on the particular action code. The result is appended, one action code at a time, onto the end of the reconstitution file 0270. The totality of these action codes with their processed and/or compressed trailers constitute the reconstitution plan 1270. Specific processing of the action codes follows.

Step 2141 applies to action codes 01 and 91 (1501 and 1591). The four byte trailer, consisting of two 16 bit offsets, is copied without change.

Step 2142 applies to action code 02 (1502). The first three bytes are copied, and the fourth byte is dropped.

Step 2143 applies to dummy action code 22 (1522). The first two bytes are retained in memory in preparation for the action code 21 which will immediately follow. There is no further action with dummy action code 22.

Step 2144 creates a four integer trailer with five or more bytes for an action code 21 (1521). Full detail and an example are provided in 1521 above.

Step 2145 applies to action code 13 (1513). The stream number is reduced to a one byte compressed integer trailer.

In step 2146, all remaining action codes (1511, 1512, 1531, 1532, 1541, 1542) have their trailers reduced to one compressed integer.

Step 2150 is undertaken when all action codes and their trailers have been processed to complete the reconstitution plan 1270. Step 2150 is to disguise the completed reconstitution file 0270 in a way that makes it accessible to only the computer which privatized the current set of original data files 0220. The implementation of step 2150 depends on the computer identification system that is used in conjunction with the system and method to privatize computer data. See computer identifier 0922.

Step 2160 is to encrypt the entire reconstitution file using a broadly respected cryptographic algorithm. A definitive choice is outside the purview of this patent application. Recall that the reconstitution file 0270 is normally withheld or distributed only in a most guarded manner 1220. The intent of encryption is to add another layer of protection, should the reconstitution file fall into unfriendly hands. The standard reference work on encryption is Bruce Schneier, Applied Cryptography, 2nd edition, New York: John Wiley and Sons, 1996. In the first Windows implementation of the method to privatize computer data 0110, the selected technique was GOST (Soviet military encryption that came into public domain with the fall of the Soviet Union). A 32 bit key was derived from the 15 random bytes 1310 included at the beginning of the reconstitution header. Calculating a key from random bytes is not as secure as a public key/private key protocol; other methods might be considered as networking connectivity improves in the future. Another significant factor in the choice of encryption methodology (at least for US citizens) is evolution of regulations of the Bureau of Export Administration (US Department of Commerce). Recall that the reconstitution file 0270 has been designed to be quite small relative to the composite files 0250. Because the intensive computation required for encryption is applied to a relatively small entity, the user does not experience the delays to be expected when encrypting large quantities of data.

2170 is the last step in FIG. 10. The disguised and encrypted reconstitution file 0270 is named as in 0320, 0451, and 0450, and written out to hard disk. For the sake of increased security, there is no automatic transfer of the reconstitution file 0270 to Internet locations.

This completes all aspects of processing to privatize data.

FIGS. 22, 23, and 24 demonstrate an implementation of the support procedure to share access 0120 to privacy protected archives 0261, whether for recovery on a backup computer or for deliberate distribution of rights to specific other computers. The distribution procedure is not essential to the system and method to privatize computer data. But it provides an attractive means to get privacy protected information quickly to anywhere in the world, taking advantage of the nature of the Internet. To repeat from above: The Internet appears very public, yet it is an excellent hiding place for composite files 0250 located under obscure directory and subdirectory names. An authorized person equipped with a reconstitution file 0270 tailored to his/her computer plus the correct password 0330 could reconstitute data hidden on the Internet. He or she does not even need to know where the information is; the reconstitution file 0270 holds all the relevant information. Thus the system and method forms a basis for "private distribution" that is quick, accurate, and totally independent of geography (location in the world).

FIG. 22 is technically not part of this patent application. It demonstrates a support process that facilitates granting access to other computers. The viewpoint in FIG. 22 is that of the person requesting access to one or more privacy protected archives 0261.

Note 2210: This capability does depend on a computer identification system of some sort. This technology as noted above (0922 and 0923) is outside the purview of this patent application. Assume simply that there is a means of reliably identifying the computer that is operating the program 0930, and that users can exchange computers signature files 0923 that are self-authenticating.

Note 2220: The screen image shown in FIG. 22 is from a product called "Secure Software Rental" by Marpex Inc. (also the originator of the system and method to privatize computer files 0110). This screen image is viewed on the computer of the person who requests access to one or more privacy protected archives 0261.

In step 2230, fill in a time span over which the signature file created here is to be valid. A default value of 60 days, 0 hours, and 0 minutes is deemed reasonable.

Step 2240, an "in response to" input, may be left blank.

Step 2250 should start with browsing to a location in which the signature file is to be placed. Then give a name for the signature file. A suffix ".XPM" will be added automatically.

Clicking the "save signature" button initiates a process 2260, which creates a computer signature file 0943. This system produces a 1,260 byte signature that uniquely identifies the computer without using data from any files and without any information about the user of the computer or about any organizations. It contains material that can be used later to disguise a reconstitution file 0270 so that it can be used only by this requesting computer and by no other.

In step 2270, the requester transmits the signature file 0943 by some means (possibly email attachment) to the author of the desired privacy protected archive(s) 0261.

FIG. 23 presents the first of two screens used for input by the owner of a master or backup copy of a reconstitution file 0270. The objective is to share access to one or more privacy protected archives 0261 with selected persons on computers for which those selected persons have submitted signature files 0943. These signature files 0943 are collected on the author's hard drive. If the Secure Software Rental version is used, the signature files are placed in a directory called "Marpex" in the drive on which Windows is installed.

Step 2310 is to identify the privacy protected archive 0261 for which access is to be shared. This is done by browsing and selecting the reconstitution file 0270 (or first reconstitution file if multiple pass cascading fragmentation 0362 has been used).

Step 2320 is to enter the valid password 0330 for that reconstitution file 0270.

Step 2330 is to select the rights to be assigned to the new version of the reconstitution file 0270, whether backup 1212 or distribution 1213. Backup versions 1212 have considerably more scope, and should only be given to trusted persons.

Step 2340 is to select one signature file 0943 at a time.

These signature files 0943 are incorporated into a list 2350, which is displayed in the lower half of the screen image. This list should contain signature files 0943 only for computers and users that are to be granted authorization.

A signature file 0943 name 2351 normally corresponds to the name 2250 given by the requester. Built into the signature file 0943 is among other things an eight byte computer ID 2352; see 0922.

A delete button 2360 is available to remove a highlighted entry from the list 2350.

Pressing the "next" button 2370 initiates a brief process to validate that the current computer 0920 has rights to the selected reconstitution file (0270 and 2310), that the reconstitution file type 1320 is either Master or Backup, and that the password 2320 matches the password 0330 in the file. After validation, control passes to FIG. 24.

The steps in FIG. 24 allow the author to set passwords to be built into new copies of the reconstitution file 0270 and 2310.

In step 2410, specify a signature file 2250 from the list 2350.

In step 2420, specify a password and confirm it.

Step 2430 provides an option to assign the same password to all new reconstitution files that will be constructed in the next step.

In step 2440, the author creates new reconstitution file(s), one for each signature file which is to be granted access. The underlying steps are (a) to undo the encryption of step 2160, (b) remove the author-computer-specific disguise of step 2150, (c) replace the computer identifier field 1330, (d) change the reconstitution file type 1320 to either "B" backup or "D" distribution, (e) replace the password 1340 with the selection 2430, (f) replace the disguise, now with one based on the computer signature file for the target requester's computer, and (g) encrypt again as in step 2160. In the Windows implementation, each new reconstitution file 0270 was given the same name as the original; this was placed in a subdirectory named for the requester's signature file 2250.

In step 2450, the author transmits the new reconstitution file(s) to the intended receivers by some appropriately secure means.

On receipt, the user is able to access the privacy protected archive using the procedure to reconstitute privatized data 0160 that has been dispersed to Internet locations 0440.

FIG. 25 presents a support procedure 0130 to validate privacy protected archives 0261. The objective is to ensure that the files necessary for reconstituting privatized data 0160 are accessible. This set of files is comprised of each and every composite file 0250, the index file 0260, other reconstitution files 0270 if any resulting from multiple pass cascading fragmentation 0362, and the applicable random tables 0230. Any user with a reconstitution file 0270 and password 0330 valid on the computer currently in use may validate the corresponding archive 0261.

In step 2510, the user specifies the archive 0261 by browsing and selecting its reconstitution file 0270.

In step 2520, the user inputs the password 0330.

Step 2530 is to select among three types of validation. The options are to check hard disk location only, check for sufficiency of the archive, or check for completeness of the archive. The hard disk requirement limits the search for files to the working directory on the hard disk. Sufficiency requires that at least one copy of each file listed above be found in one of the expected locations. Search is on hard disk first, then on the Internet at the indicated locations 0440. Note that random tables 0230 are required on hard disk. If any are missing, the user should be told the location on the Internet from which the missing tables may be downloaded. Completeness of an archive requires in addition that every Internet-dispersed file copy is in place in the prescribed location; reports on hard disk presence and Internet presence may be separated since the user may not elect to copy all files in from the Internet to hard disk.

The user then clicks on the "verify archive" button. The computer verifies that the current computer is eligible, and aborts procedure 0130 with a report if the computer is not eligible. The selected reconstitution file 0270 is presumed to be in the working directory 0420.

Step 2540 occurs only if the program cannot find the random tables. Step 2540 is to specify location of random tables 0230, typically through a standard browse and select procedure. This is the last user input. Processing from this point forward is under the program's control.

Step 2550 is to check the presence of all needed random tables 0230. This involves extracting the count 1380 of random tables and the associated random table identifiers 1370. This list is compared with the names of random table files 0230 present in the directory selected in step 2540 as the location of random tables. Deficiencies in random tables 0230 will be reported in detail in step 2590, no matter what the reconstitution file type 1320.

Step 2560 is to check the presence of all composite files 0250. This involves passing through the list of composite file names 1440 and checking first on hard disk in the working directory 2510 and, if the validation type 2530 is either Master or Backup, in the Internet locations 0440.

Step 2570, checking the presence of the index file 0260, is a simplified version of step 2560. Only one file name is involved 1430. If Internet locations are checked, it is for the first location only (locations, plural, if redundancy 0430 and completeness checking 2530 both apply).

Step 2580 is to check whether cascading 0362 has been used. This is determined from count of cascades 1362 in the reconstitution header 1250.

If cascading 0362 has been used, step 2581 checks for the presence of the remaining reconstitution files named in 1421 and 1422. The search is limited to the hard disk working directory 2510; the reconstitution file 0270 holds no information on Internet-based dispersion of reconstitution files 0270.

Step 2590 fulfils the purpose of validation . . . a report to the user on the status of the privacy protected archive and the associated files. First, missing random tables 0230 are listed. Then if the reconstitution file 0270 used to specify 2510 the archive is a master or backup type 1320, remaining exact deficiencies should be reported. This list should list file names in all cases and Internet locations where applicable. If the specifying reconstitution file 0270 is a distribution type 1320 only, the user is not entitled to names of files other than random tables 0230, nor to hidden dispersion locations 0440. The user in the latter case is simply advised to contact the author/publisher because the set of files is not complete.

FIG. 26 presents a support procedure to delete privacy protected archives (0140). In step 2610, the user specifies the archive 0261 which is to be deleted. This is done by browsing and selecting its reconstitution file 0270.

In step 2620 the password 0330 is entered. When the user clicks on the "delete archive" button, rights to use the reconstitution file 0270 are checked through both the computer identifier 0922 and the password 0330. If the selected reconstitution file 0270 has only distribution status 1320, all deletions will be limited to the hard disk only.

The location of one reconstitution file 0270 has been determined in step 2610. If multiple pass cascaded fragmentation 0362 has been used, the program checks that the remaining reconstitution files are together in the same location with the named reconstitution file 0270. Note that random tables 0230 are not deleted since they may be associated with other privacy protected archives 0261.

Step 2640 is to request confirmation that the user really wishes to delete all copies of composite files 0250, index file 0260, and reconstitution file(s) 0270. The process aborts if the user selects the "cancel" alternative.

Step 2650 is to delete the files. If Internet locations 1450 are involved, access to the Internet is required at this point. All copies of composite files 0250 are deleted from hard disk in all cases, and from all Internet locations where there is master or backup status 1320. The same procedure is followed with copies of the index file 0260. Finally, the reconstitution file(s) are deleted.

Step 2660 is to report to the user either success or problems encountered.

FIG. 27 provides detail on how to plan dispersion of privatized data 0150. This support procedure amounts to adding to and editing one disguised file, "ILocate.dat" (0915).

When the user selects planning dispersion, step 2710 is to load file "ILocate.dat" into memory. This file is unlikely ever to exceed 10,000 bytes.

Step 2720 is to decrypt the contents or to remove whatever disguise has been applied. The disguise ideally should be computer specific to preclude people taking advantage of stolen "ILocate.dat" files 0915.

Step 2730 is an option to select an existing entry in the display. If this is done, the selection is highlighted.

Step 2740 is an option to delete a highlighted existing entry.

Step 2750 is to validate a highlighted existing entry. This step, if used, requires Internet access. This is a standard procedure.

Step 2760 is to add individual locations, one at a time. This is a less efficient, but more secure, alternative to step 2780.

Step 2770 is to edit locations, user names, and passwords already on file in "ILocate.dat".

Step 2780 is to select and add text files containing additional locations, in the event the user has received file(s) containing locations, user names, and passwords.

Step 2790 is to disguise the contents of the revised file prior to writing it out. If the computer identifier system used in conjunction with this system and method provides an appropriate computer identifier 0922 and/or computer signature 0923, variations on an exclusive OR of the identifier or signature with the buffer content may be sufficient.

Step 2795 is to write contents of the buffer back into file "ILocate.dat".

The advantage of these procedures is that they allow update and expansion of the pool of Internet locations 0440 from which the program may draw when the user specifies dispersion of the components of a privacy protected archive 0261.

FIGS. 28, 29, and 30 deal with an essential support procedure, that of reconstituting privatized data 0160. This will typically be the most frequently used procedure associated with the system and method 0110. Reconstitution logic amounts to a careful reversal of the steps 0290 that were used in privatizing the original data files 0220 in the first place.

FIG. 28 involves two elements of data entry.

In step 2810, the user specifies the target archive 0261 by browsing and selecting its reconstitution file 0270.

In step 2820 the password 0330 is entered.

When in step 2830 the user clicks on the "Next" button, rights to use the reconstitution file 0270 are checked through both the computer identifier 0922 and the password 0330. The location of the reconstitution file is presumed to be the working directory 0420.

FIG. 29 involves three more elements of data entry.

Step 2910 permits recovery to an alternative drive. Directories and subdirectories not present will be created on whatever drive is selected.

Step 2920 is to specify whether all files or only a subset are to be retrieved.

Step 2930 is to indicate whether older files may be permitted to overwrite newer copies in the target location.

The label on the button is "Next" changes to "Retrieve" if in 2920 all files are to be reconstituted. By whatever name, the user clicks on this button to proceed.

The screen image in FIG. 30 appears only if the user specified in step 2920 that a subset needs to be selected.

In step 3010, the program executes steps 2540 through 2581 to validate the archive 0261 on a sufficiency basis 2530. If essential files are missing, the reconstitution procedure 0160 is aborted and the user is informed of the deficiencies. If it is only random tables 0230 that are missing, the user is invited to download copies from the Internet.

In step 3020 the program assembles one copy of each file in the working directory 0420 on hard disk. Failure in any part leads to aborting the procedure and advising the user.

If the user has elected 2920 to retrieve only a subset of the original data files 0220, step 3030 provides opportunity to select the files to be retrieved. The display list is created directly from the content of the index file 0260.

In the three steps "select directory" 3031, "select file names" 3032, and "selection flag" 3033 the interface should mimic the corresponding actions in FIG. 05. This reduces the learning curve and any confusion. For example, directories may be shown in a left panel, with files from the highlighted directory or subdirectory listed in a right panel. The console version in the microfiche appendix lacks the elegance of the later Windows version, but it does illustrate one of many possible marking techniques to show which files the user has selected for retrieval.

Step 3040, a process to reconstitute files, is then launched. This is a direct pass through the reconstitution plan 1270. If the user selected all original data files 0220, then every action is processed. If the user selected a subset of files, a little work may be saved by indicating that a current output is inactive. A second saving comes when all requested files have been recovered; if there are more actions, they may be disregarded at this point. Simply close all files and report.

Anyone capable of implementing the privatizing process will find that retrieval is straight-forward. Much of the source code can be re-used. An efficient and fully functional source code example of the reconstitution sequence is included in the appendix. The heart of a C or C++ language implementation is a switch statement that responds to each action code in turn, starting from the beginning of the reconstitution plan and proceeding code by code. See in the appendix the function "DoReconActions.cpp" and the various "DoAct####.cpp" sub-functions. When the last action code has been processed, all original data files 0220 are in place on the intended drive in the same directory structure in which they were originally found.

Differences between fragmentation 1740 and reconstitution 0160 in all cases serve to speed up and to simplify reconstitution. For example, in reconstitution, lengths of all buffers are known once the reconstitution header 1250 has been interpreted; therefore, memory management is simpler. All use of the reconstitution file 0270 is in read-only mode; nothing has to be created other than the original data files 0220. These original data files 0220 are written out to disk in a forward direction, directly as the fragments 1620 are processed.

Step 3050 is either to report success or to list error conditions encountered.

FIG. 31 presents extensions 0170 to the system and method to privatize computer data.

Extension 3110 consolidates all files within a privacy protected archive 0261 within a single file. This serves a need for simplicity on behalf of persons who wish to retain output from the system and method on hard disk or on a backup medium, without concern for proliferation of files. This objective may be achieved with a simple wrapper for the consolidated output file . . . a listing at the beginning of the names, sizes, and offsets of each embedded file, followed by the named files appended one after another. For security reasons, the user should be given the option whether the reconstitution file or files 0270 is/are to be included within the consolidated file. Security is greater if they are separate; convenience is greater if they are placed together.

Extension 3120 focuses on privatizing a single original data file 0220. There may be circumstances in which it is convenient for the user to have one privacy protected archive for one original data file 0220.

The method in extension 3120 is to mathematically break apart the single original data file 0220 into between three and 16 files, each roughly (but not precisely) the same size. A small "script" file should be created giving the original file name with its size and time-date stamp, plus a breakdown of the temporary names, the size of each temporary file, and from where it was extracted in the original data file 0220. This script file should be added to the other temporary files as yet another input, with a name that flags it as an "implement-this-when-reconstituted" signal. From this point forward, fragmentation 1740 is carried out in the normal way, using the temporary files as the input. Reconstitution 0160 is also normal. The only additional requirement is for the program to recognize at the end of the process that steps are to be carried out under the direction of one of the output files. Technically, all that is required is copying bytes under the guidance of a script, assigning the consolidated result the original name and time-date stamp, and deleting the temporary files and script.

Extension 3130 is the addition of file compression. This is a natural feature to include where archives of any sort are to be constructed. Standard techniques may be used; see for example James A. Storer, Data Compression: methods and theory, Rockville, Md.: Computer Science Press, 1988. Compression is applied directly to the original data files 0220 after they have been selected by the user and before they are passed through the fragmentation process 1740. Decompression is applied at the end of the reconstitution process 0160.

There are several advantages to compression in the context of privatizing computer data. The first is that cumulative size of the output may be reduced significantly, leading to savings in storage space and transmission time. The second is that time taken for compression is offset by reduced time to fragment the smaller body of input. A third is that compression is itself a useful way to obscure content and make it less vulnerable to data mining. The combination of compression and the system and method to privatize computer files 0110 provides further enhanced security.

Extension 3140 is to automate privatizing and reconstitution of designated file types. To implement this system, the user must designate certain file types by suffix as vulnerable data that should be routinely privatized. For example, all *.xls, all *.doc, all *.rtf, and all *.igx files might be considered as candidates for automatic privatizing. In routine use, a worker at the end of the day would need to click one option, to search for and privatize all files of the designated types. The program would be set to scan the entire hard disk for each file with a designated suffix. Management of the result is simplest if extension 3110 (all results in a single file) and extension 3120 (input as a single file) are applied, so that each input file is handled independently. The resulting single file outputs should be named with the original name, but now with a suffix that denotes it as a privatized version. Reconstitution files 0270 may be embedded (greater convenience), sent to a specified directory for convenient offloading (greater security), or aggregated in one indexed mass of reconstitution files, which could itself be privatized.

The same worker might the next morning either specify particular files to be reconstituted or with one click and a date selection order up all privatized files after a certain date to be automatically reconstituted.

Extension 3140 would be especially helpful to users who travel with laptop computers. This would reduce vulnerability to data theft to a minimum.

Extension 3150 is to standardize within an operating system the method to privatize computer data. This might be implemented as a variation on extension 3140, such that original data files 0220 deemed vulnerable by the user are routinely privatized whenever they are not in use. An operating system can unobtrusively privatize and reconstitute files when they are to be opened or when they have been closed by other application software. Extension 3150 would maximize convenience and security both at the same time.

Extension 3160 is to cause one reconstitution file to be used across varied archives. This carries a particular advantage where data is being privately distributed. A new reconstitution file need not be transmitted; the intended recipient needs only to know which reconstitution file among a supply of them is to be used for a particular archive. Obviously, the stock of reconstitution files must be handled in a very guarded way 1220; otherwise, a security gap would be opened. To implement this extension, the temporary fragmentation steps file 1690 should not be erased. In addition, the differences in file sizes must be handled, either by random padding out to original sizes, or by scripting the breakup and/or consolidation of new input files, changing their names and sizes to correspond to those of the input files used when the temporary fragmentation steps file 1690 was first created.

Extension 3170 is called dynamic dispersion. Its application is to secure Internet data. This is a variation of the system and method to privatize files that takes further advantage of the ability to hide files on the Internet. Instead of multiple composite files as output, there need to be only one. Extension 3120 (input in a single file) together with compression 3130 are applied to those parts of an Internet page or pages that are to be accessible only to selected receivers. The output from privatizing 1740 is run through a further "alphaclad" step. This is a standard technique in which each six bits of a file are replaced by one of 64 characters (A through Z, a through z, 0 through 9, and two punctuation characters). These 64 characters are arranged in a random order; this string must be accessible to a computer that is authorized to access the original data.

Dispersion is not in this case of the main body of data; that is public. It is embedded within HTML pages that can be viewed over the Internet. The person without authorization sees privatized passages as lines of scrambled upper and lower case characters intermingled with digits and a couple of punctuation characters. By Internet display, 95 percent or more of the required data is made available to the user by conventional Internet browser techniques.

Dispersion is of three items, combined as one . . . the reconstitution file 0270, the decompression table 3130 if applicable, and the 64 byte alphaclad string. This information is hidden somewhere on the Internet with an obscure file name in an obscure subdirectory. Security of Internet data under this regime is extremely high. There are for example 64 factorial different alphaclad arrangements (64 ways of selecting the first, 63 ways of selecting the second, etc.) . . . . an extremely high number. It has already been established that without the reconstitution file the data is impenetrable. The decompression table adds yet another measure of security. The person without these three sets of information is totally unable to crack data that is openly displayed on the Internet.

Dispersion is dynamic in that the name and location of the hidden data change at random time intervals, with shorter periods for highly sensitive data. The data in alphaclad form and the associated reconstitution file may also be completely replaced at random times. The only thing that an astute viewer on the Internet would notice is that the scramble of letters, digits, etc. has changed from what it was on a previous viewing.

A variety of techniques may be applied to make the name and location of the hidden data accessible to an authorized viewer. The selection of technique depends on the trade-off between convenience and security, and on the swiftness of change of the data. Note that information posted on the Internet under "dynamic dispersion for secure Internet data 3170" may be highly volatile. The author/publisher can change content and re-privatize it many times per day.

To briefly summarize the foregoing, a system for privatizing computer comprises a plurality of original data files 0220, a plurality of original data storage structures (original data buffers 1612), a plurality of fragment storage structures (fragment heaps 1651), a plurality of composite files 0250, and at least two hidden locations for storing the plurality of composite files. Data from each of the original data files is read into a corresponding original data storage structure in reverse sequential order. Data in the storage structures is fragmented into fragments, where each of said fragments is read from one of the plurality of original data storage structures and written into one of the said plurality of fragment storage structures, forming interspersed fragments. To be more precise, one of the plurality of original data storage structures is selected randomly. A random size fragment is read from the end (reverse order) of that original data storage structure, disguised by multiple techniques, and written into the next available fragment storage structure in round robin order. After any one of said fragment storage structures is filled, it is padded to become a composite segment which is then camouflaged and written to one of the plurality of composite files. The fragment storage structure is reinitiated after said interspersed fragments are written to the composite files. Once all the data has been fragmented, disguised, interspersed and formed into new composite files, the composite files are sent to at least two hidden dispersion locations.

The system further comprises a reconstitution file having the reconstitution plan. The reconstitution plan comprises the locations of the dispersed composite files and the order of said fragments to reconstruct the plurality of original data files. The plan also guides the identification of fragments, the removal of their disguises, and their allocation to correct locations in the reconstituted versions of the original data files. Fragment disguising is performed through a plurality of high speed mathematical manipulations, guided by parameters determined by a fragment handling guide which starts at a seemingly random starting point in a randomly selected table consisting of random bytes.

Naturally, this method and system is not limited to any specific computer media. Further, any apparatus, such as, but not limited to, a computer, CD-ROM, floppy disk or hard disk, or similar apparatus may hold the software for privatizing computer data.

The invention has been described with reference to preferred embodiment. Obviously, modifications and alterations will occur to others upon a reading and understanding of this specification. It is intended to include all such modifications and alternations in so far as they come within the scope of the appended claims or the equivalence thereof.

What is claimed is:

1. A computer-implemented method for privatizing computer data, comprising the steps of:
   providing at least one original data file;
   fragmenting said original data file into fragments;
   creating at least one composite file by interspersing said fragments;
   creating a reconstitution file, said reconstitution file comprising a reconstitution plan;
   dispersing said at least one composite file as a unit to at least one location, wherein said at least one location for said at feast one composite file is different than a second location for the reconstitution file; and
   preventing access to any data of said at least one original data file.

2. The method for privatizing computer data of claim 1, wherein creating at least one composite file, further comprises the step of:
   disguising said fragments.

3. The method for privatizing computer data of claim 2, wherein disguising said fragments further comprises the step of:
   disguising said fragment through at least two mathematical techniques.

4. The method for privatizing computer data of claim 2, wherein said step of disguising said fragments further comprises the steps of:
   accessing a random table, said random table being a randomized plurality of data bytes; and,
   accessing a fragment handling guide, said fragment handling guide comprising a predetermined number of successive bytes from said random table.

5. The method for privatizing computer data of claim 4, wherein said step of accessing said fragment handling guide comprises the step of:
   determining a starting point in said random table.

6. A computer-implemented method for privatizing computer data comprising the steps of:
   providing a plurality of original data files, each of said original data files being a binary stream;
   fragmenting said plurality of original data files into fragments;
   creating at least two composite files by interspersing said fragments;
   creating a reconstitution file having a reconstitution plan;
   dispersing said at least two composite files to at least two different locations, such that the location of each composite file is different from another composite file, wherein each composite file is dispersed as a unit to one single location wherein said two different locations for said at least two composite files is different than a third location for the reconstitution file; and
   preventing access to any data of said plurality of original data files.

7. A method for privatizing computer data comprising the steps of:
   providing a plurality of original data files, each of said original data files being a binary stream;
   fragmenting said plurality of original data files into fragments;
   creating at least two composite files by interspersing said fragments;
   creating a reconstitution file having a reconstitution plan; and dispersing said at least two composite files to at least two different locations, wherein fragmenting said plurality of original data files into fragments, further comprises the steps of:

processing original data file matters;

processing random table matters;

obtaining a fragment handling guide;

interpreting said fragment handling guide;

obtaining one of said fragments;

providing space in a fragment storage structure for said one of said fragments;

disguising said one of said fragments;

writing said disguised one of said fragments to said fragment storage structure so as to intersperse said disguised one of said fragments with other fragments stored therein;

writing said interspersed fragments to said composite file when said fragment storage structure is filled with said interspersed fragments;

recording an action taken on said fragment to said reconstitution file; and repeating said steps for fragmenting said data files into fragments until no input data remains in said original data files.

8. The method for privatizing computer data of claim 7, further comprising the step of:

reinitiating said fragment storage structure after said interspersed fragments are written to said composite file.

9. The method for privatizing computer data of claim 7, wherein the step of processing original data file matters further comprises the step of:

finalizing input matters when said input data being stored in one of a plurality of original data storage structures exceeds or equals a threshold value.

10. The method for privatizing computer data of claim 7, wherein processing data input file matters further comprises the step of:

replenishing an original data storage structure when input data being stored in said original data storage structure is less than a threshold value.

11. The method for privatizing computer data of claim 10, further comprising the step of:

closing one of said plurality of original data files if no input data is being stored in said corresponding original data storage structure.

12. The method for privatizing computer data of claim 11, further comprising the step of:

marking said closed original data file inactive if no input data exists therein.

13. The method for privatizing computer data of claim 7, wherein of processing random table matters comprises the step of:

accessing a random table having a predetermined number of randomized bytes, wherein the first two bytes are binary integers identifying said random table.

14. The method for privatizing computer data of claim 7, wherein obtaining one of said fragments further comprises the step of:

reading and writing data from each of said plurality of original data files to a plurality of original data storage structures, said plurality of original data storage structures corresponding to each of said plurality of original data files, wherein said fragments are drawn from each of said original data storage structures.

15. The method for privatizing computer data of claim 14, wherein writing data from each of said plurality of original data files to said plurality of original data storage structures is performed in sequential order.

16. The method for privatizing computer data of claim 14, wherein writing said disguised one of said fragments to said fragment storage structure so as to intersperse said disguised one of said fragments with other fragments stored therein comprises the steps of:

reading and writing each of said fragments from each original file data structure to one of a plurality of fragment data storage structures, resulting in interspersed fragments; and reading and writing said interspersed fragments to said composite files.

17. The method for privatizing computer data of claim 16, wherein said original data storage structures have an end, wherein writing said disguised one of said fragments to said fragment storage structure further comprises the steps of:

selecting one of said original data storage structures randomly;

drawing the next fragment in sequence from said end of said original data storage structure resulting in a new current end;

repositioning said new current end forward to the beginning of the just drawn fragment such that said fragments are drawn from said original data storage structures in a combined random and reverse order, said fragments being read into said corresponding fragment data storage structures in a round robin order.

18. The method for privatizing computer data of claim 7, wherein said step of disguising said one of said fragments is performed through at least two mathematical techniques, said one of said fragments having a fragment length and a starting point in a random table, said fragment length and said starting point designated by said fragment handling guide.

19. A method for privatizing computer data comprising the steps of:

providing a plurality of original data files, each of said original data files being a binary stream;

fragmenting said plurality of original data files into fragments;

creating at least two composite files by interspersing said fragments;

creating a reconstitution file having a reconstitution plan; and dispersing said at least two composite files to at least two different locations, wherein creating a reconstitution file, further comprises the steps of:

creating a header with counts and offsets;

appending all location strings;

appending names of all random tables;

appending all original data file names;

appending all composite files names;

compressing trailers; and writing actions with compressed trailers in reverse order.

20. A system for privatizing computer data, said system comprising:

a plurality of original data files;

a plurality of fragment storage structures, said original data files being fragmented into fragments, each of said fragments being read from one of said plurality of original data files and written into one of said plurality of fragment storage structures forming interspersed fragments, wherein said plurality of fragments are not replicated when written into one of said plurality of fragment storage structures;

a plurality of composite files, wherein the interspersed fragments of one of said fragment storage structures is written to one of said composite files after each occurrence that one of said fragment storage structures is filled; and at least two different storage locations for said plurality of composite flies; and a reconstitution file having a storage location different from said storage locations for said plurality of composite files.

21. The system for privatizing computer data of claim 20, said system further comprising a plurality of original data storage structures corresponding with each of said plurality of original data files, data from each of said original data files being read into one of said corresponding original file storage structures, said fragment being read from said original storage structure and written into said fragment storage structure.

22. The system for privatizing computer data of claim 21, wherein said fragments are read into said original storage structures in sequential order.

23. A system for privatizing computer data, said system comprising:

a plurality of original data files;

a plurality of fragment storage structures, said original data files being fragmented into fragments, each of said fragments being read from one of said plurality of original data files and written into one of said plurality of fragment storage structures forming interspersed fragments;

a plurality of composite files, wherein the interspersed fragments of one of said fragment storage structure is written to one of said composite files after each occurrence that one of said fragment storage structures is filled; and at least two different storage locations, wherein said fragments are written into said plurality of fragment storage structures in reverse order.

24. The system for privatizing computer data of claim 20, wherein said fragment storage structure is reinitiated after said interspersed fragments are written to said composite files.

25. The system for privatizing computer data of claim 20, said system further comprising a reconstitution plan adapted to restore said fragments into said plurality of original data files.

26. The system for privatizing computer data of claim 20, wherein said fragments are disguised.

27. The system for privatizing computer data of claim 26, wherein the system further comprises a random table for disguising said fragments, said random table being a randomized plurality of data bytes.

28. The system for privatizing computer data of claim 27, wherein said disguising is performed by an operation having a starting point in said random table, said operation and starting point being determined by a fragment handling guide.

29. A computer readable medium containing instructions for controlling a computer system to perform a method, the method comprising the steps of:

providing a plurality of original data files;

providing a plurality of fragment storage structures;

providing a plurality of composite files;

providing at least two locations for storing said plurality of composite files;

fragmenting said original data files into fragments reading each of said fragments from said plurality of original data files;

writing each of said fragments into one of said plurality of fragment storage structures, wherein said plurality of fragments are not replicated when written into one of said plurality of fragment storage structures;

forming interspersed fragments;

filling said fragment storage structures with fragments; and, writing said interspersed fragments to said composite files and providing a reconstitution plan, said reconstitution plan being stored in a different location from said composite files.

30. The computer readable medium of claim 29, the method further comprising the step of:

providing a plurality of original data storage structures one of which corresponds with each of said plurality of original data files;

reading and writing data from each of said original data files into said corresponding original file storage structures; and reading and writing said fragment from said original storage structure into said fragment storage structure.

31. A computer readable medium containing instructions for controlling a computer system to perform a method, the method comprising the steps of:

providing a plurality of original data files;

providing a plurality of fragment storage structures;

providing a plurality of composite files;

providing at least two locations for storing said plurality of composite files;

fragmenting said original data files into fragments;

reading each of said fragments from said plurality of original data files;

writing each of said fragments into one of said plurality of fragment storage structures;

forming interspersed fragments;

filling said fragment storage structures with fragments; and, writing said interspersed fragments to said composite files, wherein reading and wilting data from each of said original data files into said corresponding original file storage structures further comprises the step of:

reading and writing said portions of original data files into said original storage structures progressively in reverse sequential order.

32. The computer readable medium of claim 29, wherein reading and wilting said fragment from said original storage structure into said original file storage structure further comprises the steps of:

randomly selecting fragments of random length from the ends of the original file storage structures; and reading and writing said fragments into said plurality of fragment storage structures in round robin order.

33. The computer readable medium of claim 29, the method further comprising the step of:

reinitiating said fragment storage structure after said interspersed fragments are written to said composite files.

34. The computer readable medium of claim 29, the method further comprising the step of:

retrieving said plurality of dispersed composite files; and reordering said fragments to reconstruct said plurality of original data files.

35. The computer readable medium of claim 29, the method further comprising the step of:

disguising said fragments.

36. The computer readable medium of claim 35, wherein the step of disguising said fragments is determined by a random table, said random table being a randomized plurality of data bytes.

37. The computer readable medium of claim 36, wherein said step of disguising said fragments is performed by an operation having a starting point in said random table, said operation and starting point being determined by a fragment handling guide.

38. An apparatus, comprising:

means for opening a plurality of original data files, each of said original data files being a binary stream;

means for fragmenting said plurality of original data files into fragments;

means for creating at least two composite files by interspersing said fragments;

means for creating a reconstitution file having a reconstitution plan;

means for dispersing said at least two composite files to at least two different locations, such that the location of each composite file is different from another composite file, wherein each composite file is dispersed as a unit to one single location wherein said single location for each composite file is different than a second location for said reconstitution file; and;

preventing access to any data of said plurality of original data files.

39. An apparatus, comprising:

means for opening a plurality of original data files, each of said original data files being a binary stream;

means for fragmenting said plurality of original data files into fragments;

means for creating at least two composite files by interspersing said fragments;

means for creating a reconstitution file having a reconstitution plan; and means for dispersing said at least two composite files to at least two different locations, wherein means for fragmenting said plurality of original data files into fragments further comprises:

means for processing original data file matters;

means for processing random table matters;

means for obtaining a fragment handling guide;

means for interpreting said fragment handling guide;

means for obtaining one of said fragments;

means for providing space in a fragment storage structure for said one of said fragments;

means for disguising said one of said fragments;

means for writing said disguised one of said fragments to said fragment storage structure so as to intersperse said disguised one of said fragments with other fragments stored therein;

means for writing said interspersed fragments to said composite file when said fragment storage structure is filled with said interspersed fragments;

means for recording an action taken on said fragment to said reconstitution file; and means for repeating said steps for fragmenting said data files into fragments until no input data remains in said original data files.

40. The apparatus of claim 39, further comprising:

means for reinitiating said fragment storage structure after said interspersed fragments are written to said composite file.

41. The apparatus of claim 39, wherein means for processing original data file matters further comprises:

means for finalizing input matters when said input data being stored in one of a plurality of original data storage structures exceeds or equals a threshold value.

42. The apparatus of claim 39, wherein means for processing original data file matters further comprises:

means for replenishing an original data storage structure when input data being stored in said original data storage structure is less than a threshold value.

43. The apparatus of claim 42, further comprising:

means for closing one of said plurality of original data files if no input data is being stored in said corresponding original data storage structure.

44. The apparatus of claim 43, further comprising:

means for marking said closed original data file inactive if no input data exists therein.

45. The apparatus of claim 39, wherein said means for processing random table matters comprises:

means for accessing a random table having a predetermined number of randomized bytes, wherein first two bytes are binary integers identifying said random table.

46. The apparatus of claim 39, wherein said means for obtaining one of said fragments further comprises:

means for reading and writing data from each of said plurality of original data files to a corresponding original data storage structure, wherein said fragments are drawn from each of said original data storage structures.

47. The apparatus of claim 46, wherein said means for writing data from one of said plurality of original data files to its corresponding original data storage structure is performed in sequential order from end to beginning of said original data file.

48. The apparatus of claim 46, wherein said means for writing said disguised one of said fragments to said fragment storage structure so as to intersperse said disguised one of said fragments with other fragments stored therein comprises:

means for reading and writing each of said fragments from one of said original file data structures to one of a plurality of fragment data storage structures, resulting in interspersed fragments, said original file data structure being randomly selected;

means for reading and writing said interspersed fragments to said composite files.

49. The apparatus of claim 48, wherein each of said original data storage structures comprises an end and each of said fragment data storage structures comprises an end, wherein each of said fragments is drawn from said end of said randomly selected original data storage structure, and each of said fragments is read successively into said end of one of said fragment data storage structures in round robin order.

50. The apparatus of claim 39, wherein said means for disguising said one of said fragments is performed through an exclusive OR operation, said one of said fragments having a fragment length and a starting point in a random table, said fragment length and said starting point designated by said fragment handling guide.

51. An apparatus, comprising:

means for opening a plurality of original data files, each of said original data files being a binary stream;

means for fragmenting said plurality of original data files into fragments;

means for creating at least two composite files by interspersing said fragments;

means for creating a reconstitution file having a reconstitution plan; and means for dispersing said at least two composite files to at least two different locations, wherein creating a reconstitution file, further comprises:

means for creating a header with counts and offsets;

means for appending all location strings;

means for appending all random table names;

means for appending original data file names;

means for appending composite files names;

means for compressing trailers; and means for writing actions each with its compressed trailer in reverse order.

\* \* \* \* \*

UNITED STATES PATENT AND TRADEMARK OFFICE
CERTIFICATE OF CORRECTION

PATENT NO.      : 6,757,699 B2
DATED           : June 29, 2004
INVENTOR(S)     : Douglas B. Lowry It is certified that error appears in the above-identified patent and that said Letters Patent is hereby corrected as shown below:

Column 42,
Line 12, delete "feast" and insert -- least --.

Column 46,
Lines 53 and 60, delete "wilting" and insert -- writing --.

Signed and Sealed this

Tenth Day of August, 2004

JON W. DUDAS
*Acting Director of the United States Patent and Trademark Office*